(12) United States Patent
Rastrow et al.

(10) Patent No.: US 12,236,950 B2
(45) Date of Patent: *Feb. 25, 2025

(54) DEVICE-DIRECTED UTTERANCE DETECTION

(71) Applicant: Amazon Technologies, Inc., Seattle, WA (US)

(72) Inventors: Ariya Rastrow, Seattle, WA (US); Eli Joshua Fidler, Toronto (CA); Roland Maximilian Rolf Maas, Seattle, WA (US); Nikko Strom, Kirkland, WA (US); Aaron Eakin, Seattle, WA (US); Diamond Bishop, Seattle, WA (US); Bjorn Hoffmeister, Seattle, WA (US); Sanjeev Mishra, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,181

(22) Filed: Jan. 3, 2023

(65) Prior Publication Data

US 2023/0223023 A1 Jul. 13, 2023

Related U.S. Application Data

(63) Continuation of application No. 16/822,744, filed on Mar. 18, 2020, now Pat. No. 11,551,685.

(51) Int. Cl.
*G10L 15/22* (2006.01)
*G10L 15/18* (2013.01)
(Continued)

(52) U.S. Cl.
CPC .......... *G10L 15/22* (2013.01); *G10L 15/1815* (2013.01); *G10L 15/26* (2013.01);
(Continued)

(58) Field of Classification Search
None
See application file for complete search history.

(56) References Cited

U.S. PATENT DOCUMENTS 5,740,318 A * 4/1998 Naito ...................... G10L 25/87
704/E11.005
10,134,425 B1 * 11/2018 Johnson, Jr. ............ G10L 25/87
(Continued)

*Primary Examiner* — Neeraj Sharma
(74) *Attorney, Agent, or Firm* — Pierce Atwood LLP

(57) ABSTRACT

A speech interface device is configured to detect an interrupt event and process a voice command without detecting a wakeword. The device includes on-device interrupt architecture configured to detect when device-directed speech is present and send audio data to a remote system for speech processing. This architecture includes an interrupt detector that detects an interrupt event (e.g., device-directed speech) with low latency, enabling the device to quickly lower a volume of output audio and/or perform other actions in response to a potential voice command. In addition, the architecture includes a device directed classifier that processes an entire utterance and corresponding semantic information and detects device-directed speech with high accuracy. Using the device directed classifier, the device may reject the interrupt event and increase a volume of the output audio or may accept the interrupt event, causing the output audio to end and performing speech processing on the audio data.

21 Claims, 29 Drawing Sheets

(51) Int. Cl.
*G10L 15/26* (2006.01)
*G10L 15/08* (2006.01)

(52) U.S. Cl.
CPC .. *G10L 2015/088* (2013.01); *G10L 2015/223* (2013.01); *G10L 2015/228* (2013.01)

(56) References Cited

U.S. PATENT DOCUMENTS

| | | | |
|---|---|---|---|
| 11,140,265 B1* | 10/2021 | Palmer | H04M 3/2281 |
| 11,361,364 B2* | 6/2022 | Liu | G10L 15/22 |
| 2018/0020093 A1* | 1/2018 | Bentitou | G10L 13/00 |
| 2020/0042285 A1* | 2/2020 | Choi | G10L 25/84 |
| 2020/0092519 A1* | 3/2020 | Shin | G10L 17/00 |
| 2020/0126556 A1* | 4/2020 | Mosayyebpour | G10L 15/063 |
| 2021/0064928 A1* | 3/2021 | Narisetty | G06F 18/245 |
| 2021/0151058 A1* | 5/2021 | Cheung | G10L 17/00 |
| 2021/0383794 A1* | 12/2021 | Kim | G06F 3/167 |
| 2022/0130134 A1* | 4/2022 | Jansen | G06V 40/15 |

\* cited by examiner

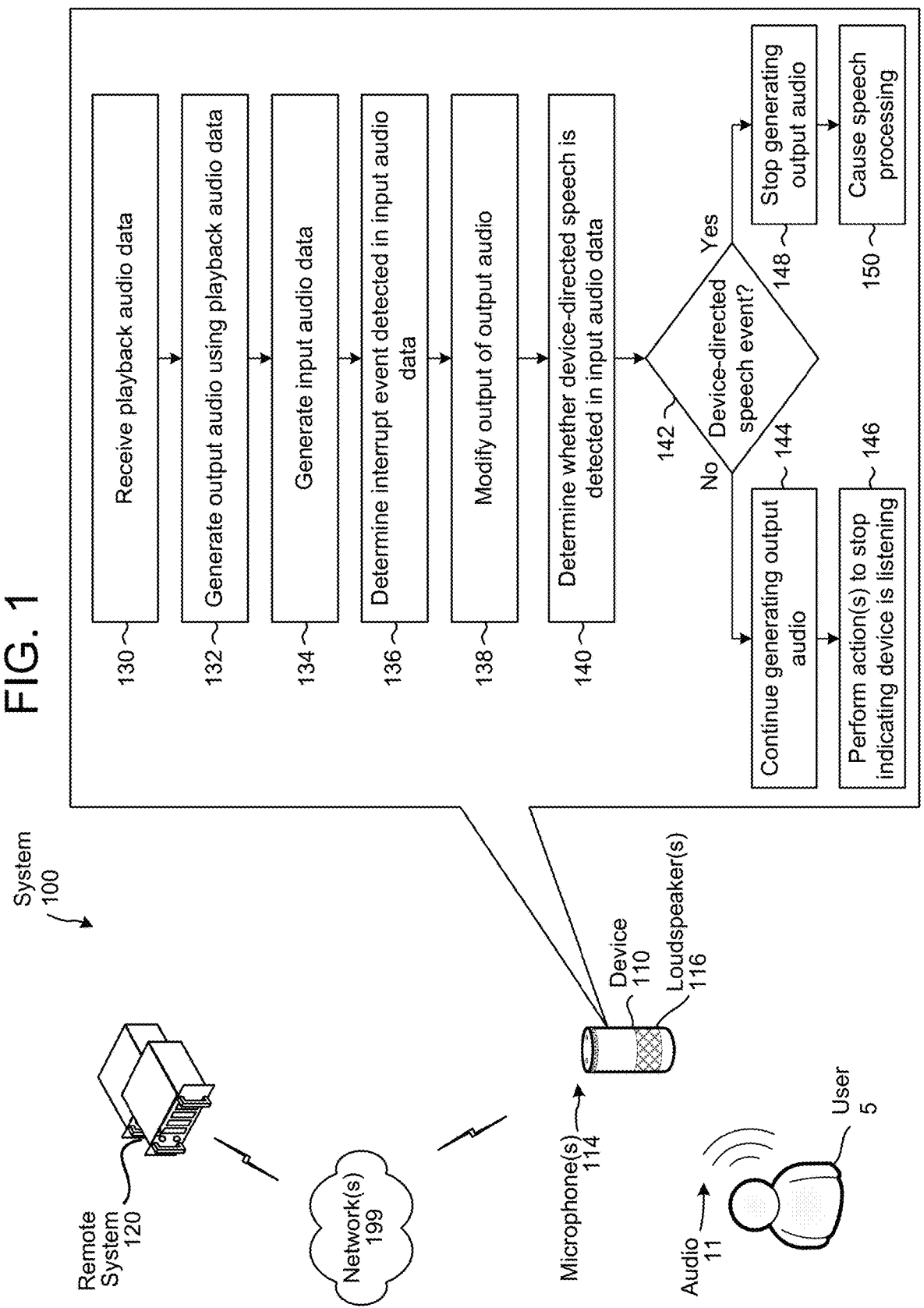

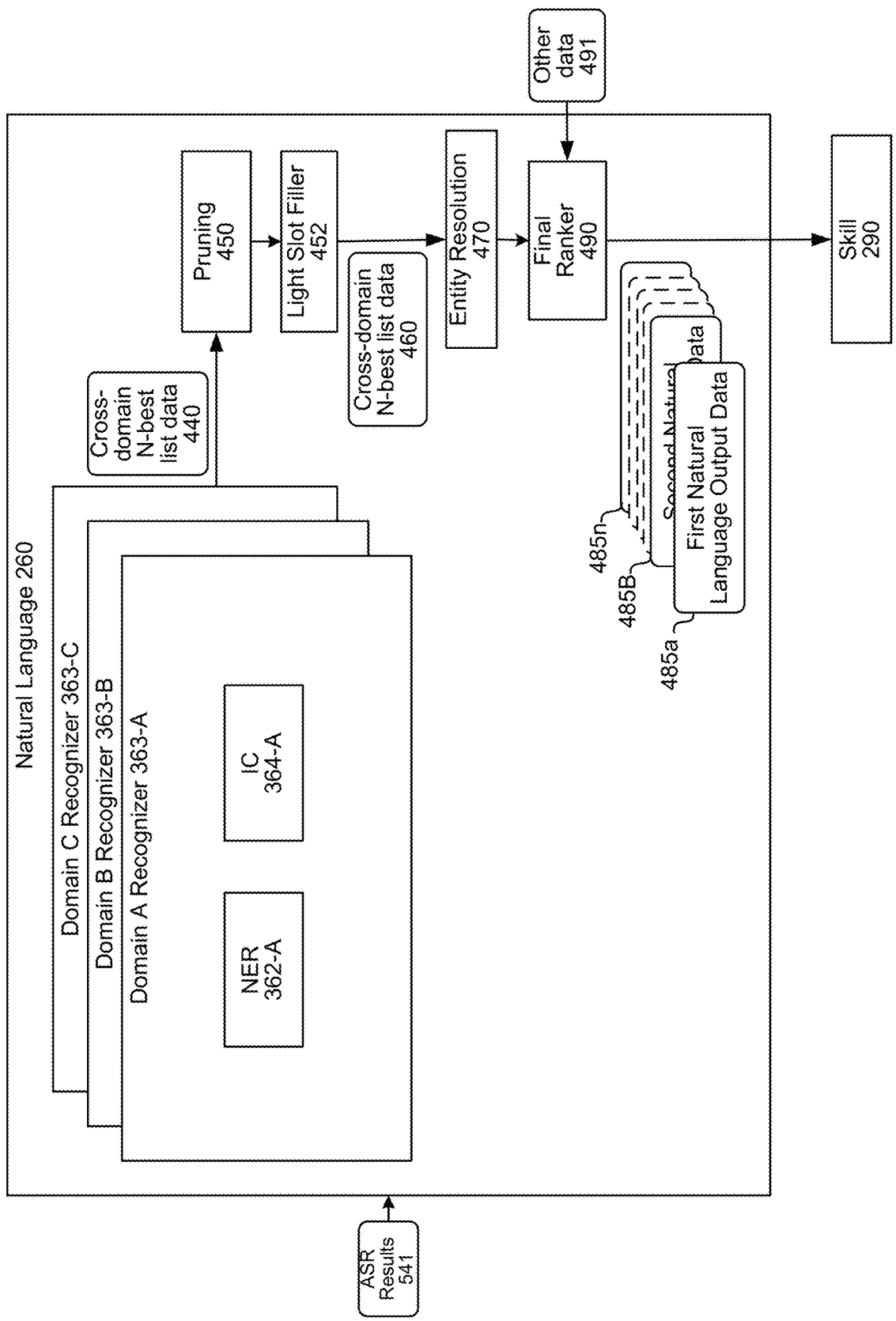

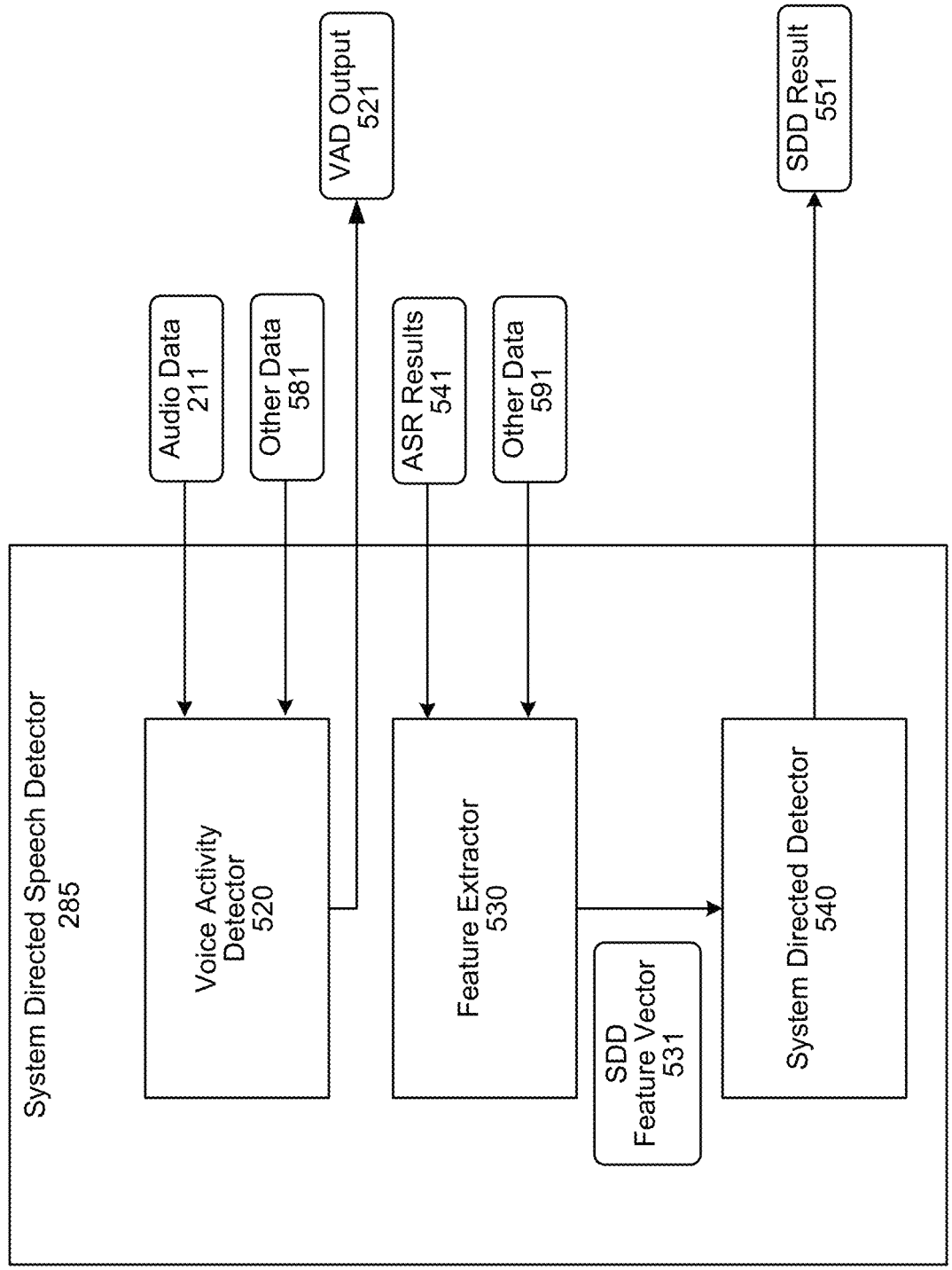

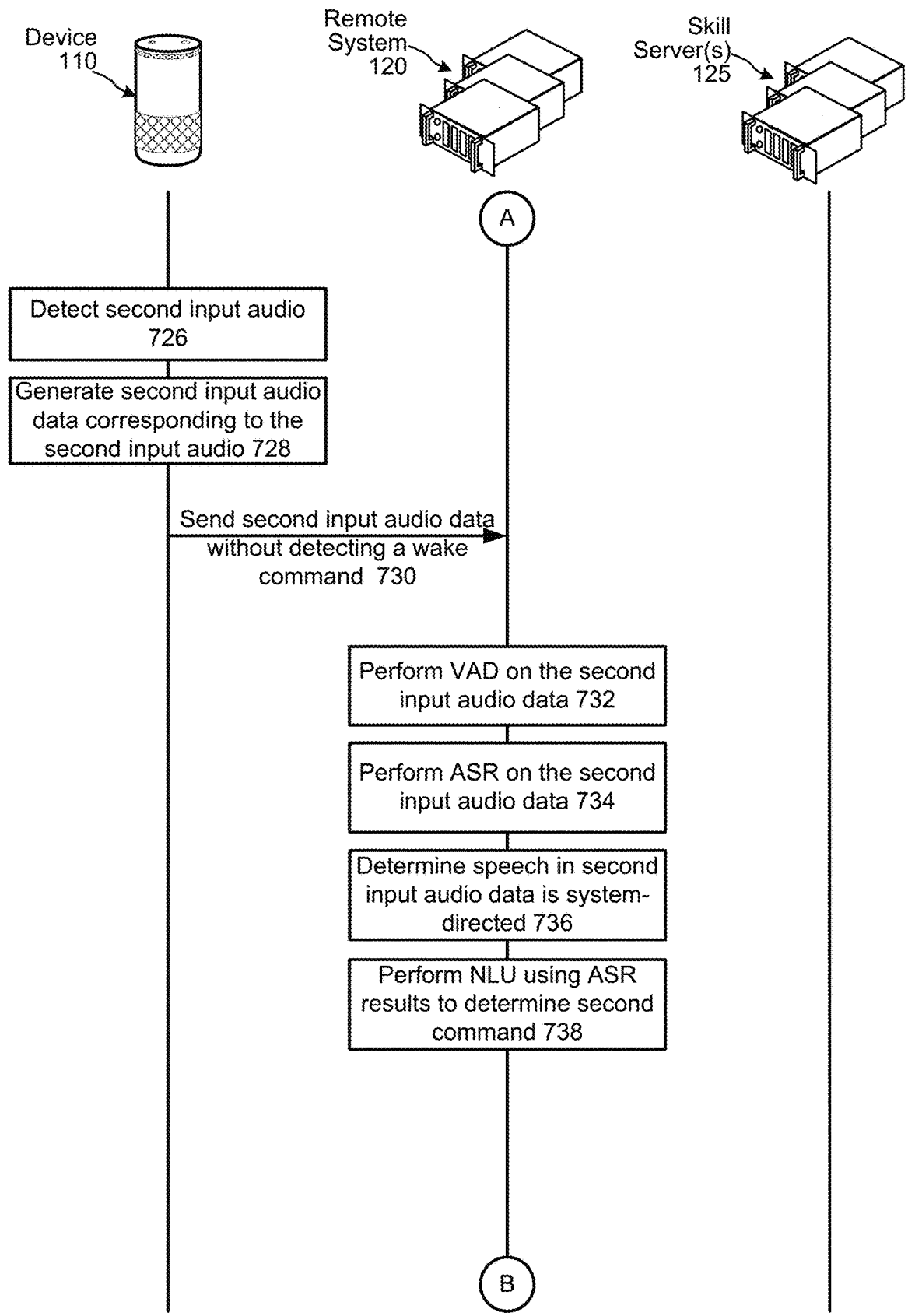

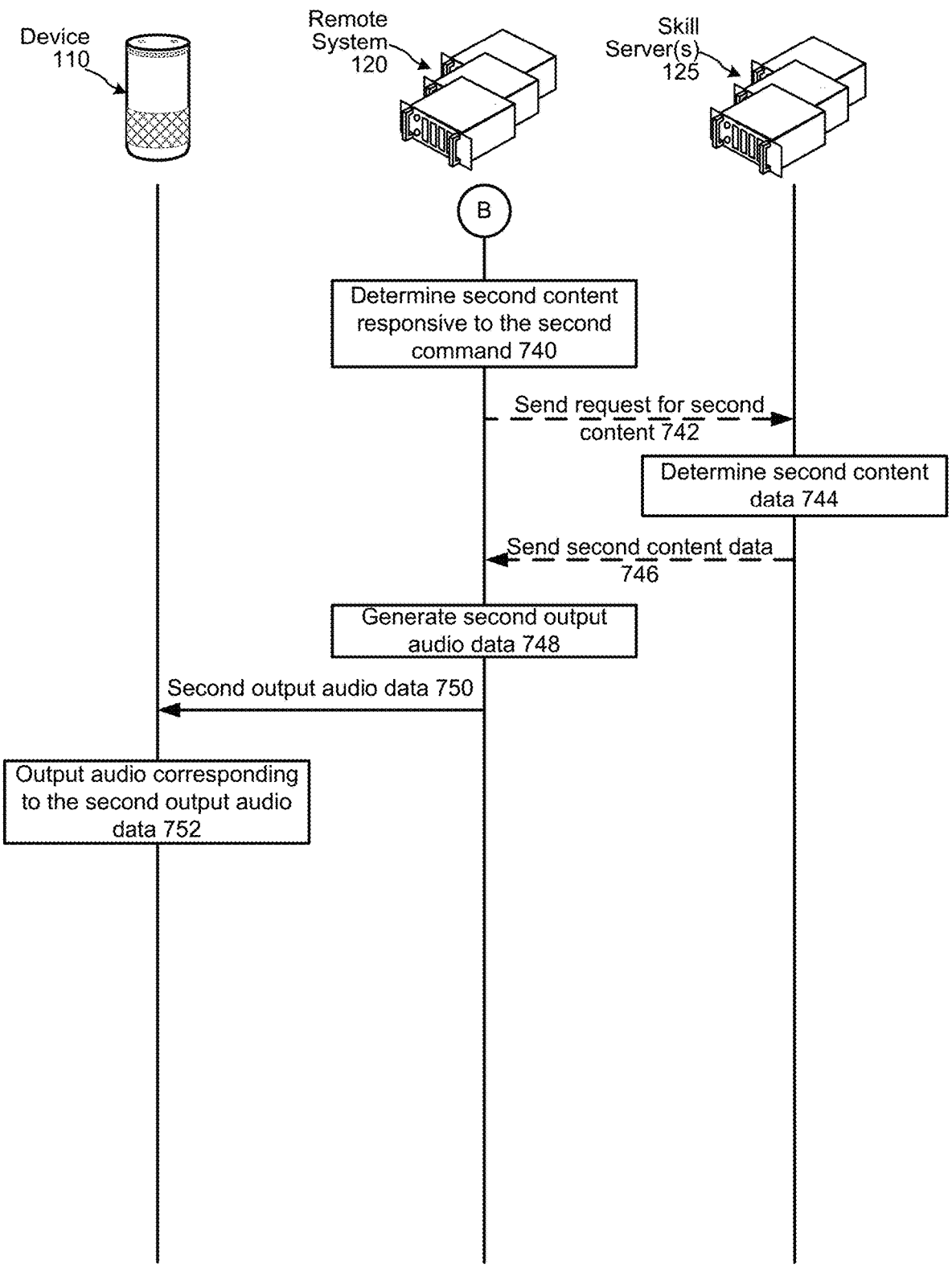

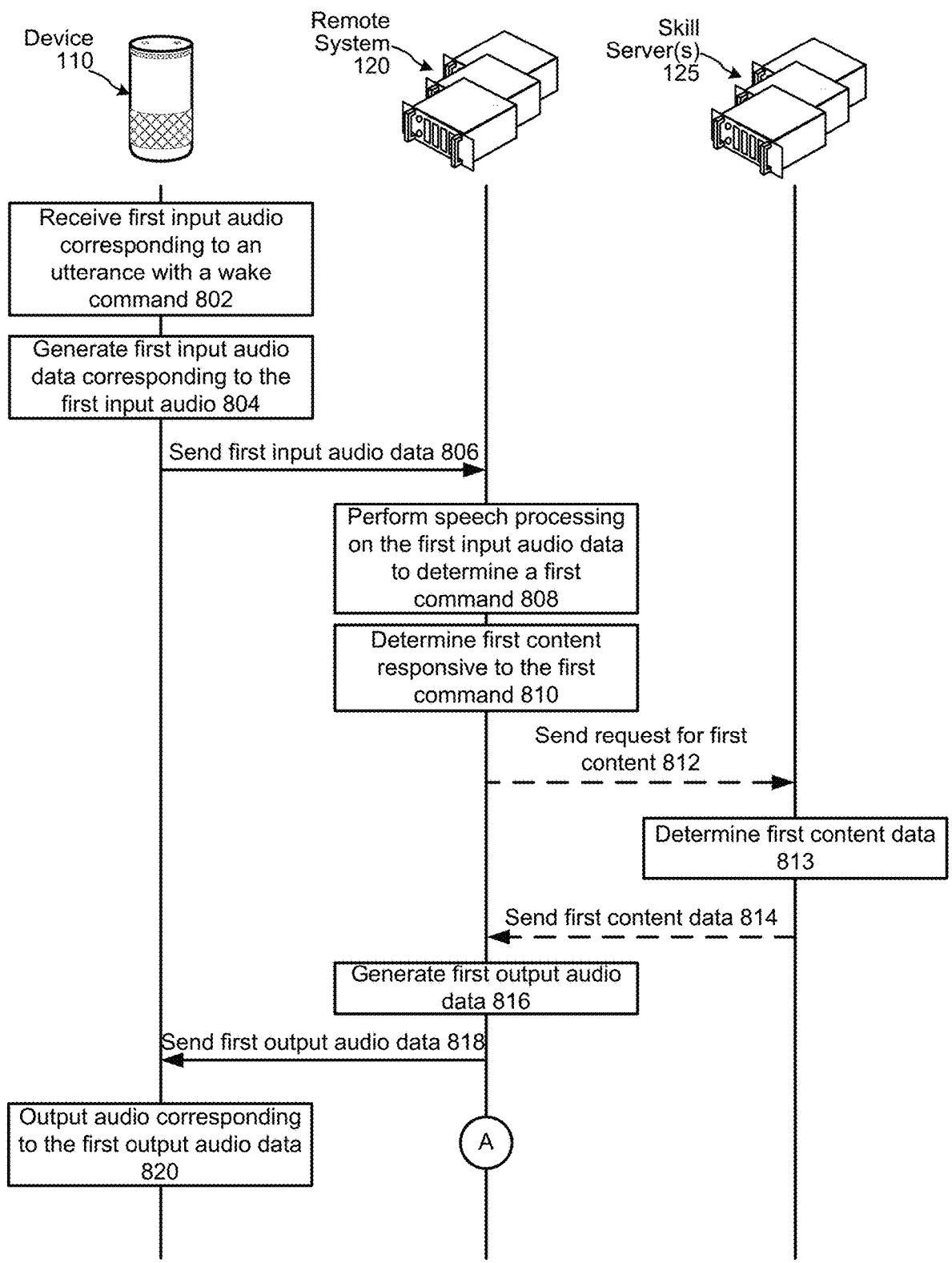

FIG. 17
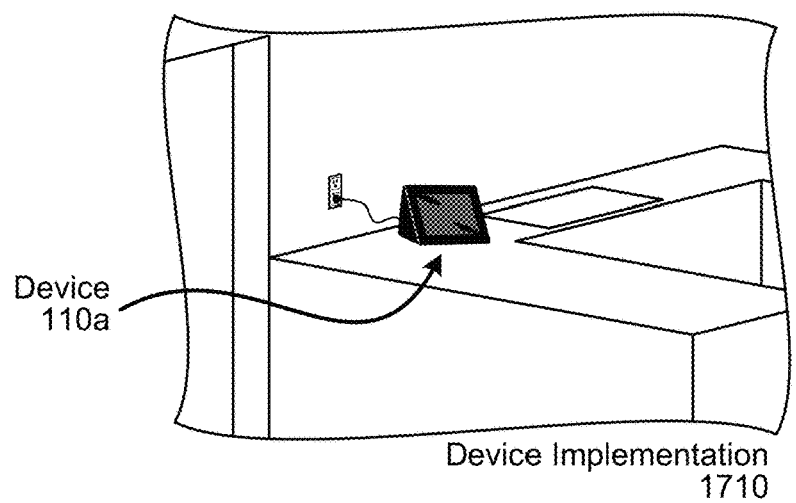
Device Implementation
1710
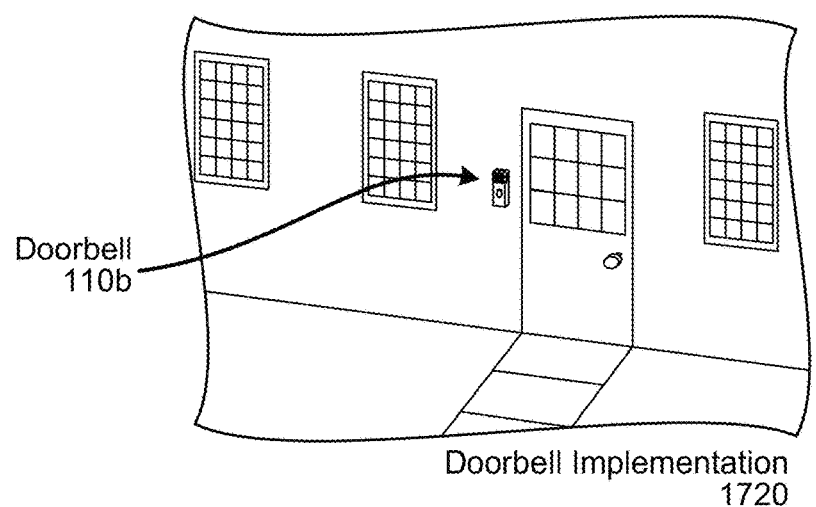
Doorbell Implementation
1720
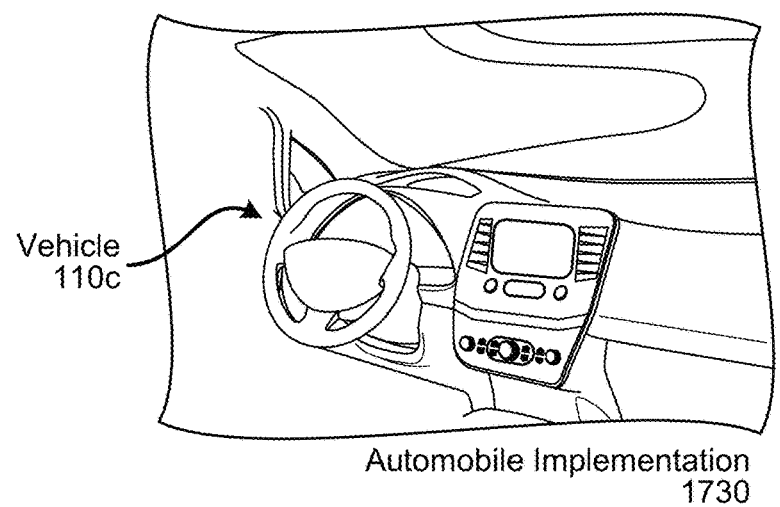
Automobile Implementation
1730

DEVICE-DIRECTED UTTERANCE DETECTION

CROSS-REFERENCE TO RELATED APPLICATION

This application is a continuation of, and claims the benefit of priority of, U.S. Non-Provisional patent application Ser. No. 16/822,744, filed Mar. 18, 2020, and entitled "DEVICE-DIRECTED UTTERANCE DETECTION", scheduled to issue as U.S. Pat. No. 11,551,685, the contents of which are herein expressly incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to perform interrupt detection according to embodiments of the present disclosure.

FIG. 4 is a conceptual diagram of how natural language processing is performed according to embodiments of the present disclosure.

FIG. 5A is a conceptual diagram of components of a system to detect if input audio data includes system directed speech according to embodiments of the present disclosure.

FIGS. 7A-7C are signal flow diagrams illustrating the processing performed when a remote system detects system-directed speech represented in input audio data and performs speech processing on the input audio data according to embodiments of the present disclosure.

FIGS. 8A-8C are signal flow diagrams illustrating the processing performed when a device detects system-directed speech represented in input audio data and sends the input audio data to a remote system for speech processing according to embodiments of the present disclosure.

FIG. 17 illustrate example implementations for wakewordless interrupt architecture according to embodiments of the present disclosure.

DETAILED DESCRIPTION

Figure 2A:
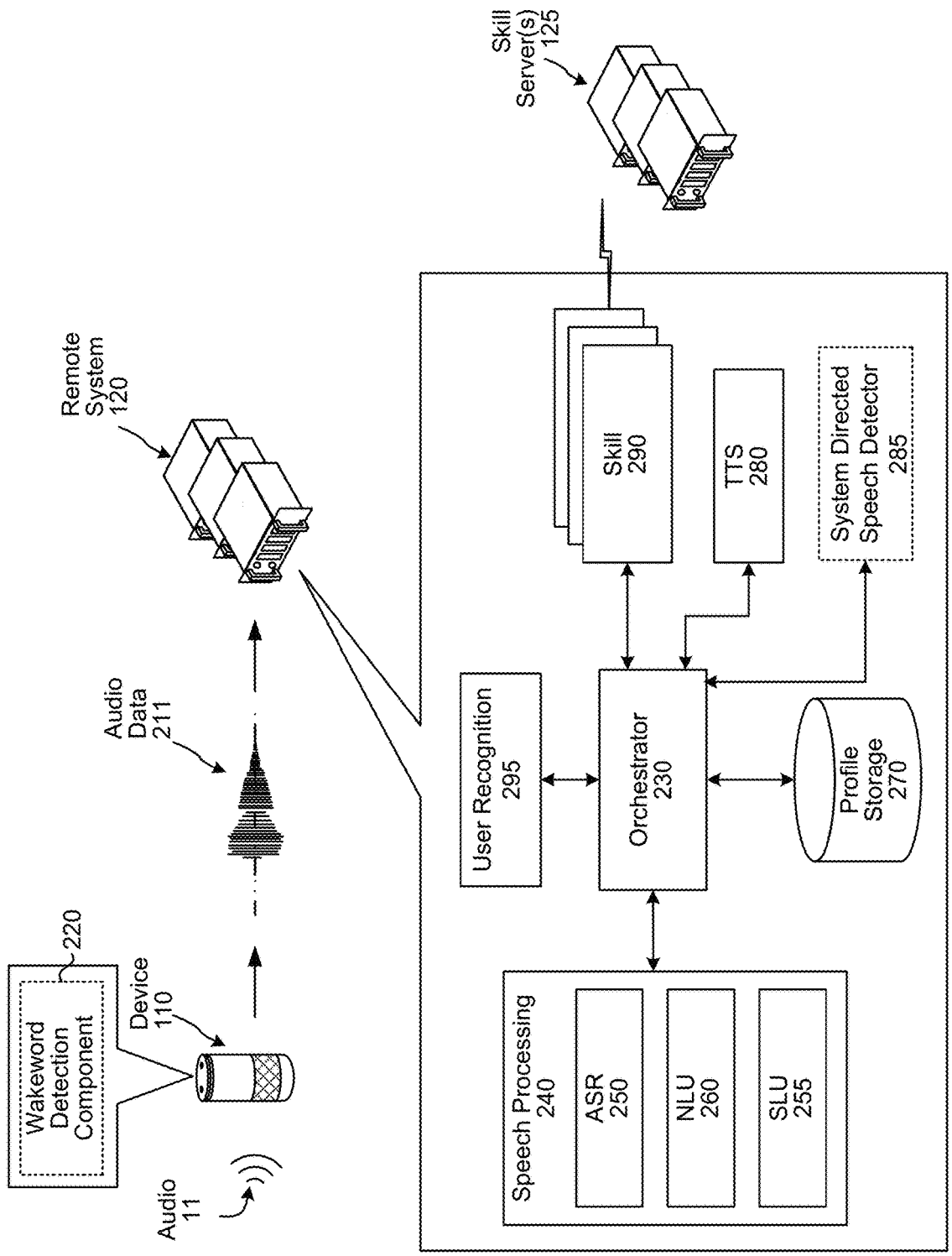
FIGS. 2A-2B are conceptual diagrams of components of a system according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech processing computing system may be configured to answer user commands requesting the output of content. For example, a user may say "what is the weather in Seattle." The system may determine content responsive to the command (e.g., weather information for Seattle) and output the content to the user. The input of speech corresponding to a command, the processing of the command to determine output content, and the output of the content may be considered a "turn."

Such a system may be configured to commence a turn when a user device detects speech corresponding to a wakeword (e.g., "Alexa"). A user device may remain in a wakeword detection mode until the device detects speech corresponding to the wakeword. While in wakeword detection mode, the device may continuously buffer, process, and, if the wakeword is not detected, discard captured audio. Once the device detects the wakeword, however, the device may begin sending audio data for the captured audio (and/or buffered audio) to one or more server(s) for processing. Once the server(s) has enough audio data to process (for example, a speech-endpoint has been reached in the audio data), the device may cease sending audio data to the server(s). The device may continually process captured audio to detect the wakeword, even while the device is outputting content responsive to input speech.

A user may speak a wakeword along with an initial command. When the device detects the wakeword, the device sends audio data corresponding to the initial command to a remote system. The remote system may determine more information is needed from the user in order for the remote system to determine a response to the initial command. For example, the user may request the remote system add an item to a list, but may not say what the item is. In such instances, the remote system may cause the device to output synthesized speech or another form of prompt soliciting the additional information from the user. In such a situation the remote system may also instruct the device to send further audio data to the remote system (which may represent speech including the prompted—for information) without first determining if a wakeword was spoken. Thus, if the user speaks the additional information in response to the prompt without first speaking the wakeword, the additional speech may be captured by the device. The device may then send audio data corresponding to the additional information to the server(s) without first detecting a spoken wakeword. Such situations may be referred to as dialog driven slot filling in which the user needs to provide additional information in order for the system to output a response to the user corresponding to the ongoing dialog (e.g., the conversation) between the system and the user. Such operations may be performed when the system determines that additional information is needed from the user in order to complete an operation of a pending command (e.g., processing related to a particular dialog is ongoing).

In certain situations, however, it may be desirable for a user (who has granted consent) to have a local device configured to capture audio and process (and possibly send) audio data to the remote system, even if no information is needed by the system to complete operation of a pending command/dialog and the audio data does not include a representation of the wakeword. For example, after completing a response to an utterance (or group of utterances as part of a dialog), the local device may continue to process audio data (e.g., for some user-approved amount of time) to detect device-directed speech and, if detected, send the audio data for speech processing (e.g., locally and/or remotely), including instances (with user consent) when the wakeword was not detected.

Thus, the present disclosure improves speech processing and other audio-based user interface systems by enabling a user device to detect device-directed speech and send audio data representing the device-directed speech for processing (e.g., even when the particular audio data to be processed may not include a representation of a spoken wakeword, for example when one utterance includes the wakeword but a follow-up utterance does not). The local device may detect the device-directed speech while operations related to a previous utterance/dialog are ongoing and/or have concluded. For example, while the local device is generating output audio corresponding to the previous utterance, the local device may detect device-directed speech and perform first action(s), such as pausing the output audio, reducing a volume level of the output audio, displaying indicator light(s), sending audio data to the remote system, and/or the like.

The local device may include on-device interrupt architecture configured to detect when the device-directed speech is present. This architecture may include an interrupt detector that detects an interrupt event (e.g., device-directed speech) with low latency, enabling the local device to quickly lower a volume level of the output audio and/or perform other actions in response to a potential voice command. In addition, the architecture includes a device directed classifier that processes an entire utterance and corresponding semantic information in order to detect device-directed speech with high accuracy. Using the device directed classifier, the local device may reject the interrupt event and increase a volume level of the output audio or may accept the interrupt event, causing the output audio to end and the sending the audio data to the remote system. The teachings of the present disclosure reduce system/user friction, thereby providing a better user experience.

As illustrated in FIG. 1, disclosed is a system 100 for processing commands in a distributed system according to embodiments of the present disclosure. Although the figures and discussion illustrate certain operational steps of the system in a particular order, the steps described may be performed in a different order (as well as certain steps removed or added) without departing from the intent of the disclosure. A device 110 local to a user 5 and one or more server(s) included in remote system 120 may communicate across one or more network(s) 199.

To detect user speech or other audio, the device 110 may use one or more microphones(s) 114 to generate input audio data that captures audio in a room (e.g., an environment) in which the device 110 is located. For example, if the device 110 are located within earshot of a user 5, the device 110 may capture audio data representing speech generated by the user 5. As is known and as used herein, "capturing" an audio signal includes a microphone transducing audio waves (e.g., sound waves) of captured sound to an electrical signal and a codec digitizing the signal to generate the microphone audio data.

The device 110 may process voice commands received from the user 5, enabling the user 5 to control the devices 110 and/or other devices associated with a user profile corresponding to the user 5. For example, the device 110 may include a wakeword engine (e.g., wakeword detector) that processes first input audio data to detect a representation of a wakeword. When a wakeword is detected in the first input audio data, the device 110 may generate second input audio data corresponding to the wakeword and send the second input audio data to the remote system 120 for speech processing. The remote system 120 may process the second input audio data, determine the voice command, and perform one or more actions based on the voice command. For example, the remote system 120 may generate a command instructing the device 110 (or any other device) to perform an action, may generate output audio data corresponding to the action, may send response data (including the output audio data and/or the command) to the device 110, and the device 110 may perform an action.

In some examples, the remote system 120 may generate playback audio data and send the playback audio data to the device 110. For example, the playback audio data may be the output audio data corresponding to the action described above, such as a notification generated using text-to-speech (TTS) process. However, the disclosure is not limited thereto and in some examples the playback audio data may correspond to music or other audio data associated with the voice command without departing from the disclosure. Additionally or alternatively, the device 110 may generate the playback audio data without departing from the disclosure.

As illustrated in FIG. 1, the device 110 may receive (130) the playback audio data and may generate (132) output audio using the playback audio data. For example, the device 110 may send the playback audio data to the loudspeaker(s) 116 to generate the output audio.

The device 110 may generate (134) input audio data using the microphone(s) 114, may determine (136) that an interrupt event is detected in the input audio data, and may modify (138) output of the output audio. For example, the device 110 may pause the output audio, reduce a volume level of the output audio (e.g., from a first volume level to a second volume level), and/or perform other actions (e.g., display visual indicator(s)). The device 110 may detect the interrupt event using an interrupt detector 1010, which is described in greater detail below with regard to FIG. 10. The interrupt detector 1010 is configured to detect the interrupt event with low latency (e.g., processing a shorter duration of time and/or smaller quantity of audio data), enabling the device 110 to be responsive to a potential voice command from the user 5.

The device 110 may determine (140) whether device-directed speech (e.g., system-directed speech, device-directed speech event) is detected in the input audio data. As will be described in greater detail below with regard to FIG. 10, the device 110 may determine whether device-directed speech is detected using at least one classifier. For example, the classifier may consider a variety of information, including a volume level of the speech (e.g., whether the speech is louder or quieter than normal speech), speaker identification (e.g., identification data) corresponding to the speech, which may be determined using voice recognition, image data, and/or other techniques known to one of skill in the art, emotion detection (e.g., emotion data) corresponding to the speech (e.g., whether the speech is animated or quiet, for example), a length of time between when the output audio begins and when the speech is detected, and/or the like without departing from the disclosure.

If a device-directed speech event is not detected, the device 110 may continue (144) generating output audio (e.g., un-pause the output audio, increase a volume level of the output audio, and/or perform other actions) and may perform (146) action(s) to stop indicating that the device 110 is listening. For example, the device 110 may stop displaying indicator lights or perform other actions to continue outputting audio as normal.

If a device-directed speech event is detected, however, the device 110 may stop (148) generating the output audio (e.g., cause the output audio to stop), and may cause (150) speech processing to be performed on the input audio data. For example, the device 110 may send the input audio data to the remote system 120 for speech processing. Additionally or alternatively, the device 110 may perform local speech processing on the input audio data without departing from the disclosure.

The device 110 may detect the device-directed speech event using a device directed classifier 1020, which is described in greater detail below with regard to FIG. 10. Whereas the interrupt detector 1010 is configured to detect the interrupt event with low latency (e.g., processes only a short duration/quantity of the input audio data), the device directed classifier 1020 is configured to detect the device-directed speech event with high accuracy and processes a greater quantity of the utterance along with additional contextual and/or semantic information. As described below with regard to FIG. 10, on-device interrupt architecture 1000 (e.g., barge-in detector) may include the interrupt detector 1010 and the device directed classifier 1020. The on-device interrupt architecture 1000 may detect a device-directed speech event (e.g., system-directed speech event), which may be referred to as a barge-in event, and may cause speech processing to be performed on audio data corresponding to the device-directed speech event.

As illustrated in steps 144-146, in some examples the device directed classifier 1020 may determine that the device-directed speech event is not present and may reject the interrupt event detected by the interrupt detector 1010. For example, the device 110 may detect speech but may determine that the speech does not correspond to a voice command. When this occurs, the device 110 may continue generating the output audio at the first volume level and may ignore the utterance. Additionally or alternatively, the device 110 may generate training data corresponding to the rejected interrupt event and may improve the interrupt detector 1010 (e.g., classifier, trained model, etc. included in the interrupt detector 1010) using the training data. Thus, the device 110 may use the device directed classifier 1020 to improve the interrupt detector 1010 without departing from the disclosure.

An audio signal is a representation of sound and an electronic representation of an audio signal may be referred to as audio data, which may be analog and/or digital without departing from the disclosure. For ease of illustration, the disclosure may refer to either audio data or audio signals without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., time range, such as 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

As used herein, audio signals or audio data may correspond to a specific range of frequency bands. For example, the audio data may correspond to a human hearing range (e.g., 20 Hz-20 kHz), although the disclosure is not limited thereto.

The device 110 may use various techniques to determine whether audio data includes speech and/or device-directed speech (e.g., system-directed speech). Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

In some examples, the device 110 may include a voice activity detector (VAD) that may determine whether voice activity (e.g., speech) is detected. For example, the VAD may use an instant loudness value of a current audio frame to track an upper envelope value (e.g., amplitude of the audio signal) and a lower envelope value (e.g., noise floor) and may determine whether voice activity is present by comparing the upper envelope value to the noise floor. Thus, when the upper envelope value is greater than the noise floor by more than a threshold value, the VAD may determine that voice activity is detected in the current audio frame. However, the disclosure is not limited thereto and the VAD may perform voice activity detection using any techniques known to one of skill in the art without departing from the disclosure.

As used herein, the loudness value may correspond to an amplitude, an average amplitude for a duration of time, and/or the like. For example, the loudness value can be a simple measurement of average power, such as a root mean square (RMS) value that is defined as a square root of mean square (e.g., arithmetic mean of squares of a set of numbers), which may also be referred to as a quadratic mean. For ease of illustration, the disclosure will refer to the loudness values as being RMS values, although the disclosure is not limited thereto.

As used herein, an instant loudness value corresponds to a single audio frame. In contrast, the VAD may track loudness values for a duration of time, such that the upper envelope value and the lower envelope value may correspond to several audio frames. However, the disclosure is not limited thereto and the upper envelope value and/or the lower envelope value may correspond to a single audio frame without departing from the disclosure. In some examples, the VAD may determine the lower envelope value (e.g., noise floor) over a series of audio frames but determine the upper envelope value based only on the instant loudness value of the current audio frame, such that the VAD compares the instant loudness value to the noise floor to determine whether voice activity is detected in the current audio frame.

To illustrate a detailed example of performing voice activity detection, the VAD may track the upper envelope value using a first single-pole filter with asymmetric attack (e.g., very fast) and release (e.g., very slow) speeds. Thus, the first single-pole filter will increase quickly when the instant loudness value is higher than the current upper envelope value, but release slowly when the instant loudness value is lower than the current upper envelope value, tracking the upper envelope of the audio waveform despite fluctuations in the instant loudness value over time. The first single-pole filter may switch to a faster release speed when the instant loudness value is consistently lower than the upper envelope value for a duration of time that exceeds a first time threshold value. Thus, when the upper envelope value is consistently higher than the instant loudness value, the first single-pole filter switches to the faster release speed to accurately track the upper envelope of the audio waveform.

Similarly, the VAD may track the lower envelope value (e.g., noise floor) using a second single-pole filter with asymmetric attack (e.g., very slow) and release (e.g., very fast) speeds. Thus, the second single-pole filter will decrease quickly when the instant loudness value is lower than the current lower envelope value, but increase slowly when the instant loudness value is higher than the current lower envelope value, tracking the lower envelope of the audio waveform despite fluctuations in the instant loudness value over time. The second single-pole filter may switch to a faster attack speed when the instant loudness value is consistently higher than the lower envelope value for a duration of time that exceeds a second time threshold value. Thus, when the lower envelope value is consistently lower than the instant loudness value, the second single-pole filter switches to the faster attack speed to accurately track the lower envelope of the audio waveform. The second time threshold value may be equal to the first time threshold value, although the disclosure is not limited thereto and the time threshold values may vary without departing from the disclosure.

The second single-pole filter is able to track the level of stationary noise (e.g., white noise or tonal) over time, enabling the VAD to determine that an audio frame does not include voice activity (e.g., VAD=0) even when the noise level is high. For example, the VAD may determine that voice activity is detected (e.g., VAD=1) when the upper envelope value is greater than the lower envelope value by more than a threshold value. In some examples, the VAD may only determine that voice activity is detected when the upper envelope value is greater than the lower envelope value by more than the threshold value and the signal level is higher than a minimum threshold value.

To improve the performance of the VAD, the device 110 may determine the loudness values (e.g., RMS values) using a logarithmic scale instead of a linear scale. Thus, the loudness values (e.g., instant loudness value, upper envelope value, lower envelope value, etc.) may be measured in decibels (dB). However, the disclosure is not limited thereto and the device 110 may determine the loudness values using any techniques known to one of skill in the art without departing from the disclosure.

In some examples, the VAD may perform smoothing (e.g., hangover smoothing) when switching between VAD=0 and VAD=1 in order to fade the speech/noise boundaries. For example, the VAD may perform smoothing for 10 audio frames when initially detecting voice activity (e.g., transitioning from VAD=0 to VAD=1). The VAD may not perform smoothing when switching between VAD=1 and VAD=0, although the disclosure is not limited thereto.

Based on the VAD data generated by the VAD, the device 110 may classify an audio frame as corresponding to speech (e.g., voice activity is detected, represented as VAD=1) or non-speech (e.g., voice activity is not detected, represented as VAD=0) and process the audio frame accordingly. For ease of illustration, audio frames that are not associated with voice activity (e.g., VAD=0) may be described as representing non-speech, silence, and/or noise, whereas audio frames that are associated with voice activity (e.g., VAD=1) may be described as representing speech. However, the disclosure is not limited thereto. Depending on how the VAD is implemented, the VAD data may classify a first audio frame that is below an energy threshold as non-speech, despite the first audio frame including a representation of speech, and/or may classify a second audio frame that is above the energy threshold as corresponding to speech, despite the second audio frame not including a representation of speech, without departing from the disclosure.

As described in greater detail below with regard to FIG. 10, the device 110 may include an interrupt detector 1010 configured to detect an interrupt event by determining that input audio data represents device-directed speech. In some examples, the interrupt detector 1010 may include a VAD to detect speech and a separate component configured to determine that the speech is directed at the device 110 and/or the remote system 120. For example, the interrupt detector 1010 may include a classifier, trained model, and/or the like that receives input data from the VAD and/or other components and determines whether device-directed speech is present. When the interrupt detector 1010 determines that device-directed speech is present, the interrupt detector 1010 generates interrupt detector output indicating that an interrupt event is detected. However, the disclosure is not limited thereto and in other examples the interrupt detector 1010 may include a single component that is configured to detect an interrupt event. For example, the interrupt detector 1010 may modify and/or train a VAD to not only detect that speech is present but also determine that the speech is directed at the device 110/remote system 120 without departing from the disclosure.

The trained model and other models described herein, which are implemented by components of the system, may be trained and operated according to various machine-learning techniques. Such techniques may include, for example, neural networks (such as deep neural networks (DNNs) and/or recurrent neural networks (RNNs)), inference engines, and trained classifiers. Examples of trained classifiers include Support Vector Machines (SVMs), neural networks, decision trees, adaptive boosting (AdaBoost) combined with decision trees, and random forests. For example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

In some embodiments, the trained model is a deep neural network (DNN) that is trained using distributed batch stochastic gradient descent; batches of training data may be distributed to computation nodes where they are fed through the DNN in order to compute a gradient for that batch. The device 110 may update the DNN by computing a gradient by comparing audio data with a stored representation of a particular word and back-propagating error data based thereon. In some embodiments, the DNN includes additional forward pass targets that estimate synthetic gradient values and the device 110 updates the DNN by selecting one or more synthetic gradient values.

As described in greater detail below with regard to FIG. 13, the device 110 may update and/or train the interrupt detector 1010 based on training data generated by the device directed classifier 1020. For example, the device 110 may generate the training data by treating device directed classifier output generated by the device directed classifier as a ground truth. Additionally or alternatively, the system 100 may aggregate gradient(s) and/or training data from multiple devices 110 to improve the interrupt detector 1010. For example, the system 100 may use the gradient(s) and/or training data to train a first model and generate a second model and may then send the second model to the device 110 to update the interrupt detector 1010, although the disclosure is not limited thereto.

The system may operate using various components as described in FIG. 2. The various components may be located on same or different physical devices. Communication between various components may occur directly or across a network(s) 199.

An audio capture component(s), such as a microphone or array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as wakeword detection (e.g., keyword detection). An example wakeword is "Alexa." The disclosure is not limited thereto, however, the device 110 may determine when a user intends to speak an input to the device 110 without using the wakeword detection component 220, as described in greater detail below.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the remote system 120 and/or may be provided by the user 5.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

When the wakeword detection component 220 detects the wakeword, the device 110 may begin transmitting audio data 211, representing the audio 11, to the remote system 120. The audio data 211 may include data corresponding to the wakeword, or the portion of the audio data 211 corresponding to the wakeword may be removed by the device 110 prior to sending the audio data 211 to the remote system 120. The disclosure is not limited thereto, however, and in some examples the device 110 may detect device-directed speech and/or system-directed speech instead of the wakeword without departing from the disclosure. When device-directed speech and/or system-directed speech is detected, the device 110 may begin transmitting audio data 211, representing the audio 11, to the remote system 120.

Upon receipt by the remote system 120, the audio data 211 may be sent to an orchestrator component 230. The orchestrator component 230 may include memory and logic that enable the orchestrator component 230 to transmit various pieces and forms of data to various components of the system, as well as perform other operations.

The orchestrator component 230 sends the audio data 211 to a speech processing component 240. In some examples, the speech processing component 240 may include an ASR component 250 and an NLU component 260 that are configured to process the audio data 211 to generate NLU data. However, the disclosure is not limited thereto and in other examples, the speech processing component 240 may include a spoken language understanding (SLU) component 255 that is configured to process the audio data 211 to generate the NLU data. Additionally or alternatively, the speech processing component 240 may include the ASR component 250, the NLU component 260 and/or the SLU component 255 without departing from the disclosure.

An ASR component 250 of the speech processing component 240 transcribes the audio data 211 into text data. The text data output by the ASR component 250 represents one or more than one (e.g., in the form of an N-best list) hypotheses representing speech contained in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends (either directly or via the orchestrator component 230) the text data generated thereby to an NLU component 260 of the speech processing component 240. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The orchestrator component 230 (or other component) may also track a dialog and dialog state across multiple utterances. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering skill and may prompt the user several times for several utterances to obtain the data from the user needed to complete the pizza order (e.g., toppings, time of delivery, any additional items to order, etc.). Another example may be the user invoking a quiz game skill, where multiple questions are asked of the user and the user responds with utterances that are processed by the system and whose text data is sent to the quiz show skill. Each utterance of the dialog may have a unique utterance ID but may also share a common dialog ID so that the system can process incoming audio data knowing that it is associated with a particular dialog.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 110, the remote system 120, the skill server(s), etc.) to execute the intent. For example, if the text data corresponds to "call John," the NLU component 260 may determine an intent that the system establish a two-way communication channel between the device 110 originating the call and a device of the recipient "John." For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the remote system 120 that is akin to a software application running on a traditional computing device. That is, a skill component 290 may enable the remote system 120 to execute specific functionality in order to perform one or more actions (e.g., provide information to a user, display content to a user, output music, or perform some other requested action). The remote system 120 may be configured with more than one skill component 290. For example, a weather skill component may enable the remote system 120 to provide weather information, a ride sharing skill component may enable the remote system 120 to schedule a trip with respect to a ride sharing service, a restaurant skill component may enable the remote system 120 to order food with respect to a restaurant's online ordering system, a communications skill component may enable the system to perform messaging or multi-endpoint communications, etc. A skill component 290 may operate in conjunction between the remote system 120 and other devices such as the device 110 or skill server(s) 125 in order to complete certain functions. Inputs to a skill component 290 may come from various interactions and input sources.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the remote system 120 (as illustrated in FIG. 2) or may be located at whole (or in part) with one or more separate systems. Unless expressly stated otherwise, reference to a skill, skill device, or skill component may include a skill component operating within the remote system 120 (for example as skill component 290) and/or skill component operating within a system separate from the remote system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the remote system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills and may optionally be in communication with one or more skill server(s) 125. The skill server(s) 125 may each correspond to a particular skill component 290 and may be capable of performing operations to ultimately execute an action. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. In some instances, skill component(s) 290 or a skill server(s) 125 may provide output text data responsive to the present user command.

The remote system 120 may include a text-to-speech (TTS) component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The remote system 120 may include profile storage 270. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s)

of the system(s) and/or user are located. Permissions may be obtained from a user associated with the device 110, or other devices discussed herein.

As described in greater detail below, the remote system 120 may optionally include a detector, such as system directed speech detector 285, to determine if incoming audio data 211 actually includes speech intended for the system as operated by the remote system 120. If the incoming audio data 211 does include system-intended speech (for example a command to the system, response to a previous command, information for the system, a response to a system-managed communication from another user, etc.), then the system may process such speech as it normally would. If, however, the incoming audio data 211 does not include system-intended speech (for example background noise, speech coming from a television or other component, speech between persons not engaging with a local device 110, etc.), then the system may discard that audio data 211 and thus save computing resources by not performing further processing on the audio data 211.

While FIG. 2A illustrates the remote system 120 including the system directed speech detector 285, the disclosure is not limited thereto. In some examples, the device 110 may include the system directed speech detector 285 without departing from the disclosure. Thus, the device 110 and/or the remote system 120 may include the system directed speech detector 285 without departing from the disclosure.

The remote system 120 may include a user recognition component 295 that recognizes one or more users associated with data input to the system. The user recognition component 295 may take as input the audio data 211 and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art. Output of the user recognition component 295 may include a single user identifier corresponding to the most likely user that originated the present user input. Alternatively, output of the user recognition component 295 may include an N-best list of user identifiers with respective scores indicating likelihoods of respective users originating the present user input. The output of the user recognition component 295 may be used to inform NLU processing as well as processing performed by other components of the system.

In some examples, the system 100 may perform remote speech processing using the remote system 120 (e.g., the device 110 sends audio data to the remote system 120 for speech processing). Thus, the device 110 may include a wakeword detection component 220 and/or additional components (e.g., system directed speech detector 285) to identify audio data to send to the remote system 120 for speech processing. However, the disclosure is not limited thereto, and in other examples the system 100 may perform both local and remote speech processing. For example, the device 110 may include a speech processing component 240 configured to perform limited speech processing prior to sending audio data to the remote system 120 for remote speech processing. The ASR data generated by the limited speech processing component 240 may be used to identify device-directed speech, although the disclosure is not limited thereto. Finally, in some examples the system 100 may perform full local speech processing without departing from the disclosure. For example, the device 110 may include a speech processing component 240 configured to perform speech processing locally on the device 110, without sending audio data to the remote system 120, without departing from the disclosure.

Figure 2B:
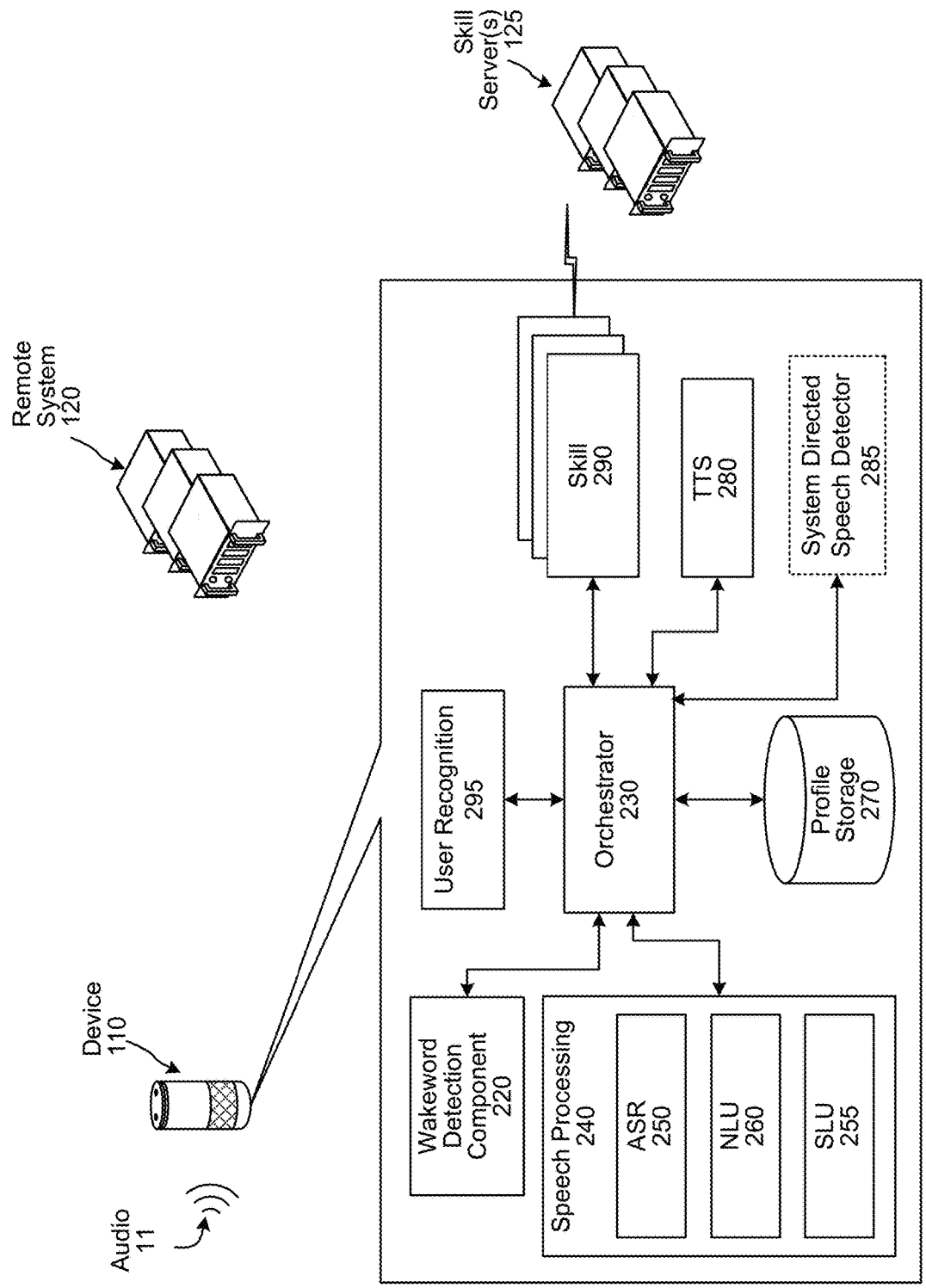

As the device 110 may be configured to perform local speech processing, FIG. 2B illustrates the device including all of the same components as the remote system 120, and a description of these components with regard to the remote system 120 may also apply to the device 110 without departing from the disclosure. However, the disclosure is not limited thereto and the device 110 may omit some of the components illustrated in FIG. 2B without departing from the disclosure. For example, the device 110 may include the wakeword detection component 220, the speech processing component 240, and the system directed speech detector 285, but may omit the orchestrator component 230, the profile storage component 270, the TTS component 280, the skill component 290, and/or the user recognition component 295 without departing from the disclosure. While not illustrated in FIG. 2B, the device 110 may send audio data to the remote system 120 without departing from the disclosure.

Figure 3A:
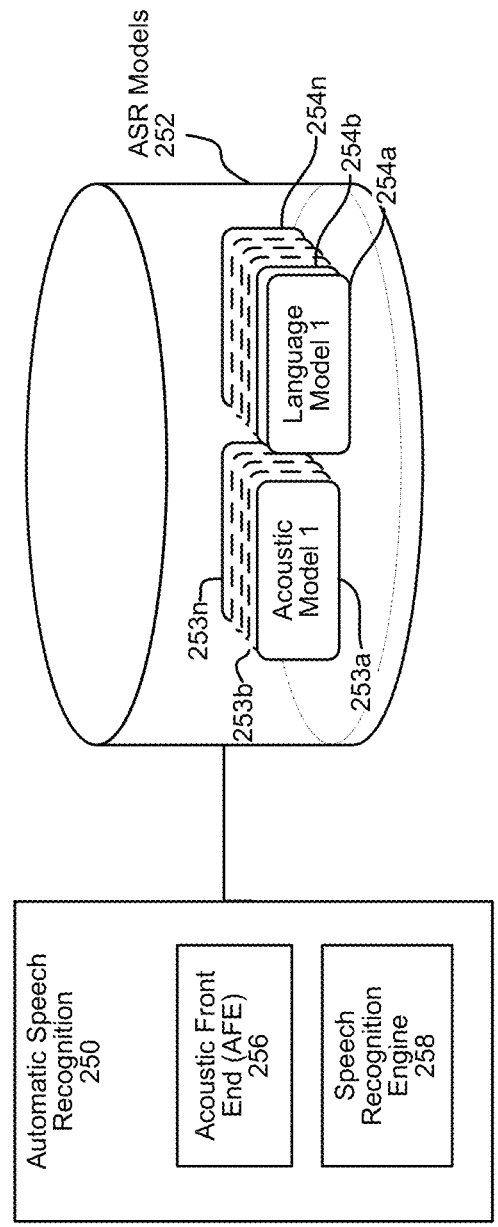
FIG. 3A is a conceptual diagram of how automatic speech recognition is performed according to embodiments of the present disclosure.

Example components for performing automatic speech recognition (ASR) are shown in FIG. 3A. As illustrated in FIG. 3A, an ASR component 250 may convert the audio data 211 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, confusion network, etc. may be sent to NLU component 260 for further processing, such as conversion of the text into commands for execution, either by the device 110, by the remote system 120, or by another device (such as a server running a specific application like a search engine, etc.).

Figure 3B:
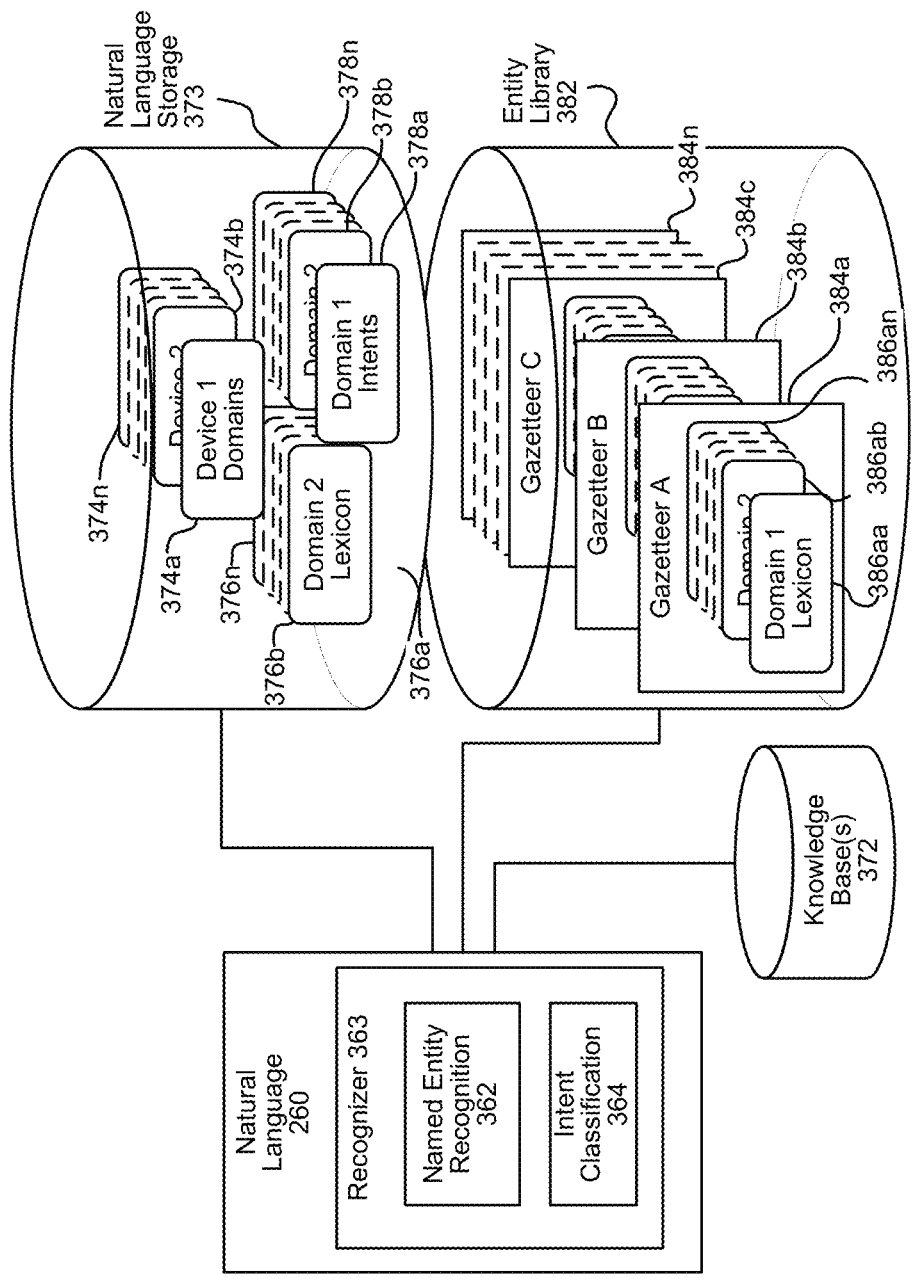
FIG. 3B is a conceptual diagram of how natural language processing is performed according to embodiments of the present disclosure.

FIG. 3B illustrates how natural language processing is performed on audio data. Generally, the natural language component 260 attempts to make a semantic interpretation of text represented in text data (e.g., ASR results 541 output by the speech recognition component 250). That is, the natural language component 260 determines the meaning behind the text represented in text data based on the individual words. The natural language component 260 interprets text to derive an intent or a desired action from the user as well as the pertinent pieces of information in the text that allow a device (e.g., device 110) to complete that action.

The natural language component 260 may process text data including several textual interpretations of a single utterance. For example, if the speech recognition component 250 outputs text data including an N-best list of textual interpretations, the natural language component 260 may process the text data with respect to all (or a portion of) the textual interpretations represented therein.

The natural language component 260 may include one or more recognizers 363. Each recognizer 363 may be associated with a different "domain." A domain may correspond to a common group of information or activities, such as weather, music, video, communications, shopping, etc. The natural language component 260 may determine a domain potentially associated with a textual interpretation represented in text data input thereto in order to determine the proper recognizer 363 to process the textual interpretation. The natural language component 260 may determine a single textual interpretation is potentially associated with more than one domain. Multiple recognizers 263 may be functionally linked (e.g., a telephony/communications recognizer and a calendaring recognizer may utilize data from the same contact list).

If the natural language component 260 determines a specific textual interpretation is potentially associated with multiple domains, the recognizers 363 associated with the domains may process the specific textual interpretation in parallel. For example, if a specific textual interpretation potentially implicates both a communications domain and a music domain, a recognizer associated with the communications domain may process the textual interpretation in parallel, or substantially in parallel, with a recognizer associated with the music domain processing the textual interpretation. The output generated by each recognizer 363 may be scored, with the overall highest scored output from all recognizers ordinarily being selected to be the correct result.

The natural language component 260 may communicate with various storages to determine the potential domain(s) associated with a textual interpretation. The natural language component 260 may communicate with the natural language storage 373, which includes a databases of devices (374a-374n) identifying domains associated with specific devices. For example, the device 110 may be associated with domains for music, calendaring, contact lists, device-specific communications, etc. In addition, the natural language component 260 may communicate with an entity library 382, which includes database entries about specific services on a specific device, either indexed by Device ID, Speaker ID, or Household ID, or some other indicator.

Each recognizer 363 may include a named entity recognition (NER) component 362. The NER component 362 attempts to identify grammars and lexical information that may be used to construe meaning with respect to a textual interpretation input therein. The NER component 362 identifies portions of text represented in text data input into the natural language component 260 that correspond to a named entity that may be recognizable by the system. The NER component 362 (or other component of the natural language component 260) may also determine whether a word refers to an entity that is not explicitly mentioned in the utterance text, for example "him," "her," "it" or other anaphora, exophora or the like.

Each recognizer 363, and more specifically each NER component 362, may be associated with a particular grammar model and/or database 376, a particular set of intents/actions 378, and a particular personalized lexicon 386. Each gazetteer 384 may include domain-indexed lexical information associated with a particular user and/or device. For example, the Gazetteer A (384a) includes domain-index lexical information 386aa to 386an. A user's music-domain lexical information might include album titles, artist names, and song names, for example, whereas a user's contact-list lexical information might include the names of contacts. Since every user's music collection and contact list is presumably different, this personalized information improves entity resolution.

An NER component 362 applies grammar models 376 and lexical information 386 associated with the domain (associated with the recognizer 363 implementing the NER component 362) to determine a mention one or more entities in a textual interpretation input therein. In this manner, the NER component 362 identifies "slots" (i.e., particular words in a textual interpretation) that may be needed for later command processing. The NER component 362 may also label each slot with a type of varying levels of specificity (e.g., noun, place, city, artist name, song name, etc.).

Each grammar model 376 includes the names of entities (i.e., nouns) commonly found in speech about the particular domain (i.e., generic terms) to which the grammar model 376 relates, whereas the lexical information 386 is personalized to the user(s) and/or the device from which the audio data 211 originated. For example, a grammar model 376 associated with a shopping domain may include a database of words commonly used when people discuss shopping.

A downstream process called named entity resolution actually links a portion of text to an actual specific entity known to the system. To perform named entity resolution, the natural language component 260 may utilize gazetteer information (384a-384n) stored in an entity library storage 382. The gazetteer information 384 may be used to match text represented in text data output by the speech recognition component 250 with different entities, such as song titles, contact names, etc. Gazetteers may be linked to users (e.g., a particular gazetteer may be associated with a specific user's music collection), may be linked to certain domains (e.g., shopping, music, video, communications, etc.), or may be organized in a variety of other ways.

Each recognizer 263 may also include an intent classification (IC) component 364. The IC component 364 parses an input textual interpretation to determine an intent(s) of the domain associated with the recognizer 363 that potentially corresponds to the textual interpretation. An intent corresponds to an action to be performed that is responsive to the command represented by the textual interpretation.

The IC component 364 may communicate with a database 378 of words linked to intents. For example, a music intent database may link words and phrases such as "quiet," "volume off," and "mute" to a "mute" intent. The IC component 364 identifies potential intents by comparing words in the textual interpretation to the words and phrases in an intents database 378 associated with the domain that is associated with the recognizer 363 implementing the IC component 364.

The intents identifiable by a specific IC component 364 are linked to domain-specific (i.e., the domain associated with the recognizer 363 implementing the IC component 364) grammar frameworks 376 with "slots" to be filled. Each slot of a grammar framework 376 corresponds to a portion of the text interpretation that the system believes corresponds to an entity. For example, a grammar framework 376 corresponding to a <PlayMusic> intent may correspond to textual interpretation sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse a textual interpretation to identify words as subject, object, verb, preposition, etc. based on grammar rules and/or models prior to recognizing named entities in the textual interpretation. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 associated with the domain associated with the recognizer 363 implementing the NER component 362, attempting to match words and phrases in the textual interpretation the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse a textual interpretation heuristic grammar rules, or a model may be constructed using techniques such as hidden Markov models, maximum entropy models, log linear models, conditional random fields (CRF), and the like. For example, an NER component 362 implemented by a music domain recognizer 363 may parse and tag a textual interpretation corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music domain, which an IC component 364 (also implemented by the music domain recognizer 363) may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity) of the textual interpretation.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve the a slot/field using gazetteer information, the NER component 362 may search the database of generic words associated with the domain (in the knowledge base 372). For example, if the textual interpretation was "play songs by the rolling stones," after failing to determine an album name or song name called "songs" by "the rolling stones," the NER component 362 may search the domain vocabulary for the word "songs." In the alternative, generic words may be checked before the gazetteer information, or both may be tried, potentially producing two different results.

The natural language component 260 may tag the textual interpretation to attribute meaning to the textual interpretation. For example, the natural language component 260 may tag "play mother's little helper by the rolling stones" as: {domain} Music, {intent} Play Music, {artist name} rolling stones, {media type} SONG, and {song title} mother's little helper. For further example, the natural language component 260 may tag "play songs by the rolling stones" as: {domain} Music, {intent} Play Music, {artist name} rolling stones, and {media type} SONG.

Each recognizer 363 may output data corresponding to a single textual interpretation or to an N-best list of textual interpretations. The natural language component 260 may compile the output data of the recognizers 363 into a single cross-domain N-best list, and may send cross-domain N-best list data 440 (representing the cross-domain N-best list) to a pruning component 450 (as illustrated in FIG. 4). The tagged textual interpretations in the cross-domain N-best list data 440 may each be associated with a respect score indicating the tagged textual interpretation corresponds to the domain associated with the recognizer 363 from which the tagged textual interpretation was output. For example, the cross-domain N-best list data 440 may be represented as:

[0.95] Intent: <PlayMusic> ArtistName: Lady Gaga SongName: Poker Face

[0.70] Intent: <Play Video> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 450 creates a new, shorter N-best list (i.e., represented in cross-domain N-best list data 460 discussed below) based on the cross-domain N-best list data 440. The pruning component 450 may sort the tagged textual interpretations represented in the cross-domain N-best list data 440 according to their respective scores.

The pruning component 450 may perform score thresholding with respect to the cross-domain N-best list data 440. For example, the pruning component 450 may select textual interpretations represented in the cross-domain N-best list data 440 associated with a score satisfying (e.g., meeting and/or exceeding) a score threshold. The pruning component 450 may also or alternatively perform number of textual interpretation thresholding. For example, the pruning component 450 may select the top scoring textual interpretation(s) associated with each different domain represented in the cross-domain N-best list data 440, with the new cross-domain N-best list data 460 including a total number of textual interpretations meeting or falling below a threshold number of textual interpretations. The purpose of the pruning component 450 is to create a new list of top scoring textual interpretations so that downstream (more resource intensive) processes may only operate on the tagged textual interpretations that most likely correspond to the command input to the system.

The natural language component 260 may also include a light slot filler component 452. The light slot filler component 452 can take text from slots represented in the textual interpretation(s) output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a textual interpretation includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-domain N-best list data 460.

The natural language component 260 sends the cross-domain N-best list data 460 to an entity resolution component 470. The entity resolution component 470 can apply rules or other instructions to standardize labels or tokens from previous stages into an intent/slot representation. The precise transformation may depend on the domain (e.g., for a travel domain the entity resolution component 470 may transform a text mention of "Boston airport" to the standard BOS three-letter code referring to the airport). The entity resolution component 470 can refer to an authority source (e.g., a knowledge base) that is used to specifically identify the precise entity referred to in each slot of each textual interpretation represented in the cross-domain N-best list data 460. Specific intent/slot combinations may also be tied to a particular source, which may then be used to resolve the text. In the example "play songs by the stones," the entity resolution component 470 may reference a personal music catalog, Amazon Music account, user profile 602 (described herein), or the like. The entity resolution component 470 may output data including an altered N-best list that is based on the cross-domain N-best list represented in the cross-domain N-best list data 460, but also includes more detailed information (e.g., entity IDs) about the specific entities mentioned in the slots and/or more detailed slot data that can eventually be used by a skill component 290 which may be incorporated into the remote system 120 components or pipeline or may be on a separate device(s) in communication with the remote system 120. The natural language component 260 may include multiple entity resolution components 470 and each entity resolution component 470 may be specific to one or more domains.

The entity resolution component 470 may not be successful in resolving every entity and filling every slot represented in the N-best list represented in the cross-domain N-best list data 460. This may result in the entity resolution component 470 outputting incomplete results. The natural language component 260 may include a final ranker component 490, which may consider such errors when determining how to rank the tagged textual interpretations for potential execution. For example, if a book domain recognizer 363 outputs a tagged textual interpretation including a <ReadBook> intent flag, but the entity resolution component 470 cannot find a book with a title matching the text of the item, the final ranker component 490 may re-score that particular tagged textual interpretation to be given a lower score. The final ranker component 490 may also assign a particular confidence to each tagged textual interpretation input therein. The confidence score of a particular tagged textual interpretation may be affected by whether the tagged textual interpretation has unfilled slots. For example, if a tagged textual interpretation associated with a first domain includes slots that are all filled/resolved, that tagged textual interpretation may be associated with a higher confidence than another tagged textual interpretation including at least some slots that are unfilled/unresolved.

The final ranker component 490 may apply re-scoring, biasing, or other techniques to obtain the most preferred tagged and resolved textual interpretation. To do so, the final ranker component 490 may consider not only the data output by the entity resolution component 470, but may also consider other data 491. The other data 491 may include a variety of information. For example, the other data 491 may include skill rating or popularity data. For example, if one skill (e.g., application) has a particularly high rating, the final ranker component 490 may increase the score of a textual interpretation(s) associated with or otherwise invoking that particular skill. The other data 491 may also include information about skills that have been specifically enabled by the user. For example, the final ranker component 490 may assign higher scores to textual interpretations associated with or otherwise invoking enabled skills than textual interpretations associated with or otherwise invoking non-enabled skills. User history may also be considered, such as if the user regularly uses a particular supplemental skill or does so at particular times of day. Date, time, location, weather, type of device 110, user ID, context, and other information may also be considered. For example, the final ranker component 490 may consider when any particular skills are currently active (e.g., music being played, a game being played, etc.).

Following final ranking, the natural language component 260 may output natural language output data 485. The natural language component 260 may be sent to the orchestrator component 230, which sends the natural language output data 485 to an appropriate skill component 290 (e.g., one configured to execute a command based on the textual interpretation represented in the natural language output data 485). The natural language output data 485 may include an indicator of the intent of the textual interpretation along with data associated with the intent, for example an indication that the intent is <PlayMusic> and the music to be played is "Adele." Multiple instances of natural language output data (e.g., 485a-485n) may be output for a given set of text data input into the natural language component 260.

The skill component(s) 290 provide the device 110/ remote system 120 with content responsive to the natural language output data 485 received thereby. If the content is text data that needs to be converted to speech, the orchestrator component 230 sends the content text data to the text-to-speech component 280.

As noted above, many commands received by the system may have initiated with an utterance that included the wakeword, as detected by wakeword component 220 of device 110 (explained above). In such instances, the audio data 211 corresponding to the utterance may be sent (for example by the orchestrator 230) directly to the speech processing component 240 for processing, and eventual execution, of the command in the utterance. In other circumstances, however, including those discussed below, the device 110 may send audio data to the remote system 120 even without the device 110 detecting a wakeword. For example, as explained below, in certain circumstances the remote system 120 may instruct a device 110 to send to the remote system 120 audio data corresponding to captured audio even if no wakeword is detected. In such circumstances, the system 100 may optionally operate a detector, such as system directed speech detector 285, to determine if incoming audio data 211 actually includes speech intended for the system 100. If the incoming audio data 211 does include system-intended speech (for example a command to the system, response to a previous command, information for the system, a response to a system-managed communication from another user, etc.), then the system 100 may process such speech as it normally would. If, however, the incoming audio data 211 does not include system-intended speech (for example background noise, speech coming from a television or other component, speech between persons not engaging with a local device 110, etc.), then the system 100 may discard that audio data 211 and thus save computing resources by not performing further processing on the audio data 211. While the system directed speech detector 285 may not be as necessary when the device 110 has first detected a wakeword prior to sending the audio data 211, the system directed speech detector 285 may save computing resources in filtering out non-wakeword non-system directed speech from non-wakeword system directed speech. (Though the system directed speech detector 285 may also be used as a wakeword confirmation component and thus may operate on audio data 211 that was sent post-wakeword detection and/or on audio data 211 that was sent without wakeword detection.)

While the above description refers to the remote system 120 instructing the device 110 to send the audio data to the remote system 120 even if no wakeword is detected, the disclosure is not limited thereto. In some examples, the system directed speech detector 285 may be located on the device 110 and the device 110 may determine to send audio data to the remote system 120 (e.g., without an explicit instruction from the remote system 120 to do so), even if no wakeword is detected, without departing from the disclosure. Additionally or alternatively, the system directed speech detector 285 and the speech processing component 240 may be located on the device 110 and the device 110 may perform speech processing on the audio data (e.g., without sending the audio data to the remote system 120), even if no wakeword is detected, without departing from the disclosure.

Figure 5B:
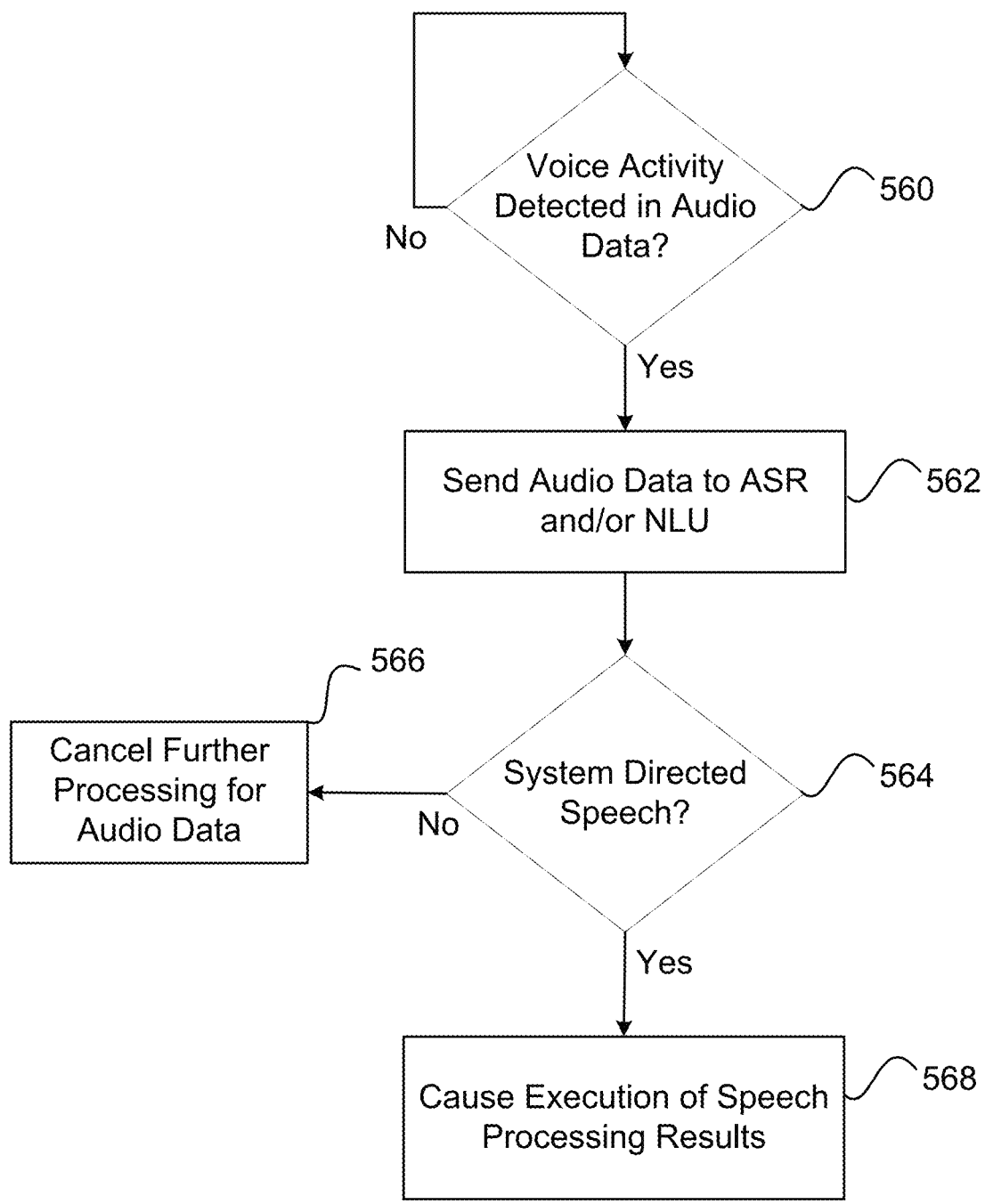
FIG. 5B is a conceptual diagram illustrating a system operating to detect if input audio data includes system directed speech according to embodiments of the present disclosure.

Configuration and operation of the system directed speech detector 285 is illustrated in FIGS. 5A and 5B. As shown in FIG. 5A, the system directed speech detector 285 may include a number of different components. First, the system directed speech detector 285 may include a voice activity detector (VAD) 520. The VAD 520 may operate to detect whether the incoming audio data 211 includes speech or not. The VAD output 521 may be a binary indicator. Thus, if the incoming audio data 211 includes speech, the VAD 520 may output an indicator 521 that the audio data 211 does includes speech (e.g., a 1) and if the incoming audio data 211 does not includes speech, the VAD 520 may output an indicator 521 that the audio data 211 does not includes speech (e.g., a 0). The VAD output 521 may also be a score (e.g., a number between 0 and 1) corresponding to a likelihood that the audio data 211 includes speech. The VAD 520 may also perform start-point detection as well as end-point detection where the VAD 520 determines when speech starts in the audio data 211 and when it ends in the audio data 211. Thus the VAD output 521 may also include indicators of a speech start point and/or a speech endpoint for use by other components of the system. (For example, the start-point and end-points may demarcate the audio data 211 that is sent to the speech processing component 240.) The VAD output 521 may be associated with a same unique ID as the audio data 211 for purposes of tracking system processing across various components.

The VAD 520 may operate using a variety of VAD techniques, including those described above with regard to VAD operations performed by device 110. The VAD may be configured to be robust to background noise so as to accurately detect when audio data actually includes speech or not. The VAD 520 may operate on raw audio data 211 such as that sent by device 110 or may operate on feature vectors or other data representing the audio data 211. For example, the VAD 520 may take the form of a deep neural network (DNN) and may operate on a single feature vector representing the entirety of audio data 211 received from the device or may operate on multiple feature vectors, for example feature vectors representing frames of audio data where each frame covers a certain amount of time of audio data (e.g., 25 ms). The VAD 520 may also operate on other data 581 that may be useful in detecting voice activity in the audio data 211. For example, the other data 581 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 211 to determine if that voice matches a voice in the reference section of speech. If the voices match, that may be an indicator to the VAD 520 that speech was detected. If not, that may be an indicator to the VAD 520 that speech was not detected. (For example, referring to FIG. 7 below, a representation may be taken of voice data in the first input audio data which may then be compared to the second input audio data to see if the voices match. If they do (or do not) that information may be considered by the VAD 520.) The VAD 520 may also consider other data when determining if speech was detected. The VAD 520 may also consider speaker ID information (such as may be output by user recognition component 295), directionality data that may indicate what direction (relative to the capture device 110) the incoming audio was received from. Such directionality data may be received from the device 110 and may have been determined by a beamformer or other component of device 110. The VAD 520 may also consider data regarding a previous utterance which may indicate whether the further audio data received by the system is likely to include speech. Other VAD techniques may also be used.

If the VAD output 521 indicates that no speech was detected the system (through orchestrator 230 or some other component) may discontinue processing with regard to the audio data 211, thus saving computing resources that might otherwise have been spent on other processes (e.g., ASR for the audio data 211, etc.). If the VAD output 521 indicates that speech was detected, the system may make a determination as to whether the speech was or was not directed to the speech-processing system. Such a determination may be made by the system directed detector 540. The system directed detector 540 may include a trained model, such as a DNN, that operates on a feature vector which represent certain data that may be useful in determining whether or not speech was directed to the system. To create the feature vector operable by the system directed detector 540, a feature extractor 530 may be used. The feature extractor 530 may input ASR results 541 which include results from the processing of the audio data 211 by the speech recognition component 250.

The ASR results 541 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 541 may include a trellis, which may include a raw search graph as scored during ASR decoding. The ASR results 541 may also include a lattice, which may be a trellis as scored that has been pruned to remove certain hypotheses that do not exceed a score threshold or number of hypotheses threshold. The ASR results 541 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 541 may also include corresponding respective scores (such as for a trellis, lattice, confusion network, individual hypothesis, N-best list, etc.)

The ASR results 541 (or other data 591) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 250 being less confident about its best hypothesis, which in turn may correlate to detected speech not being device directed. The entropy may be a feature included in other data 591 to be considered by the system directed detector 540.

The system may also determine and consider ASR decoding costs, which may include features from Viterbi decoding costs of the ASR. Such features may indicate how well the input acoustics and vocabulary match with the acoustic models 253 and language models 254. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 250 is less confident about the top hypothesis, which may correlate to detected speech not being device directed. Other such features or data from the ASR results 541 may also be used as other data 591.

The ASR results 541 may be included in a system directed detector (SDD) feature vector 531 that can be used to determine whether speech was system-directed. Such ASR results may be helpful in determining if speech was system-directed. For example, if ASR results include a high scoring single hypothesis, that may indicate that the speech represented in the audio data 211 was directed at, and intended for, the device 110. If, however, ASR results do not include a single high scoring hypothesis, but rather many lower scoring hypotheses, that may indicate some confusion on the part of the speech recognition component 250 and may also indicate that the speech represented in the audio data 211 was not directed at, nor intended for, the device 110.

The ASR results 541 may include complete ASR results, for example ASR results corresponding to all speech between a startpoint and endpoint (such as a complete lattice, etc.). In this configuration the system may wait until all ASR processing for a certain input audio has been completed before operating the feature extractor 530 and system directed detector 540. Thus the system directed detector 540 may receive a SDD feature vector 531 that includes all the representations of the audio data 211 created by the feature extractor 530. The system directed detector 540 may then operate a trained model (such as a DNN) on the SDD feature vector 531 to determine a score corresponding to a likelihood that the audio data 211 includes a representation of system-directed speech. If the score is above a threshold, the system directed detector 540 may determine that the audio data 211 does include a representation of system-directed speech. The SDD result 551 may include an indicator of whether the audio data includes system-directed speech, a score, and/or some other data.

The ASR results 541 may also include incomplete ASR results, for example ASR results corresponding to only some speech between a between a startpoint and endpoint (such as an incomplete lattice, etc.). In this configuration the feature extractor 530/system directed detector 540 may be configured to operate on incomplete ASR results 541 and thus the system directed detector 540 may be configured to output an SSD result 551 that provides an indication as to whether the portion of audio data processed (that corresponds to the incomplete ASR results) corresponds to system directed speech. The system may thus be configured to perform ASR at least partially in parallel with the system directed detector 540 to process ASR result data as it is ready and thus continually update an SDD result 551. Once the system directed speech detector 285 has processed enough ASR results and/or the SDD result 551 exceeds a threshold, the system may determine that the audio data 211 includes system-directed speech. Similarly, once the system directed speech detector 285 has processed enough ASR results and/or the SDD result 551 drops below another threshold, the system may determine that the audio data 211 does not include system-directed speech.

The SDD result 551 may be associated with a same unique ID as the audio data 211 and VAD output 521 for purposes of tracking system processing across various components.

The feature extractor 530 may also incorporate in an SDD feature vector 531 representations of other data 591. Other data 591 may include, for example, word embeddings from words output by the speech recognition component 250 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 530 processing and representing a word embedding in an SDD feature vector 531 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 591 may also include, for example, NLU output from the natural language 260 component may be considered. Thus, if natural language output data 485 indicates a high correlation between the audio data 211 and an out-of-domain indication (e.g., no intent classifier scores from ICs 364 or overall domain scores from recognizers 363 reach a certain confidence threshold), this may indicate that the audio data 211 does not include system-directed speech. Other data 591 may also include, for example, an indicator of a user/speaker as output user recognition component 295. Thus, for example, if the user recognition component 295 does not indicate the presence of a known user, or indicates the presence of a user associated with audio data 211 that was not associated with a previous utterance, this may indicate that the audio data 211 does not include system-directed speech. The other data 591 may also include an indication that a voice represented in audio data 211 is the same (or different) as the voice detected in previous input audio data corresponding to a previous utterance.

Other data 591 may also include image data. For example, if image data is detected from one or more devices that are nearby to the device 110 (which may include the device 110 itself) that captured the audio data being processed using the system directed speech detector (285), the image data may be processed to determine whether a user is facing an audio capture device for purposes of determining whether speech is system-directed.

Other data 591 may also dialog history data. For example, the other data 591 may include information about whether a speaker has changed from a previous utterance to the current audio data 211, whether a topic of conversation has changed from a previous utterance to the current audio data, how NLU results from a previous utterance compare to NLU results obtained using the current audio data 211, other system context information. The other data 591 may also include an indicator as to whether the audio data 211 was received as a result of a wake command or whether the audio data 211 was sent without the device 110 detecting a wake command (e.g., the device 110 being instructed by remote system 120 and/or determining to send the audio data without first detecting a wake command).

Other data 591 may also include information from the user profile.

Other data 591 may also include direction data, for example data regarding a direction of arrival of speech detected by the device, for example a beam index number, angle data, or the like. If second audio data is received from a different direction than first audio data (such as the audio data explained below in reference to FIGS. 7A-7C), then the system may be less likely to declare the second audio data to include system-directed speech since it is originating from a different location.

Other data 591 may also include acoustic feature data such as pitch, prosody, intonation, volume, or other data descriptive of the speech in the audio data 211. As a user may use a different vocal tone to speak with a machine than with another human, acoustic feature information may be useful in determining if speech is device-directed.

Other data 591 may also include an indicator that indicates whether the audio data 211 includes a wakeword. For example, if a device 110 detects a wakeword prior to sending the audio data 211 to the remote system 120, the device 110 may send along an indicator that the device 110 detected a wakeword in the audio data 211. In another example, the remote system 120 may include another component that processes incoming audio data 211 to determine if it includes a wakeword. If it does, the component may create an indicator indicating that the audio data 211 includes a wakeword. The indicator may then be included in other data 591 to be incorporated in the feature vector 531 and/or otherwise considered by the system directed detector 540.

Other data 591 may also include device history data such as information about previous operations related to the device 110 that sent the audio data 211. For example, the other data 591 may include information about a previous utterance that was just executed, where the utterance originated with the same device 110 as a current utterance and the previous utterance was within a certain time window of the current utterance. Device history data may be stored in a manner associated with the device identifier (which may also be included in other data 591), which may also be used to track other information about the device, such as device hardware, capability, location, etc.

The other data 581 used by the VAD 520 may include similar data and/or different data from the other data 591 used by the feature extractor 530. The other data 581/591 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed detector 540 and/or the VAD 520) may be based on the data from the previous utterance. For example, a score threshold (for the system directed detector 540 and/or the VAD 520) may be based on acoustic data from a previous utterance.

The feature extractor 530 may output a single SDD feature vector 531 for one utterance/instance of input audio data 511. The SDD feature vector 531 may consistently be a fixed length, or may be a variable length vector depending on the relevant data available for particular audio data 211. Thus, the system directed detector 540 may output a single SDD result 551 per utterance/instance of input audio data 511. The SDD result 551 may be a binary indicator. Thus, if the incoming audio data 211 includes system-directed speech, the system directed detector 540 may output an indicator 551 that the audio data 211 does includes system-directed speech (e.g., a 1) and if the incoming audio data 211 does not includes system-directed speech, the system directed detector 540 may output an indicator 551 that the audio data 211 does not system-directed includes speech (e.g., a 0). The SDD result 551 may also be a score (e.g., a number between 0 and 1) corresponding to a likelihood that the audio data 211 includes system-directed speech. Although not illustrated in FIG. 5A, the flow of data to and from the system directed speech detector 285 may be managed by the orchestrator 230 or by one or more other components.

The trained model(s) of the system directed detector 540 may be trained on many different examples of SDD feature vectors that include both positive and negative training samples (e.g., samples that both represent system-directed speech and non-system directed speech) so that the DNN and/or other trained model of the system directed detector 540 may be capable of robustly detecting when speech is system-directed versus when speech is not system-directed.

The process for determine whether incoming audio data 211 includes system-directed speech (for example using system directed speech detector 285) is illustrated in FIG. 5B. As shown, the system detects (560) if there is voice activity in the detected audio data 211, for example using VAD 520. If there is no voice activity detected (560: No) (e.g. VAD output 521 indicates no voice activity), the system may wait and determine whether there is voice activity detected in subsequent incoming audio data (e.g., loop and repeat step 560). While not illustrated in FIG. 5B, if there is no voice activity detected in a segment of the incoming audio data 211, then the system may not perform additional processing (e.g., ASR and/or NLU processing) on the segment and may discard the segment of the incoming audio data.

If there is voice activity detected (560: Yes) (e.g. VAD output 521 indicates voice activity), the system may send (562) the audio data for ASR/NLU processing by the speech processing components 240. The system then determines whether (564) detected speech is system-directed, for example using the feature extractor 5 and system directed detector 540. If the speech is not determined to be system-directed (564: No) (e.g. SDD result 551 indicates no system-directed speech), the system may cancel (566) further processing for the audio data. If the speech is determined to be system-directed (564: Yes) (e.g. SDD result 551 indicates system-directed speech), the system may cause (568) execution of speech processing results which may include continuing speech processing (e.g., NLU processing) if not already complete, sending speech processing results to further components such as a skill component 290 for further action, etc. The system may also update the system context to reflect actions taken by the system since detecting the audio data 211 and processing the various ASR and/or NLU results.

Figure 6:
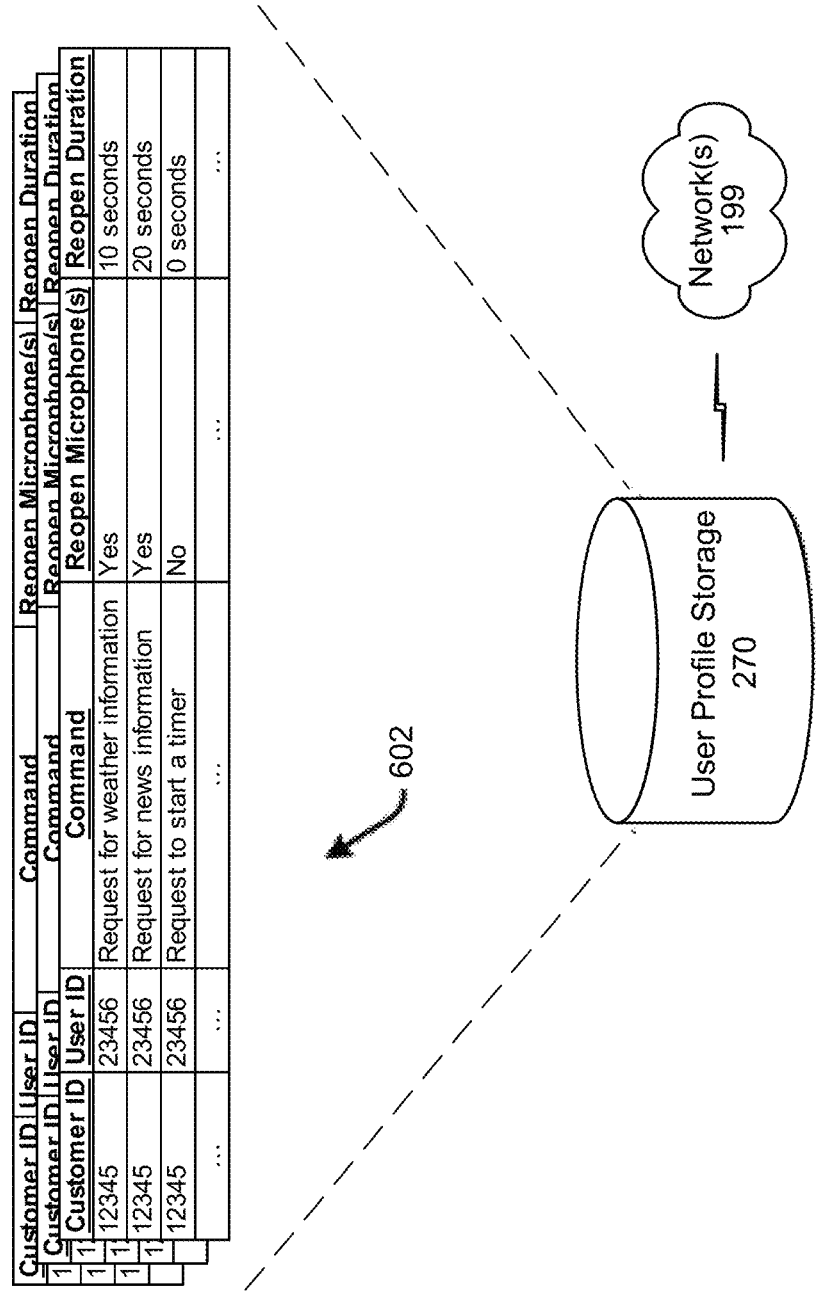
FIG. 6 illustrates data stored and associated with user profiles according to embodiments of the present disclosure.

FIG. 6 illustrates the user profile storage 270 that includes data regarding customer profiles as well as individual user profiles 602. For illustration, as shown in FIG. 6, each user profile 602 may include information indicating system executable commands that are enabled with respect to the user profile. Each enabled command may be associated with a user preference regarding whether a device should remain connected to the server after content responsive to the command is output by the device. Moreover, an enabled command associated with a user preference indicating a device's connection to the server may additionally be associated with a user preference regarding how long the device should be connected to the server prior to the device re-entering wakeword detection mode and again requiring the user speak a wakeword to input a command. A user profile may also include data regarding other user specific features such as likelihood of the user speaking multiple commands in succession, the user's dialog history regarding previous utterances spoken to the system, etc. Each user profile 602 may additionally include other data not explicitly illustrated.

A device 110 may be configured, under certain circumstances, to capture audio using a microphone and begin sending audio data corresponding to the audio to the remote system 120 without detecting a wake command. For example, if the system determines that the user is likely to speak a command to the system, the remote system 120 may send an instruction to a local device 110 to enable a microphone and send audio data to the remote system 120, even without first detecting a wake command. A determination of such a likelihood may happen at a certain time, with certain users, under certain conditions, etc. In one example, a user may speak a first utterance that includes a wakeword, and based on the first utterance, the system may direct a device 110 to allow audio data to continue to be sent to the remote system 120, even after completion of execution of a command of the first utterance.

Figure 7A:
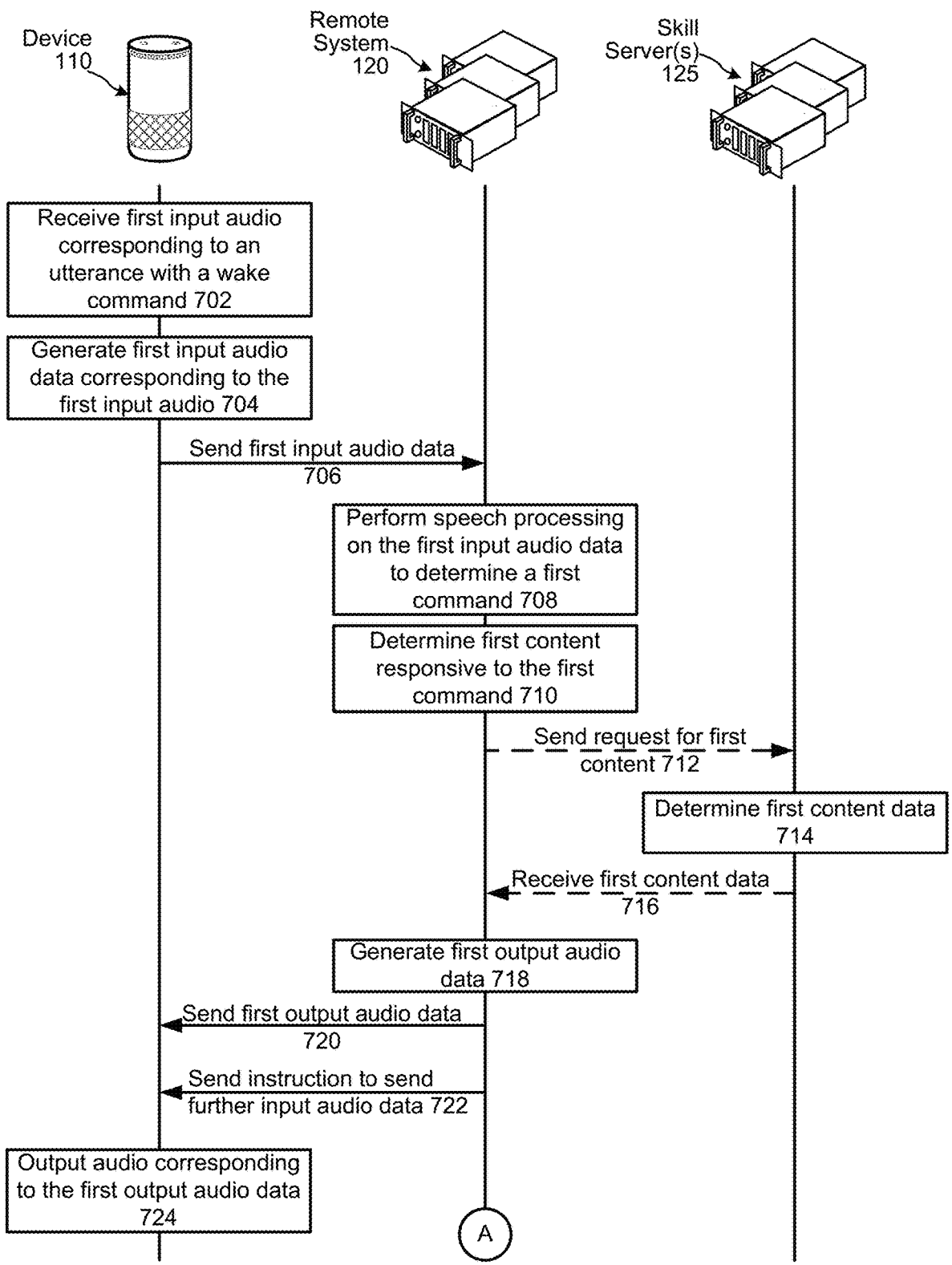

FIGS. 7A-7C are signal flow diagrams illustrating the processing performed when a remote system detects system-directed speech represented in input audio data and performs speech processing on the input audio data according to embodiments of the present disclosure. As illustrated in FIGS. 7A-7C, the system 100 may receive a first utterance, process that utterance and then subsequently instruct the device 110 to continue to send further audio data to the remote system 120, even absent a wake command. The system 100 then processes the additional audio data from the device 110 to determine that it includes system-directed speech.

As illustrated in FIG. 7A, a device 110 receives (702) first input audio corresponding to an utterance that includes a wakeword. The device 110 generates (704) first input audio data corresponding to the first input audio and sends (706) the first input audio data to the remote system 120.

The remote system 120 performs (708) speech processing on the first input audio data to determine a first command. The remote system 120 then determines (710) first content responsive to the first command. The remote system 120 may determine the first content using data available within the remote system 120. Alternatively, the remote system 120 may determine the remote system 120 should invoke a skill component 290 associated with a skill server(s) 125 (e.g., content source server(s)) to determine the first content. In such a situation, the remote system 120 may send (712) a request for content responsive to the first command to the skill server(s) 125. The skill server(s) 125 may determine (714) first content data corresponding to the first content and the remote system 120 may receive (716) the first content data from the skill server(s) 125. Additionally or alternatively, the remote system 120 may determine the first content data without departing from the disclosure.

If content data is received as text data, the remote system 120 may perform text-to-speech processing on the text data to generate (718) first output audio data and send (720) the first output audio data to the device. In some examples, the remote system 120 may alternatively receive the first content data as audio data, in which case the remote system may 120 simply send the received first content data to the device 110 as the first output audio data in step 720. Additionally or alternatively, the remote system 120 may send the first content data to the device 110 and the device 110 may perform text-to-speech processing on the first content data to generate the first output audio data without departing from the disclosure.

The remote system 120 may also send (722) an instruction to the device 110 to send further input audio data corresponding to further captured audio without detecting a wake command even though the system does not need further user input to complete processing of the initial command. For example, the instruction may instruct the device 110 to send the first thirty (30) seconds of audio without detecting a wake command. However, the disclosure is not limited thereto and the duration of time may vary (e.g., 10 seconds, 15 seconds, etc.) without departing from the disclosure. For example, the remote system 120 may determine the duration of time based on the first command, the first output audio data, and/or the like without departing from the disclosure. Additionally or alternatively, the instruction may instruct the device 110 to stop sending audio data if noise above a certain volume is not heard after a certain amount of time. In some examples, the instruction may instruct the device 110 to send further input audio data until the remote system 120 sends a second instruction to stop sending the further input audio data. For example, the device 110 may send further input audio data until the device 110 receives the second instruction and/or the duration of time has elapsed (e.g., timeout event occurs), although the disclosure is not limited thereto.

The device 110 may also activate an indicator to indicate that audio data is being sent to the remote system 120. Thus the remote system 120 may further instruct the device 110 to reactivate the light indicator once content responsive to a command is output. The remote system 120 instructs the device 110 to, once again, deactivate the light indicator once a time out period has transpired after the device is instructed to send audio data without first detecting a wake command.

The device 110 may output (724) audio corresponding to the first output audio data. As shown in FIG. 7B, the device 110 may detect (726) second input audio, generate (728) second input audio data corresponding to the second input audio, and send (730) second input audio data corresponding to subsequently captured audio to the remote system 120 without first detecting a wake command.

Upon receiving the second input audio data, the remote system 120 determines whether the second input audio data includes system-directed speech, for example using system directed speech detector 285. To determine whether the second input audio data includes system-directed speech, the system first may first perform (732) VAD on the second input audio data as described herein, for example using VAD 520. The remote system 120 may then perform (734) ASR on the second input audio data to determine ASR results. The server 120 may then determine (736) that the speech in the second input audio data is system-directed speech, for example using system directed detector 540 as described above. If the speech is system-directed, the server may perform (738) NLU using ASR results to determine a second command. The server may then cause the second command to be executed, for example as shown in FIG. 7C.

As shown in FIG. 7C, the remote system 120 may determine (740) second content responsive to the second command. The remote system 120 may determine the second content using data available within the remote system 120. Alternatively, the remote system 120 may determine the remote system 120 should invoke a skill component 290 that may be associated with skill server(s) 125 (e.g., content source server(s)) to determine the second content. In such a situation, the remote system 120 may send (742) a request for content responsive to the second command to the skill server(s) 125. The skill server(s) 125 may determine (744) second content data corresponding to the second content and the remote system 120 may receive (746) the second content data from the skill server(s) 125. Additionally or alternatively, the remote system 120 may determine the second content data without departing from the disclosure.

If content data is received as text data, the remote system 120 may perform text-to-speech processing on the text data to generate (748) second output audio data and may send (750) the second output audio data to the device 110. In some examples, the remote system 120 may alternatively receive the second content data as audio data, in which case the remote system may 120 simply send the received second content data to the device 110 as the second output audio data in step 750. Additionally or alternatively, the remote system 120 may send the second content data to the device 110 and the device 110 may perform text-to-speech processing on the second content data to generate the second output audio data without departing from the disclosure.

The device 110 may then output (752) audio corresponding to the second output audio data. As the system is engaged in different rounds of speech processing, the system may assign different unique ID numbers to the first input audio data and the second input audio data. In this manner, the system can track processing and results across components (such as components illustrated in FIGS. 2-5A, etc.) and can coordinate system activity relative to the first or second input audio data using the unique ID. For example, if the system determines that the second input audio does not include system directed speech (e.g., 564: No), the system may cancel (566) further processing for data in the system related to the identifier assigned to the second input audio data.

Although FIG. 7B illustrates determining whether second input audio data includes system-directed speech, the audio data so processed by the system need not necessarily be audio data that is received following a first command. The audio data processed to determine if it includes system-directed speech, for example using components discussed with regard to FIG. 5A and a method discussed with regard to FIG. 5B may be audio data that is received from a device 110 under a variety of different circumstances.

Although the certain descriptions above illustrate the techniques performed with regard to audio data triggered by a wakeword, the techniques may apply to any "wake" command that instructs a device to send audio data to the server. For example, a button push, gesture, or other action may be considered a wake command. Any wake command may be substituted for a wakeword herein. Thus, for any instance herein of the system instructing a device to send (or to cease sending) audio data without first detecting a wakeword may also be considered instructing the device to send (or cease sending) audio data without first detecting any wake command.

Various machine learning techniques may be used to train and operate models to operate various components and perform various steps described above, such as voice activity detection, system directed detection, user recognition, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks (such as deep neural networks (DNNs)), decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

While the above description refers to the remote system 120 instructing the device 110 to send the audio data to the remote system 120 even if no wakeword is detected, the disclosure is not limited thereto. In some examples, the system directed speech detector 285 may be located on the device 110 and the device 110 may determine to send audio data to the remote system 120 (e.g., without an explicit instruction from the remote system 120 to do so), even if no wakeword is detected, without departing from the disclosure. Additionally or alternatively, the system directed speech detector 285 and the speech processing component 240 may be located on the device 110 and the device 110 may perform speech processing on the audio data (e.g., without sending the audio data to the remote system 120), even if no wakeword is detected, without departing from the disclosure.

Figure 8B:
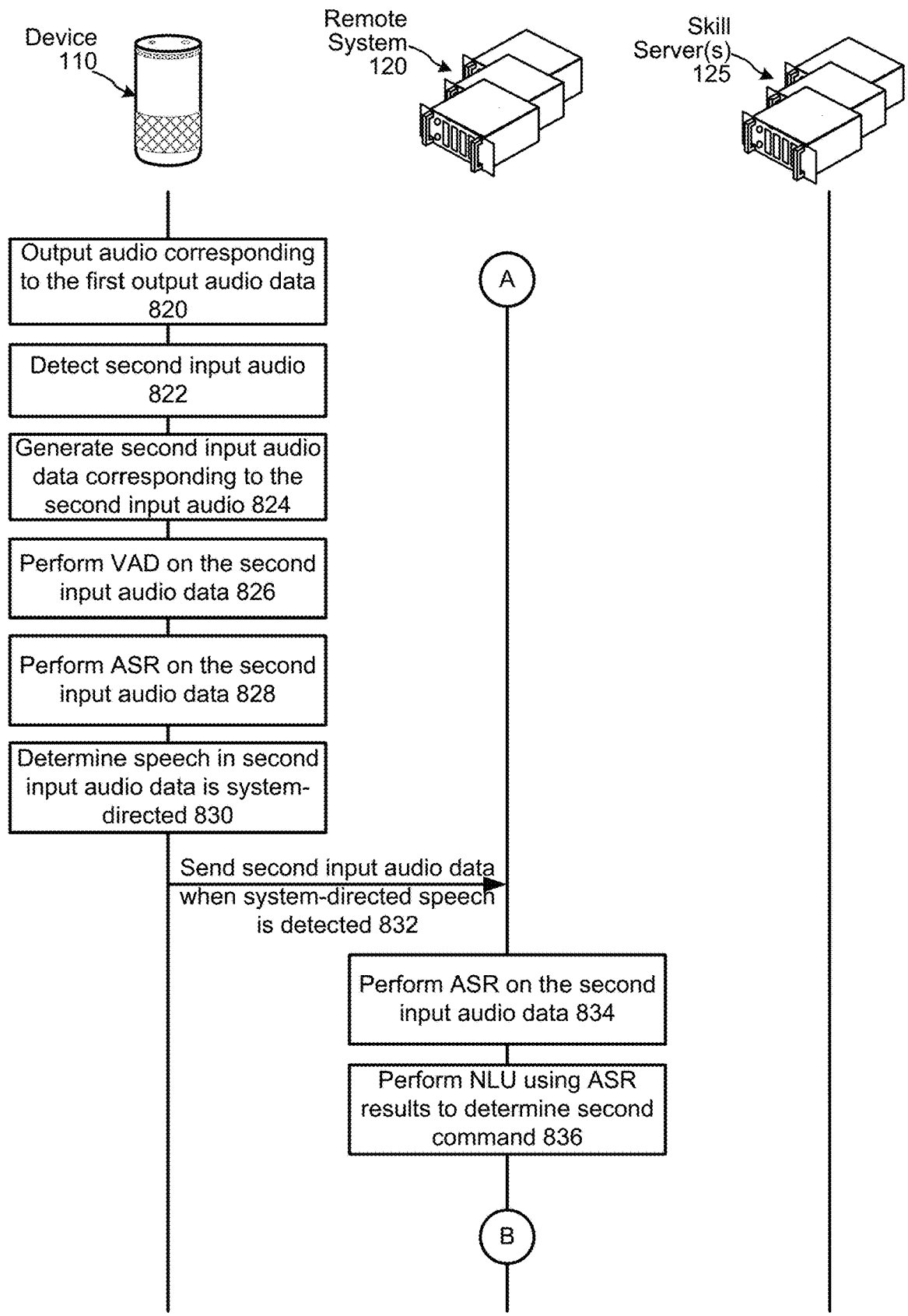
Figure 8C:
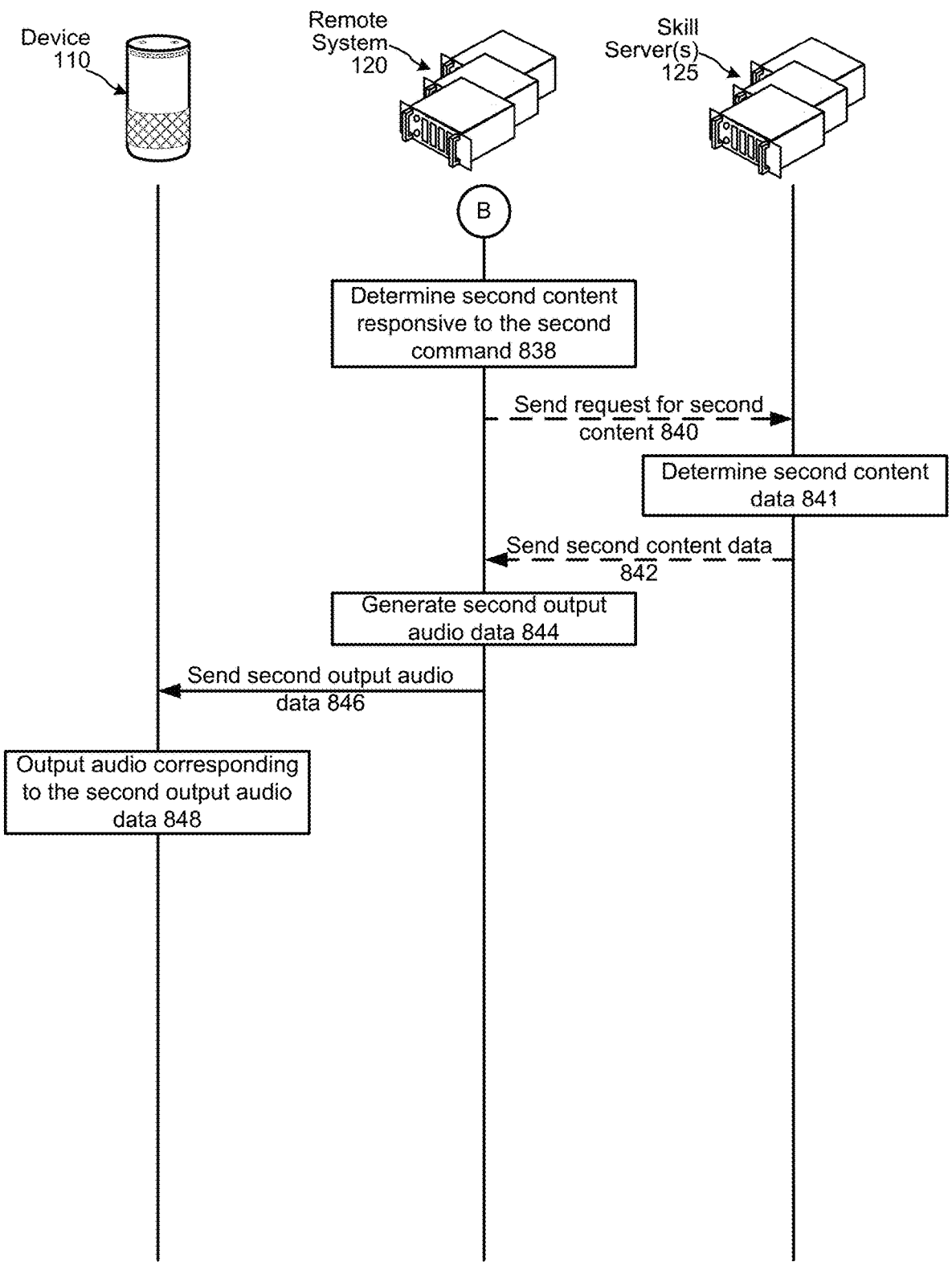
Figure 9A:
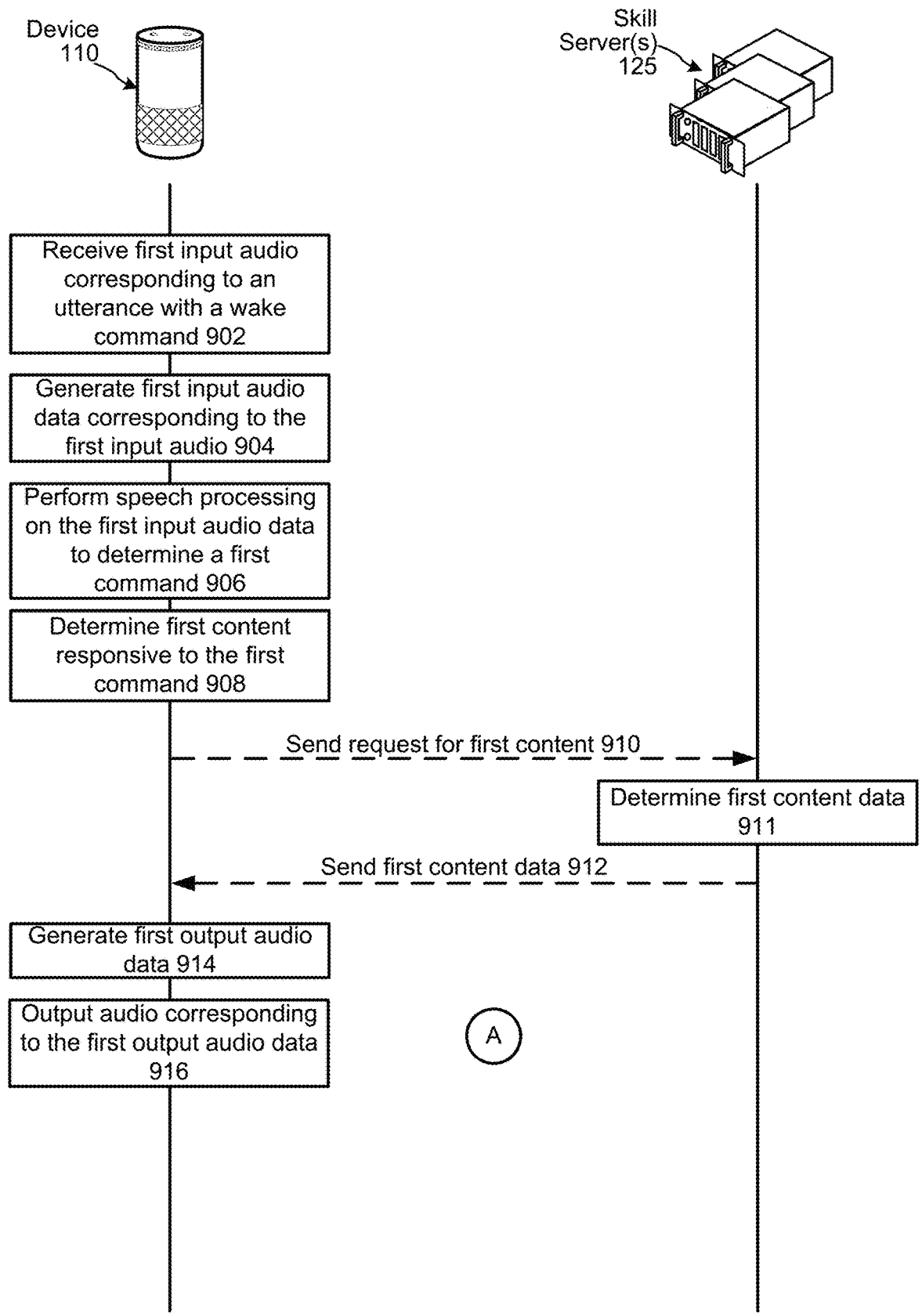
FIGS. 9A-9B are signal flow diagrams illustrating the processing performed when a device detects system-directed speech represented in input audio data and performs local speech processing on the input audio data according to embodiments of the present disclosure.
Figure 9B:
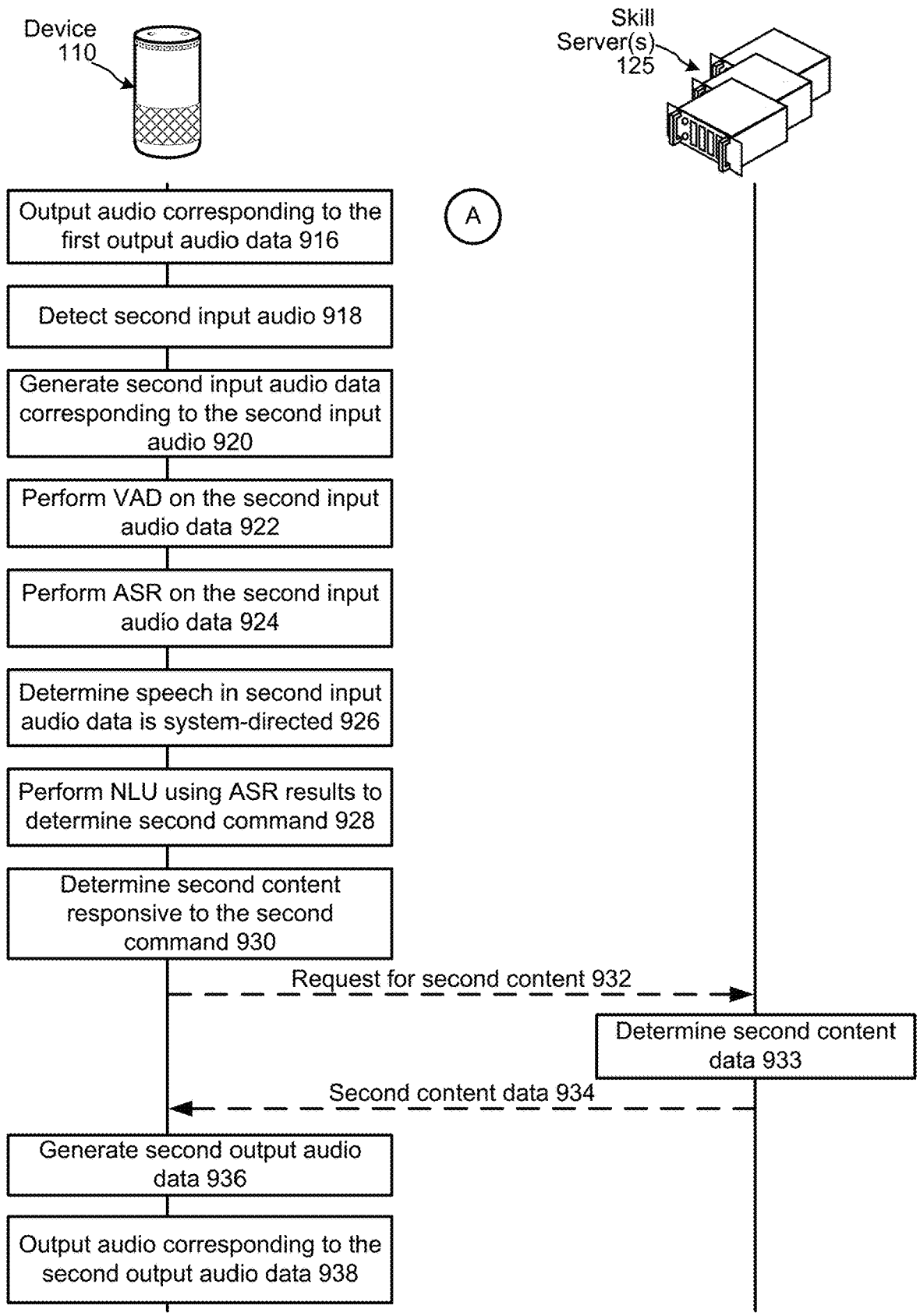

Thus, while FIGS. 7A-7C illustrate examples in which the remote system 120 detects system-directed speech, the disclosure is not limited thereto. In some examples, the device 110 may detect system-directed speech and send audio data to the remote system 120 for speech processing, as illustrated in FIGS. 8A-8C. Additionally or alternatively, in some examples the device 110 may detect system-directed speech and perform local speech processing on the audio data without departing from the disclosure, as illustrated in FIGS. 9A-9B. As FIGS. 8A-8C and 9A-9B illustrate steps described in detail above with regard to FIGS. 7A-7C, a redundant description is omitted. Thus, regardless of whether a step is performed by the device 110 and/or the remote system 120, a description of a step illustrated in FIGS. 7A-7C may apply to similar steps illustrated in FIGS. 8A-8C and 9A-9B without departing from the disclosure.

FIGS. 8A-8C are signal flow diagrams illustrating the processing performed when a device detects system-directed speech represented in input audio data and sends the input audio data to a remote system for speech processing according to embodiments of the present disclosure. As illustrated in FIG. 8A, the device 110 may receive (802) first input audio corresponding to an utterance with a wake command (e.g., first input audio includes a representation of a wakeword), may generate (804) first input audio data corresponding to the first input audio, and may send (806) the first input audio data to the remote system 120.

The remote system 120 may perform (808) speech processing on the first input audio data to determine a first command, may determine (810) first content responsive to the first command, and may optionally send (812) a request for the first content to the skill server(s) 125. If the remote system 120 sends the request, the skill server(s) 125 may determine (813) first content data corresponding to the first content and the remote system 120 may receive (814) the first content data from the skill server(s) 125. Additionally or alternatively, the remote system 120 may determine the first content data without departing from the disclosure.

In some examples, the remote system 120 may generate (816) the first output audio data (e.g., perform text-to-speech processing on the first content data) and may send (818) the first output audio data to the device 110. However, the remote system 120 may alternatively receive the first content data as audio data, in which case the remote system may 120 simply send the received first content data to the device 110 as the first output audio data in step 818. Additionally or alternatively, the remote system 120 may send the first content data to the device 110 and the device 110 may perform text-to-speech processing on the first content data to generate the first output audio data without departing from the disclosure. The device 110 may then output (820) audio corresponding to the first output audio data.

As illustrated in FIG. 8B, while the device 110 is outputting the audio corresponding to the first output audio data in step 820, the device 110 may detect (822) second input audio, may generate (824) second input audio data corresponding to the second input audio, may perform (826) voice activity detection (VAD) processing on the second input audio data to determine that speech is detected, may perform (828) automatic speech recognition (ASR) processing on the second input audio data, may determine (830) that the speech represented in the second input audio data is system-directed (e.g., device-directed speech or device-directed speech event), and may send (832) the second input audio data to the remote system 120 when system-directed speech is detected. Thus, the device 110 may send the second input audio data without detecting a wake command (e.g., wakeword not represented in the second input audio data), although the disclosure is not limited thereto.

The remote system 120 may perform (834) ASR processing on the second input audio data and may perform (836) NLU processing using the ASR results (e.g., ASR data) to determine a second command represented in the second input audio data. Thus, in the example illustrated in FIG. 8B, the device 110 may perform some speech processing locally in step 828, which may assist the device 110 in detecting system-directed speech in step 830, while the remote system 120 may also perform speech processing remotely in step 834.

As illustrated in FIG. 8C, the remote system 120 may determine (838) second content responsive to the second command and may optionally send (840) a request for the second content to the skill server(s) 125. If the remote system 120 sends the request, the skill server(s) 125 may determine (841) second content data corresponding to the second content and the remote system 120 may (842) receive the second content data from the skill server(s) 125. Additionally or alternatively, the remote system 120 may determine the second content data without departing from the disclosure.

The remote system 120 may generate (844) second output audio data and may send (846) the second output audio data to the device 110. In some examples, the remote system 120 may alternatively receive the second content data as audio data, in which case the remote system may 120 simply send the received second content data to the device 110 as the second output audio data in step 846. Additionally or alternatively, the remote system 120 may send the second content data to the device 110 and the device 110 may perform text-to-speech processing on the second content data to generate the second output audio data without departing from the disclosure. The device 110 may then output (848) audio corresponding to the second output audio data.

While FIGS. 8A-8C illustrate an example in which both the device 110 and the remote system 120 perform speech processing, the disclosure is not limited thereto and in some examples the device 110 may detect system-directed speech and perform local speech processing on the audio data without departing from the disclosure.

FIGS. 9A-9B are signal flow diagrams illustrating the processing performed when a device detects system-directed speech represented in input audio data and performs local speech processing on the input audio data according to embodiments of the present disclosure. As illustrated in FIG. 9A, the device 110 may receive (902) first input audio corresponding to an utterance with a wake command (e.g., determine that a wakeword is represented in the first input audio), may generate (904) first input audio data corresponding to the first input audio, may perform (906) speech processing on the first input audio data to determine a first command, and may determine (908) first content responsive to the first command.

The device 110 may optionally send (910) a request for the first content to the skill server(s) 125. The skill server(s) 125 may determine (911) first content data corresponding to the first content and the device 110 may receive (912) the first content data from the skill server(s) 125. Additionally or alternatively, the remote system 120 may determine the first content data without departing from the disclosure. Using the first content data, the device 110 may generate (914) first output audio data and may output (916) audio corresponding to the first output audio data.

As illustrated in FIG. 9B, while the device 110 is outputting the audio corresponding to the first output audio data in step 916, the device 110 may detect (918) second input audio, may generate (920) second input audio data corresponding to the second input audio, may perform (922) VAD processing on the second input audio data to detect speech, may perform (924) ASR processing on the second input audio data to generate ASR data, may determine (926) that the speech represented in the second input audio data is system-directed speech (e.g., device-directed speech or device-directed speech event), and may perform (928) NLU processing using the ASR results to determine a second command.

The device 110 may determine (930) second content responsive to the second command and may optionally send (932) a request for the second content to the skill server(s) 125. The skill server(s) 125 may determine (933) second content data corresponding to the second content and the device 110 may receive (934) the second content data from the skill server(s) 125. Additionally or alternatively, the device 110 may determine the second content data without departing from the disclosure. Using the second content data, the device 110 may generate (936) second output audio data and may output (938) audio corresponding to the second output audio data.

Figure 10:
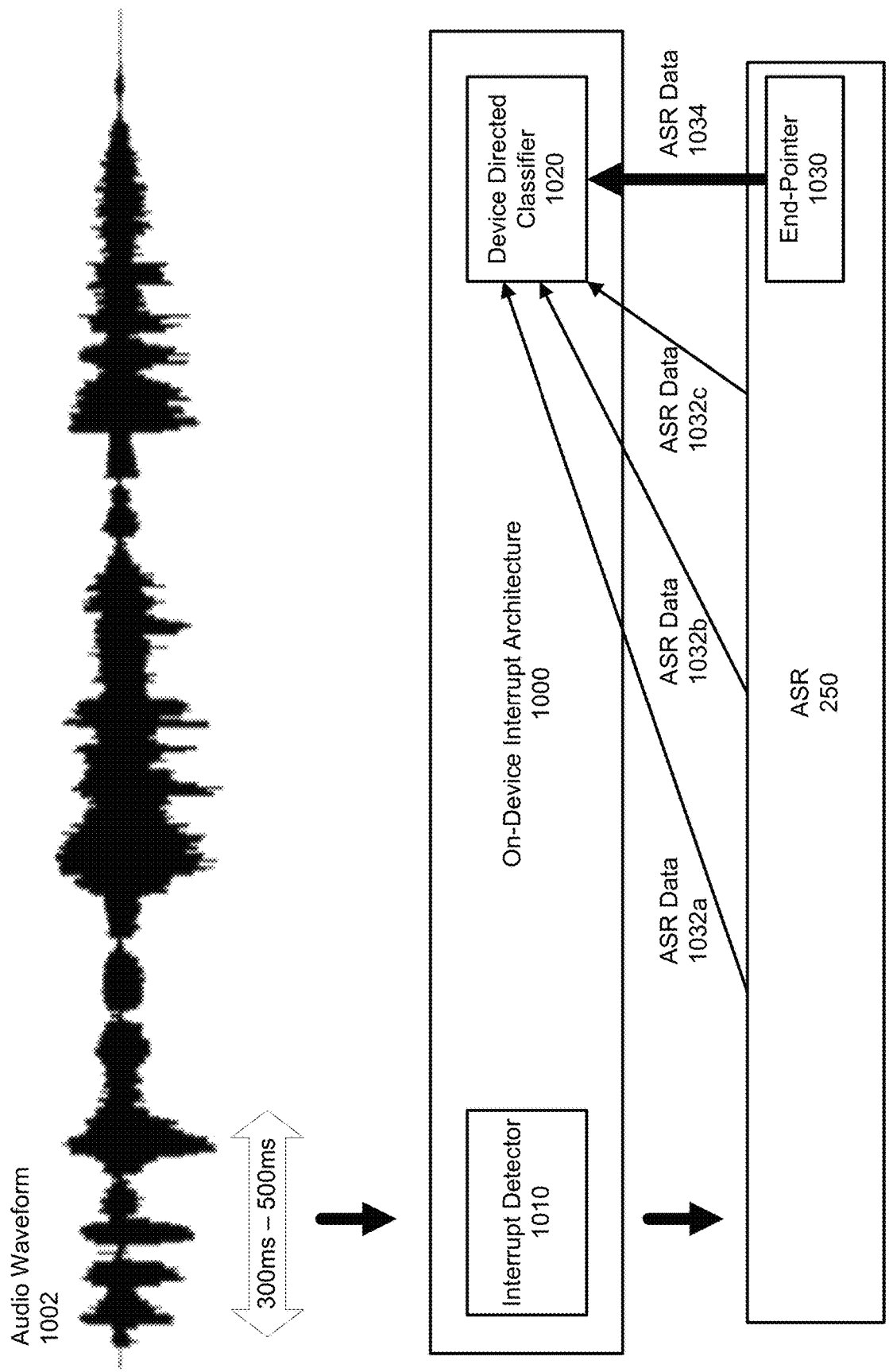
FIG. 10 illustrates an example of on-device interrupt architecture according to embodiments of the present disclosure.

FIG. 10 illustrates an example of on-device interrupt architecture according to embodiments of the present disclosure. As illustrated in FIG. 10, on-device interrupt architecture 1000 (e.g., barge-in detector) may include an interrupt detector 1010 and a device directed classifier 1020. The on-device interrupt architecture 1000 may detect a device-directed speech event (e.g., system-directed speech event), which may be also be referred to as a barge-in event, and may cause speech processing to be performed on audio data corresponding to the device-directed speech event.

In some examples, the on-device interrupt architecture 1000 may correspond to the system directed speech detector 285 described above with regard to FIGS. 2A-5B without departing from the disclosure. For example, the device 110 and the remote system 120 may both include the system directed speech detector 285, with the system directed speech detector 285 located on the device 110 including components illustrated with regard to the on-device interrupt architecture 1000 without departing from the disclosure. However, the disclosure is not limited thereto, and in other examples the system directed speech detector 285 may only be included on the device 110, in the form of the on-device interrupt architecture 1000, whereas the remote system 100 may not include the system directed speech detector 285 without departing from the disclosure. Additionally or alternatively, the system directed speech detector 285 may be different from the on-device interrupt architecture 1000, such that the remote system 120 may include the system directed speech detector 285 while the device 110 includes the on-device interrupt architecture 1000 without departing from the disclosure.

The device directed classifier 1020 may receive ASR data (e.g., contextual information, semantic information, and/or the like) from an ASR component 250 located on the device 110. In some examples, the ASR component may include an end-pointer component 1030 or the like configured to determine an endpoint of an utterance (e.g., perform end-point detection).

In the example illustrated in FIG. 10, the device 110 may generate an audio waveform 1002 using the microphone(s) 114. In some examples, the device 110 may be generating output audio (e.g., text-to-speech (TTS) notifications) using the loudspeaker(s) 116 when the device 110 generates the audio waveform 1002, although the disclosure is not limited thereto.

In some examples, the audio waveform 1002 may represent speech from a user 5. Typically, a device is configured to detect a wakeword represented in the speech and process an utterance following the wakeword in order to perform a voice command. To improve a user experience, the on-device interrupt architecture 1000 may enable the device 110 to detect device-directed speech and perform a voice command even when the speech does not represent the wakeword (e.g., wakewordless speech). Thus, the on-device interrupt architecture 1000 may detect an interrupt event (e.g., barge-in event, wakewordless speech) and then determine whether the interrupt event corresponds to a device-directed speech event (e.g., a voice command directed to the device 110, as opposed to just conversation or other environmental noise). If the on-device interrupt architecture 1000 determines that the device-directed speech event is present, the device 110 may cause speech processing to be performed on the utterance to determine a voice command, enabling the user 5 to interact with the device 110 naturally without explicitly saying the wakeword.

The interrupt detector 1010 may process a portion of the audio waveform 1002 (e.g., 300 ms to 500 ms of audio data at a time) and determine whether an interrupt event is detected. For example, the interrupt detector 1010 may detect that the audio waveform 1002 represents speech and may determine that the speech is directed at the device 110. Thus, the interrupt detector 1010 may be trained and optimized to detect a user's wakewordless device-directed interrupt speech.

In response to detecting the interrupt event, the device 110 may perform one or more first actions. For example, the device 110 may attenuate the output audio (e.g., decrease from a first volume level to a second volume level), pause the output audio (e.g., stop generating or outputting the output audio completely), display (e.g., enable) one or more indicator lights (e.g., visual indicator(s)), ask a question (e.g., "What was that?"), and/or perform other actions to indicate to the user 5 that the device 110 is listening. Thus, instead of forcing the user 5 to speak over the output audio, the device 110 may lower an output volume level of the output audio and capture an utterance (e.g., potential voice command) generated by the user 5.

In some examples, the device 110 may pause the output audio by identifying a natural transition within playback audio data corresponding to the output audio. For example, the device 110 may identify a current position in the playback audio data, may identify an upcoming word boundary represented in the playback audio data after the current position, and may pause the output audio based on the word boundary. Thus, the device 110 may determine a first portion of the playback audio data ending at the word boundary, may generate the output audio using the first portion of the playback audio data, and may stop generating the output audio after the first portion of the playback audio data (e.g., not generate the output audio using a second portion of the playback audio data).

The device 110 may identify the word boundary using multiple techniques known to one of skill in the art. In some examples, individual word boundaries or other information may be indicated using tags or other information embedded in the output audio data (e.g., ID3 tag). For example, the output audio data may include one or more tags that may be used to identify word boundaries or other boundaries represented in the output audio data without departing from the disclosure. In other examples, the device 110 may perform natural language processing on the output audio data to identify the upcoming word boundary using techniques known to one of skill in the art. Additionally or alternatively, the device 110 may identify the upcoming word boundary by detecting a decrease in audio energy represented in the output audio data without departing from the disclosure.

For ease of illustration, the following description may refer to attenuating the output audio and/or displaying one or more indicator lights. For example, the device 110 may enable visual indicator(s) to indicate that the device 110 is listening and may disable the visual indicator(s) if an interrupt event is ignored. However, the disclosure is not limited thereto and the device 110 may perform any of the abovementioned actions (e.g., attenuate the output audio, pause the output audio, display indicator lights, ask a question, etc.) without departing from the disclosure.

To reduce latency and improve a user experience, the interrupt detector 1010 may process a short portion and/or small quantity of the audio waveform 1002 (e.g., short span of input speech signal) and determine whether the interrupt event is present relatively quickly (e.g., within 300 ms to 500 ms), enabling the device 110 to attenuate the output audio and/or perform other actions promptly. In some examples, the interrupt detector 1010 may prioritize latency over accuracy in order to improve the user experience. For example, the interrupt detector 1010 may process a shorter duration and/or smaller quantity of the audio waveform 1002, use a lower threshold value to detect an interrupt event, and/or the like in order to reduce an amount of latency associated with the interrupt detector 1010 identifying that an interrupt event is occurring. However, these parameters may vary without departing from the disclosure, enabling the device 110 to control an amount of latency and/or accuracy based on user preferences. Additionally or alternatively, the device 110 may modify these parameters over time, updating the interrupt detector 1010 to optimize the user experience.

After the interrupt event is detected, the device 110 may process the audio waveform 1002 using the ASR component 250 and/or the end-pointer component 1030. The ASR component 250 may generate incomplete ASR data 1032 (e.g., contextual information, semantic information, and/or the like) while processing portions of the audio waveform 1002 and may generate complete ASR data 1034 (e.g., contextual information, semantic information, and/or the like) corresponding to the entire utterance. The end-pointer component 1030 may be configured to determine an endpoint of an utterance and may determine the endpoint using techniques known to one of skill in the art without departing from the disclosure. While FIG. 10 illustrates the end-point component 1030 as part of the ASR component 250, the disclosure is not limited thereto and the end-point component 1030 may be separate from the ASR component 250 without departing from the disclosure.

Prior to the device 110 identifying the endpoint of the utterance, in some examples the device directed classifier 1020 may process the audio waveform 1002 and/or the ASR data 1032 (e.g., 1032a, 1032b, 1032c, etc.) and determine a confidence level indicating a likelihood that the utterance corresponds to a device-directed speech event. Thus, the device directed classifier 1020 may process the incomplete audio waveform 1002 and/or the incomplete ASR data 1032 and continuously calculate the confidence level prior to the device 110 detecting the endpoint of the utterance. If the confidence level falls below a first threshold value, the device directed classifier 1020 may reject the interrupt event as not corresponding to a device-directed speech event and perform one or more second actions. For example, the device 110 may increase the output volume level of the output audio (e.g., increase from the second volume level to the first volume level), may stop displaying (e.g., disable) the one or more indicator lights (e.g., visual indicator(s)), and/or perform other actions to stop indicating that the device 110 is listening.

If the confidence level stays above the first threshold value and the end-pointer component 1030 detects the endpoint of the utterance, the device directed classifier 1020 may process the entire utterance (e.g., portion of audio data or audio waveform 1002 representing the utterance) and/or the complete ASR data 1034 to determine whether a device-directed speech event is present. In some examples, the device directed classifier 1020 may detect the device-directed speech event by updating the previously calculate confidence level until the endpoint of the utterance. Thus, the device directed classifier 1020 may build off of the previous results to determine the confidence level for the utterance. However, the disclosure is not limited thereto, and in other examples the device directed classifier 1020 may process the entire utterance separately without departing from the disclosure. For example, the ASR component 250 may generate the complete ASR data 1034 (e.g., contextual information, semantic information, and/or the like) by processing the entire utterance and then the device directed classifier 1020 may determine the overall confidence level using the complete ASR data 1034.

In some examples, the device directed classifier 1020 may determine an overall confidence level for the utterance and determine whether the overall confidence level satisfies a condition. For example, the device directed classifier 1020 may determine that the overall confidence level is greater than a second threshold value, although the disclosure is not limited thereto. When the overall confidence level satisfies the condition, the device directed classifier 1020 may accept the interrupt event by indicating that a device-directed speech event is detected (e.g., high likelihood that the speech corresponds to a voice command). When the overall confidence level does not satisfy the condition, the device directed classifier 1020 may reject the interrupt event by indicating that a device-directed speech event is not detected. Thus, the device directed classifier 1020 may reject the interrupt event based on the confidence level being below the first threshold value and/or the overall confidence level being below the second threshold value, although the disclosure is not limited thereto.

As described above, if the device-directed classifier 1020 determines that the device-directed speech event is not present (e.g., the interrupt event is rejected), the device 110 may perform one or more second actions. For example, the device 110 may increase the output volume level of the output audio (e.g., increase from the second volume level to the first volume level), may stop displaying (e.g., disable) the one or more indicator lights (e.g., visual indicator(s)), and/or perform other actions to stop indicating that the device 110 is listening. Thus, the device 110 continues whatever action it was previously performing (e.g., generating output audio) and ignores the utterance. If the device-directed classifier 1020 determines that the device-directed speech event is present (e.g., the interrupt event is accepted, indicating that a voice command is detected), the device 110 may cause speech processing to be performed on the audio data to determine a voice command. For example, the device 110 may perform speech processing on the audio data locally and/or send the audio data representing the audio waveform 1002 to the remote system 120 for further processing. Thus, the device-directed classifier 1020 determines whether to execute the speech processing pipeline based on the utterance.

In contrast to constantly streaming audio data to the remote system 120 during and/or after outputting audio responsive to a voice command, detecting the device-directed speech event enables the system 100 to only process a portion of audio data representing device-directed speech. This reduces a processing consumption imposed on the system 100 while also improving privacy protection for a user 5 of the device 110. For example, as the system 100 only processes the portion of the audio data directed to the device/system, the system 100 ignores speech that is not directed to the device/system. Additionally or alternatively, the system 100 may be configured to train the on-device interrupt architecture 1000 in real-time, without persistently storing any information about an interaction. Thus, the device 110 may be configured to learn and/or train the on-device interrupt architecture 1000 without storing audio data, ASR data, and/or other data associated with a particular interaction.

The interrupt detector 1010 and/or the device directed classifier 1020 may determine whether device-directed speech is detected using at least one classifier. For example, the classifier may consider a variety of information, including a volume level of the speech (e.g., whether the speech is louder or quieter than normal speech), speaker identification (e.g., identification data) corresponding to the speech, which may be determined using voice recognition, image data, and/or other techniques known to one of skill in the art, emotion detection (e.g., emotion data) corresponding to the speech (e.g., whether the speech is animated or quiet, for example), a length of time between when the output audio begins and when the speech is detected, and/or the like without departing from the disclosure. The classifier may process the input information and generate model output data, which may indicate a likelihood that the speech is directed to the device. If the model output data satisfies a condition, the device 110 may determine that the speech is directed to the device 110. For example, the model output data may indicate a likelihood that is greater than a threshold value, although the disclosure is not limited thereto.

The device 110 may be located within an environment to provide various capabilities to a user 5, when the user 5 is also in the environment. The environment in which the device 110 is located may be a home or other premises, an automobile, or any similar environment. Such an environment may include other devices including additional speech interface devices and/or second devices (e.g., Internet of Things (IoT) devices and/or smart home devices like thermostats, lights, refrigerators, ovens, etc.) that may be controllable by speech interface devices, such as the device 110. When acting as a hub, the device 110 may be configured to connect a plurality of devices in an environment and control communications among them, thereby serving as a place of convergence where data arrives from one or more devices, and from which data is sent to one or more devices.

In general, the device 110 may be capable of capturing utterances with microphone(s) 114, and responding in various ways, such as by outputting content (e.g., audio) via an output device(s), which may be loudspeaker(s) 116, a display(s), or any other suitable output device. In addition, the device 110 may be configured to respond to user speech by controlling second devices that are collocated in the environment with the device 110, such as by sending a command to a second device via a communications interface (e.g., a short range radio), the command instructing an operation to be performed at the second device (e.g., to turn on a light in the environment).

Under normal conditions, the device 110 may operate in conjunction with and/or under the control of a remote system 120, which may be a remote, network-based or network-accessible control system. The remote system 120 may, in some instances be part of a network-accessible computing platform that is maintained and accessible via network(s) 199. Network-accessible computing platforms such as this may be referred to using terms such as "on-demand computing", "software as a service (SaaS)", "platform computing", "network-accessible platform", "cloud services", "data centers", and so forth. The remote system 120 may be configured to provide particular functionality to large numbers of local (e.g., in-home, in-car, etc.) devices of different users.

In some embodiments, the remote system 120 may be configured to receive audio data from the device 110, to recognize speech corresponding to an utterance in the received audio data using a speech processing component 240 (which may be referred to as a remote speech processing system), and to perform functions in response to the recognized speech. In some embodiments, these functions involve sending directives (e.g., commands), from the remote system 120 to the device 110 to cause the device 110 to perform an action, such as output an audible response to the utterance via loudspeaker(s) 116, and/or control second devices in the environment by sending a control command via the communications interface. Thus, under normal conditions, when the device 110 is able to communicate with the remote system 120 over the network(s) 199, some or all of the functions capable of being performed by the remote system 120 may be performed by sending directive(s) over the network(s) 199 to the device 110, which, in turn, may process the directive(s) and perform corresponding action (s). For example, the remote system 120, using a remote directive that is included in response data (e.g., directive data), may instruct the device 110 to output an audible response (e.g., using text-to-speech (TTS)) to a user's 5 question via a loudspeaker(s) 116 of the device 110, to output content (e.g., music) via the loudspeaker(s) 116 of the device 110, to display content on a display of the device 110, and/or to send a directive to a nearby device (e.g., directive to turn on a light). It is to be appreciated that the remote system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

Figure 11:
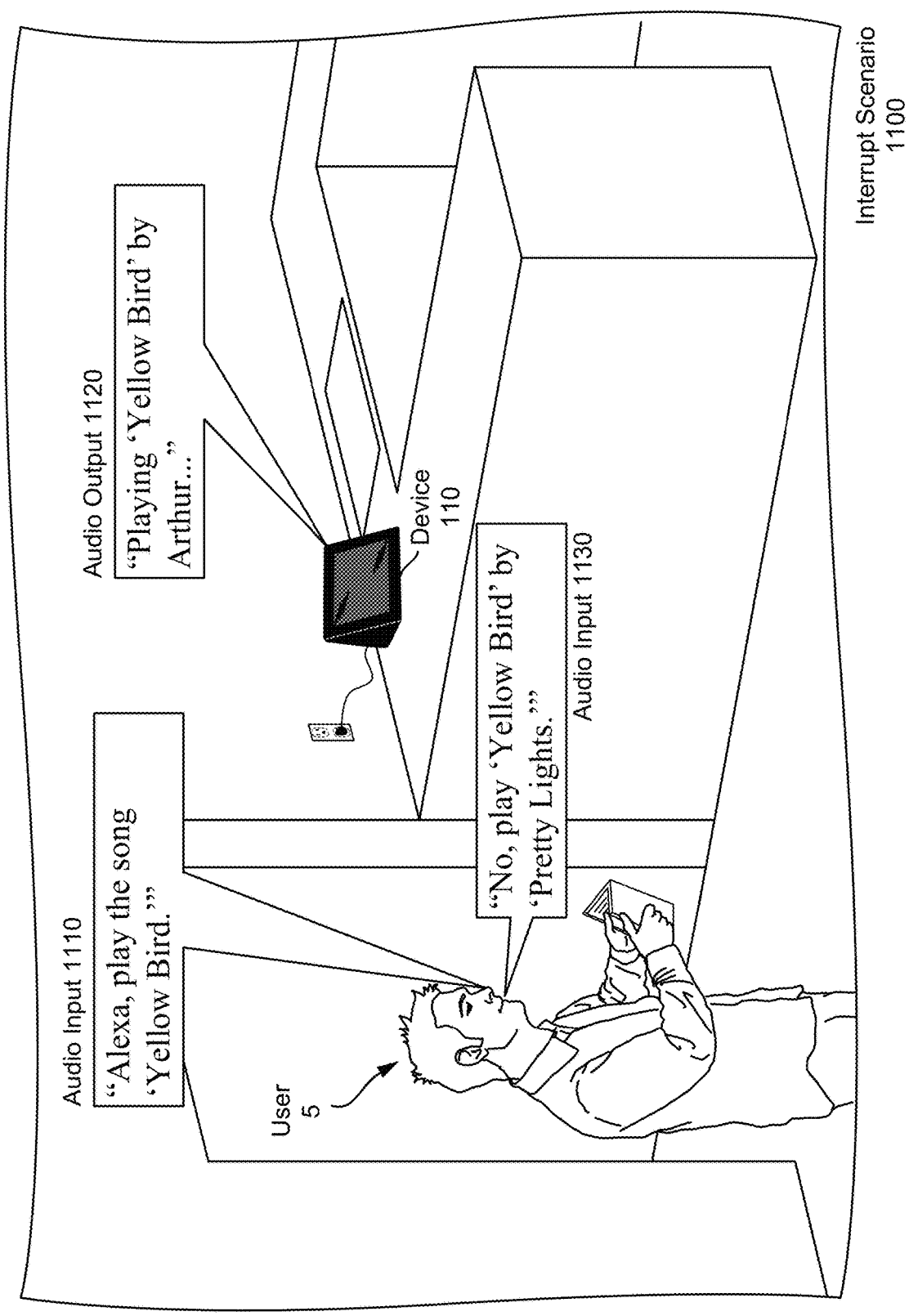
FIG. 11 illustrates an example of wakewordless interrupt according to embodiments of the present disclosure.

FIG. 11 illustrates an example of wakewordless interrupt according to embodiments of the present disclosure. As illustrated in FIG. 11, the user 5 may input a first voice command requesting that the device 110 play music. For example, the device 110 may capture first audio input 1110 (e.g., "Alexa, play the song 'Yellow Bird.'") corresponding to a first utterance. Whether the first utterance is captured by the microphone(s) 114 of the device 110 or captured by a remote microphone in the environment, first audio data representing the first utterance is ultimately received by the device 110. The device 110 may recognize that the first audio data includes a representation of the wakeword (e.g., "Alexa") and may send the first audio data to the remote system 120 for processing.

The remote system 120 may process the audio data using a speech processing component 240, which is discussed above with regard to FIG. 2, to generate NLU data and/or corresponding directive data. For example, the NLU data may correspond to intent data and/or slot data that represent an intent associated with the first utterance, and the directive data may include a directive that corresponds to the intent. In a conventional system, the remote system 120 may use the NLU data locally to determine the directive data and may only send the directive data to the device 110.

In the example illustrated in FIG. 11, the remote system 120 may process the first audio data and determine that the first voice command corresponds to a request to play "Yellow Bird" by Arthur Lyman. To process this request, the remote system 120 may perform text-to-speech (TTS) processing to generate output audio data representing a notification to the user 5. In addition, the remote system 120 may generate directive data commanding the device 110 to stream the song "Yellow Bird" by Arthur Lyman. The remote system 120 may then send the output audio data and the directive data to the device 110. In response to receiving the output audio data and the directive data, the device 110 may generate audio output 1120 (e.g. "Playing 'Yellow Bird by Arthur Lyman.") and begin streaming the selected song.

In the example illustrated in FIG. 11, however, the user 5 was actually requesting a different song than the one selected by the remote system 120. Thus, while the device 110 is generating the audio output 1120, the user 5 may input a second voice command requesting that the device 110 play a different version of 'Yellow Bird.' For example, the device 110 may capture second audio input 1130 (e.g., "No, play 'Yellow Bird' by 'Pretty Lights.'") corresponding to a second utterance that does not include the wakeword. Whether the second utterance is captured by the microphone(s) 114 of the device 110 or captured by a remote microphone in the environment, second audio data representing the second utterance is ultimately received by the device 110. Even though the second audio data does not include a representation of the wakeword, the device 110 may detect an interrupt event (e.g., voice command) and process the second audio data using the on-device interrupt architecture 1000, as described above. For example, the device directed classifier 1020 may determine that the interrupt event corresponds to a device-directed speech event and may send the second audio data to the remote system 120 for further processing, resulting in the device 110 playing the song "Yellow Bird" by the artist "Pretty Lights," as requested by the user 5.

In the example illustrated in FIG. 11, the second audio input 1130 is received while the device 110 is generating the audio output 1120, although the disclosure is not limited thereto. Upon detecting the interrupt event, the device 110 may perform one or more first actions to indicate that the device 110 is listening, such as attenuating the audio output 1120, displaying an indicator light, and/or the like, which is illustrated in FIG. 11 as the audio output 1120 being cut off before the end of the sentence.

While not illustrated in FIG. 11, if the device 110 determined that the second audio input 1130 did not correspond to a device-directed speech event, the device 110 may perform one or more second actions to indicate that the device 110 is no longer listening. For example, if the second audio input 1130 corresponded to the utterance "I love the song Yellow Bird" instead of a voice command, the device 110 may determine that this interrupt event does not correspond to a device-directed speech event (e.g., speech is detected, but it does not correspond to a voice command) and may choose to ignore the second utterance. Thus, the device 110 may continue generating the audio output 1120 at the first volume level without sending the second audio data to the remote system 120.

Figure 12A:
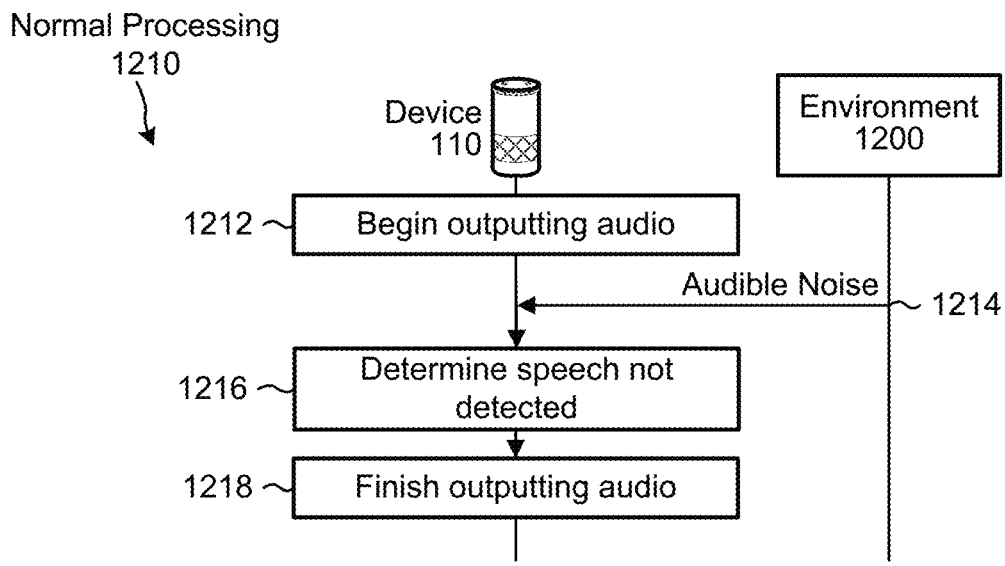
FIGS. 12A-12D illustrate examples of different ways that the interrupt architecture may process an utterance according to embodiments of the present disclosure.

FIGS. 12A-12D illustrate examples of different ways that the interrupt architecture may process an utterance according to embodiments of the present disclosure. As illustrated in FIG. 12A, during normal processing 1210 the device 110 may begin (1212) outputting audio, the environment 1200 may generate (1214) an audible noise, the device 110 may determine (1216) that speech is not detected and finish (1218) outputting the audio. For example, the device 110 may generate audio data and determine that the audio data only represents environmental noise or other non-speech sounds, resulting in the device 110 generating the output audio without interruption or attenuation.

Figure 12B:
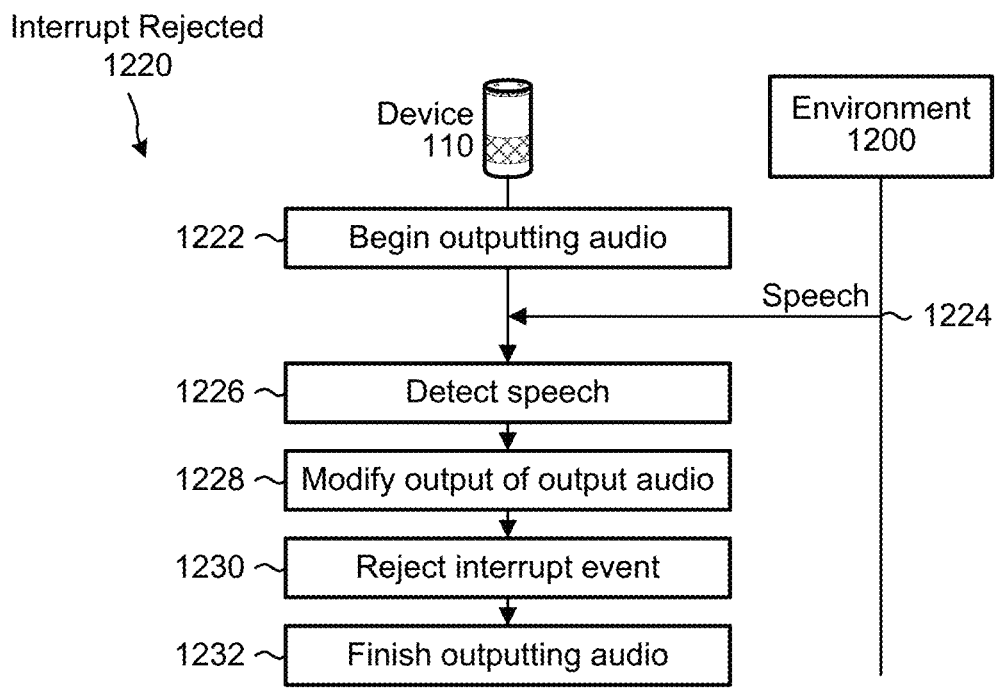

In contrast, FIG. 12B illustrates an example in which an interrupt event is detected and then rejected. As illustrated in FIG. 12B, when interrupt rejected 1220 occurs the device 110 may begin (1222) outputting audio, the environment 1200 may generate (1224) speech, and the device 110 may detect (1226) the speech (e.g., device-directed speech) and modify (1228) output of the output audio. For example, the device 110 may pause the output audio, reduce a volume level of the output audio (e.g., from a first volume level to a second volume level), and/or perform other actions. Thus, the device 110 may determine that an interrupt event is present based on detecting the speech. However, the device 110 may reject (1230) the interrupt event and finish (1232) outputting the audio (e.g., un-pause the output audio, increase from the second volume level to the first volume level, and/or perform other actions). For example, the device directed classifier 1020 may process a portion of the speech to determine a confidence level that the speech corresponds to a device-directed speech event. If the device directed classifier 1020 determines that the confidence level is below a first threshold value, the device directed classifier 1020 may reject the interrupt event and continue normal processing. This may occur when the speech corresponds to playback speech generated by another device (e.g., dialog included in a television broadcast, remote speech included in an audio broadcast, remote speech output during a communication session, and/or the like), non-device-directed speech generated by the user 5 (e.g., conversation not directed at the device 110), and/or the like without departing from the disclosure.

Figure 12C:
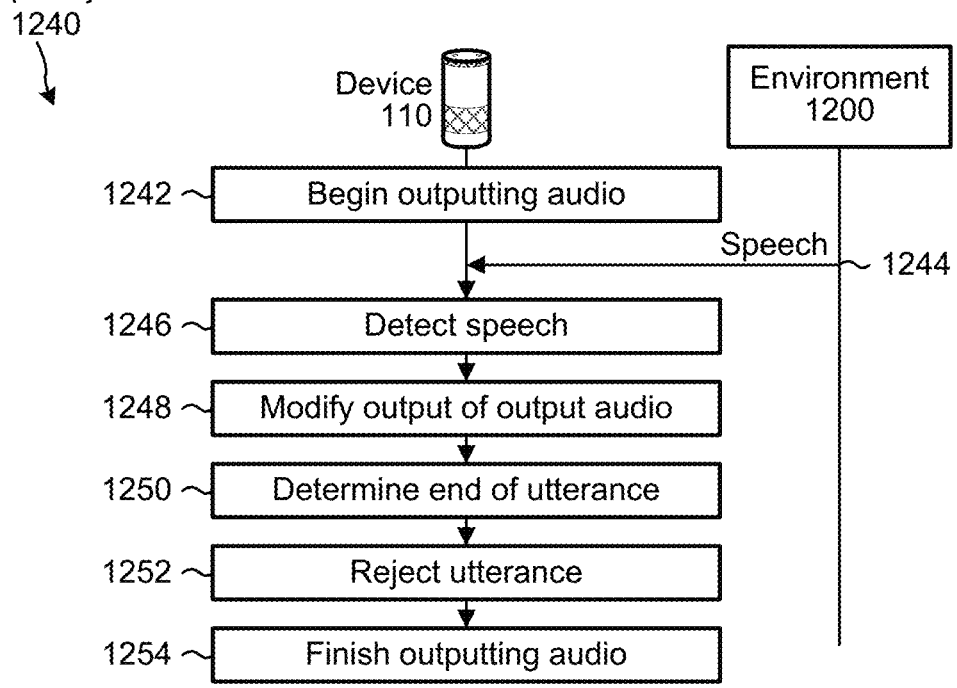

While FIG. 12B illustrates an example in which the interrupt event is rejected prior to the end of an utterance, FIG. 12C illustrates an example in which the interrupt event is rejected based on an entire utterance. As illustrated in FIG. 12C, when interrupt rejected 1230 occurs the device 110 may begin (1242) outputting audio, the environment 1200 may generate (1244) speech, and the device 110 may detect (1246) the speech (e.g., device-directed speech) and modify (1248) output of the output audio. For example, the device 110 may pause the output audio, reduce a volume level of the output audio (e.g., from a first volume level to a second volume level), and/or perform other actions. Thus, the device 110 may determine that an interrupt event is present based on detecting the speech. However, the device 110 may determine (1250) an end of the utterance, may reject (1252) the utterance (e.g., reject the interrupt event), and may finish (1254) outputting the audio (e.g., un-pause the output audio, increase from the second volume level to the first volume level, and/or perform other actions). For example, the device directed classifier 1020 may process the entire utterance to determine an overall confidence level that the utterance corresponds to a device-directed speech event. If the device directed classifier 1020 determines that the overall confidence level is below a second threshold value, the device directed classifier 1020 may reject the interrupt event and continue normal processing. This may occur when the utterance corresponds to playback speech generated by another device (e.g., dialog included in a television broadcast, remote speech included in an audio broadcast, remote speech output during a communication session, and/or the like), non-device-directed speech generated by the user 5 (e.g., conversation not directed at the device 110), and/or the like without departing from the disclosure.

Figure 12D:
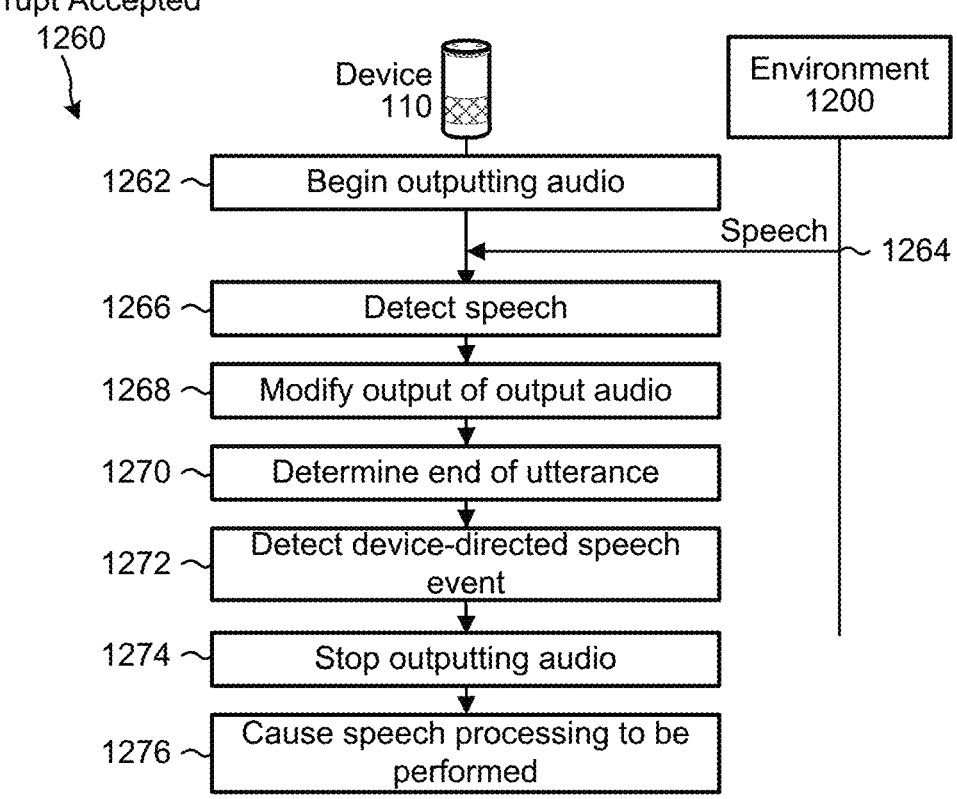

Finally, FIG. 12D illustrates an example of accepting the interrupt event and processing a voice command represented by wakewordless device-directed speech. As illustrated in FIG. 12D, when interrupt accepted 1260 occurs the device 110 may begin (1262) outputting audio, the environment 1200 may generate (1264) speech, and the device 110 may detect (1266) the speech (e.g., device-directed speech) and modify (1268) output of the output audio. For example, the device 110 may pause the output audio, reduce a volume level of the output audio (e.g., from a first volume level to a second volume level), and/or perform other actions. Thus, the device 110 may determine that an interrupt event is present based on detecting the speech.

In this example, however, the device 110 may determine (1270) an end of the utterance, may detect (1272) a device-directed speech event (e.g., accept the interrupt event), may stop (1274) outputting the audio (e.g., cause the output audio to stop), and may cause (1276) speech processing to be performed. For example, the device 110 may send input audio data corresponding to the utterance to the remote system 120 for speech processing. Additionally or alternatively, the device 110 may perform local speech processing on the input audio data without departing from the disclosure. In some examples, the device directed classifier 1020 may process the entire utterance to determine an overall confidence level that the utterance corresponds to a device-directed speech event. If the device directed classifier 1020 determines that the overall confidence level is above the second threshold value, the device directed classifier 1020 may accept the interrupt event and send the utterance to the remote system 120.

Figure 13:
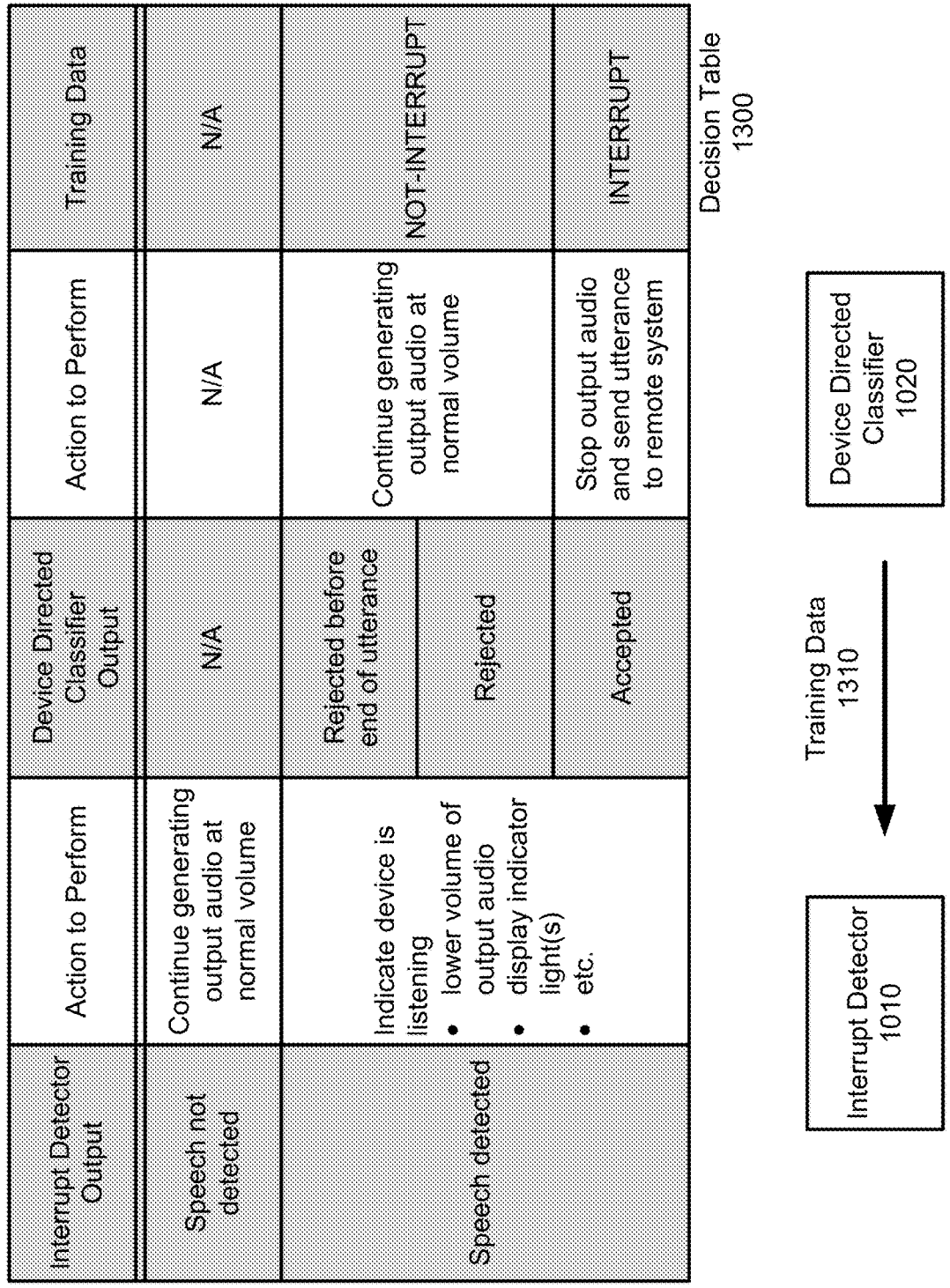
FIG. 13 illustrates a decision table and training data associated with interrupt architecture according to embodiments of the present disclosure.

FIG. 13 illustrates a decision table and training data associated with interrupt architecture according to embodiments of the present disclosure. Examples of potential outputs and corresponding actions to perform are illustrated in decision table 1300. For example, the interrupt detector output may indicate that speech is not detected or that speech is detected. If the interrupt detector output indicates that speech is not detected (e.g., interrupt event not present), then the action to perform is to continue generating output audio at a normal volume level. However, if the interrupt detector output indicates that speech is detected (e.g., interrupt event is present), then the action to perform is to indicate that the device 110 is listening by performing at least one of lower the volume level of the output audio from a first volume level to a second volume level, display indicator light(s), and/or the like. Thus, the interrupt detector output results in the device 110 performing one or more actions to indicate to the user 5 that the device 110 is listening.

When the interrupt detector output indicates that speech is not detected, the device directed classifier 1020 does not process the audio data and nothing else occurs, indicated in the decision table 1300 as not applicable (e.g., N/A). When the interrupt detector output indicates that speech is detected, however, the device directed classifier 1020 can perform one of three different actions. First, the device directed classifier 1020 can reject the interrupt event before the end of the utterance, as described in greater detail above. For example, the device directed classifier 1020 can process portions of the audio data, determine that a confidence level is below a first threshold value, and reject the interrupt event. Second, the device directed classifier 1020 can process the entire utterance and determine to reject the interrupt event. For example, the device directed classifier 1020 can receive an indication of an endpoint of the utterance from the ASR component and may process the entire utterance to determine an overall confidence level that the utterance corresponds to a device-directed speech event. If the overall confidence level is below a second threshold value, the device directed classifier 1020 can reject the interrupt event at this point in time. Regardless of whether the device directed classifier 1020 rejects the interrupt event prior to the end of the utterance or based on the complete utterance, the action to perform is to continue generating output audio at a normal volume. For example, the device 110 may increase the output audio from the second volume level to the first volume level and/or turn off any indicator light(s) previously displayed.

Third, the device directed classifier 1020 can process the entire utterance and determine to accept the interrupt event. For example, the device directed classifier 1020 may determine that the overall confidence level is above the second threshold value, indicating that the interrupt event corresponds to a device-directed speech event. When this occurs, the device 110 may stop generating the output audio (e.g., cause the output audio to stop) and may send first audio data representing the utterance to the remote system 120 for further processing. For example, the first audio data may correspond to a voice command and the remote system 120 may interpret the voice command and send directive data to the device 110 and/or other devices without departing from the disclosure.

To improve the interrupt detector 1010, the device 110 may generate training data 1310 based on the device directed classifier output and perform a training process to update the interrupt detector 1010. As illustrated in FIG. 13, the device directed classifier 1020 may send the training data 1310 to the interrupt detector 1010. For example, the decision table 1300 indicates that the device 110 may generate first training data (e.g., NOT-INTERRUPT) when the interrupt event is rejected and/or second training data (e.g., INTERRUPT) when the interrupt event is accepted.

As the device directed classifier 1020 processes the full speech segment (e.g., entire utterance) and ASR hypothesis, along with additional semantic level information, the device-directed classifier output can achieve a lower false accept (FA) rate than the interrupt detector output. Thus, the device 110 may use the device directed classifier output as ground truth to enable on-device federated learning to improve the interrupt detector 1010. Specifically, a rejected interrupt event (e.g., falsely accepted speech segment) may be used to generate the first training data (e.g., NOT-INTERRUPT) and improve the interrupt detector 1010 in a privacy-preserving federated learning framework. For example, gradients for selected rejected interrupt events may be calculated on-device, while gradients from many devices may be aggregated by the remote system 120 and/or a remote database. The remote system 120 may apply these gradients to the baseline shared interrupt detector model to generate an updated interrupt detector model and the updated interrupt detector model may be sent to the devices 110.

Similarly, the device 110 may use an accepted interrupt event (e.g., device-directed speech segment) to generate the second training data (e.g., INTERRUPT). For example, an interrupt event that was not detected (e.g., falsely rejected speech segment) followed by an accepted interrupt event may be used in a federated learning framework to improve an interrupt false reject (FR) rate. Specifically, the interrupt detector 1010 may identify near-miss interrupt events (e.g., portions of audio data that were just below a threshold value and therefore not selected as an interrupt event) that were followed by accepted interrupt events, treat the near-miss interrupt events as false rejections, and use the near-miss interrupt events as positive examples to improve the interrupt detector 1010.

In some examples, the first training data and the second training data may include the interrupt detector output, the device directed classifier output, the first audio data, contextual information (e.g., information about the first audio data, data generated at the time that the first audio data was captured, second audio data generated for a duration of time prior to the first audio data, and/or the like), and/or other information without departing from the disclosure. Using the training data 1310, the interrupt detector 1010 may perform the training process to improve future results. For example, the interrupt detector 1010 may include an interrupt classifier, interrupt detection model or algorithm, and/or the like and the device 110 may update the interrupt classifier/model using the training data 1310. By performing the training process, the interrupt detector 1010 may achieve a low false accept (FA) rate (e.g., false positive) while only processing a short speech segment (e.g., short portion of the utterance), enabling the device 110 to decrease a latency associated with the interrupt detector 1010 detecting an interrupt event.

In addition to the training data 1310 illustrated in FIG. 13, the interrupt detector 1010 may perform training based on various inputs, including user feedback (e.g., direct feedback and/or feedback inferred based on subsequent responses), remote feedback from the remote system 120, and/or the like. As used herein, on-device training corresponds to any modification of the interrupt detector 1010 performed by the device 110, whether based on the training data 1310, user feedback, remote feedback, or any other input to the device 110. For example, the device 110 may modify the interrupt detector 1010 (e.g., interrupt detection model or algorithm) itself, may modify weights associated with the interrupt detector 1010, and/or the like based on a feedback process.

In contrast to constantly streaming audio data to the remote system 120 during and/or after outputting audio responsive to a voice command, detecting the device-directed speech event enables the system 100 to only process a portion of audio data representing device-directed speech. This reduces a processing consumption imposed on the system 100 while also improving privacy protection for a user 5 of the device 110. For example, as the system 100 only processes the portion of the audio data directed to the device/system, the system 100 ignores speech that is not directed to the device/system.

Additionally or alternatively, the system 100 may be configured to train the on-device interrupt architecture 1000 in real-time, without persistently storing any information about an interaction. Thus, the device 110 may be configured to learn and/or train the on-device interrupt architecture 1000 without storing audio data, ASR data, and/or other data associated with a particular interaction.

Figure 14:
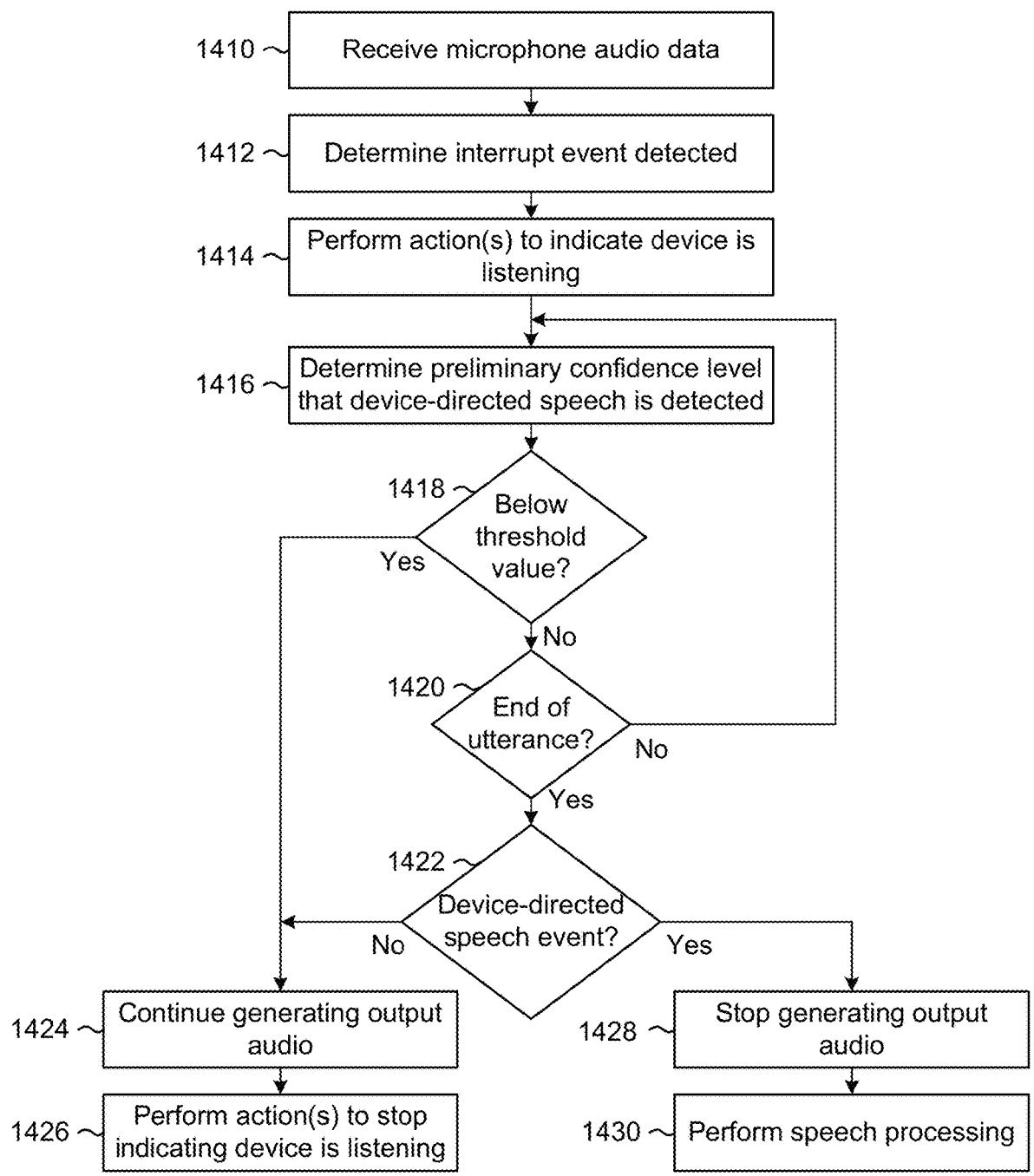
FIG. 14 is a flowchart conceptually illustrating an example method for performing interrupt processing according to embodiments of the present disclosure.

FIG. 14 is a flowchart conceptually illustrating an example method for performing interrupt processing according to embodiments of the present disclosure. As illustrated in FIG. 14, the device 110 may receive (1410) microphone audio data, may determine (1412) that an interrupt event is detected, and may perform (1414) action(s) to indicate that the device 110 is listening. For example, the device 110 may reduce a volume level of output audio from a first volume level to a second volume level, may display indicator light(s), and/or the like.

The device 110 may determine (1416) a preliminary confidence level that a device-directed speech event is detected and may determine (1418) whether the preliminary confidence level is below a first threshold value. If the preliminary confidence level is below the first threshold value, the device 110 may skip to step 1424. If the preliminary confidence level is above the first threshold value, the device 110 may determine (1420) whether the device 110 detects an end of the utterance (e.g., endpoint). If the endpoint is not detected, the device 110 may loop to step 1416 and repeat steps 1416-1420 until the endpoint is detected.

If the endpoint is detected in step 1420, the device 110 may determine (1422) whether a device-directed speech event is detected. If a device-directed speech event is not detected, the device 110 may reject the interrupt event, may continue (1424) generating the output audio and may perform (1426) action(s) to stop indicating that the device 110 is listening. For example, the device 110 may increase the volume level of the output audio from the second volume level to the first volume level while turning off (e.g., disabling) any indicator light(s) that were turned on in step 1414.

If a device-directed speech event is detected in step 1422, the device 110 may stop (1428) generating the output audio and may perform (1430) speech processing on the microphone audio data (e.g., a portion of the microphone audio data corresponding to the utterance). For example, the device 110 may stop playback of a notification or other text-to-speech, may send the microphone audio data to the remote system 120, and may perform one or more actions received from the remote system in response to the microphone audio data. Additionally or alternatively, the device 110 may stop playback of the notification or other text-to-speech, may perform local speech processing on the microphone audio data, and may perform one or more actions determined based on the local speech processing without departing from the disclosure.

Figure 15:
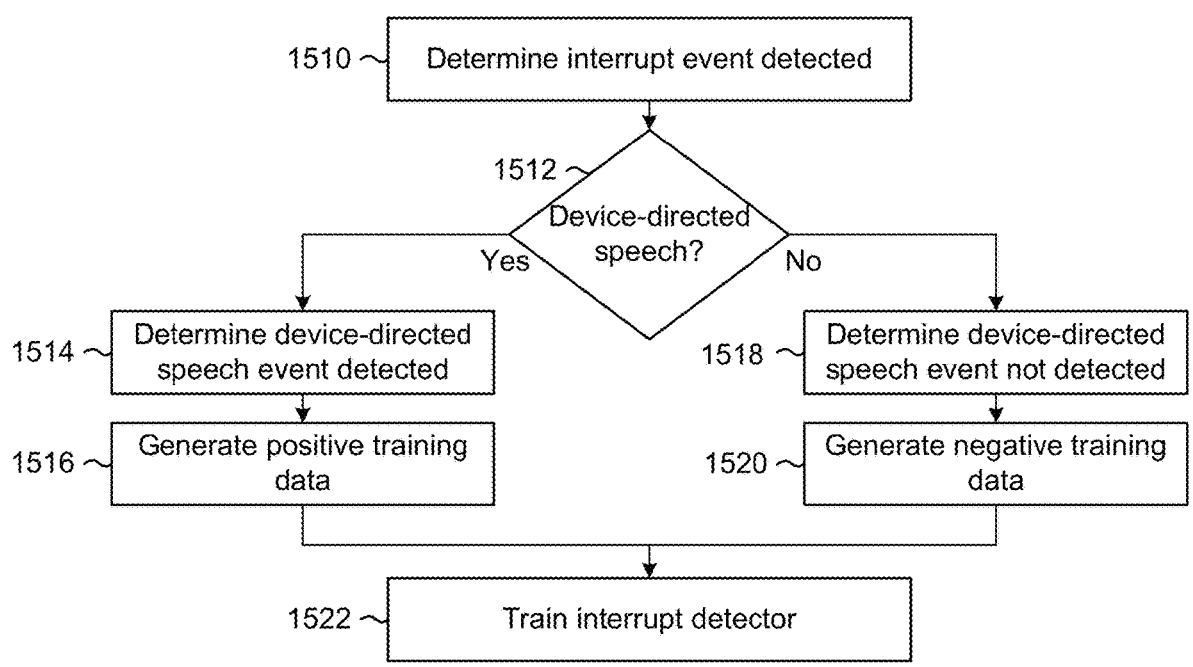
FIG. 15 is a flowchart conceptually illustrating an example method for training an interrupt detector according to embodiments of the present disclosure.

FIG. 15 is a flowchart conceptually illustrating an example method for training an interrupt detector according to embodiments of the present disclosure. As illustrated in FIG. 15, the device 110 may determine (1510) that an interrupt event is detected and may determine (1512) device-directed speech is detected. If device-directed speech is detected, the device 110 may determine (1514) that a device-directed speech event is detected (e.g., accepted interrupt event) and generate (1516) positive training data based on the device-directed speech event. If device-directed speech is not detected, the device 110 may determine (1518) that a device-directed speech event is not detected (e.g., rejected interrupt event) and may generate (1520) negative training data. At some point in time after generating the positive training data and/or the negative training data, the device 110 may train (1522) the interrupt detector 1010, as described in greater detail above.

Figure 16:
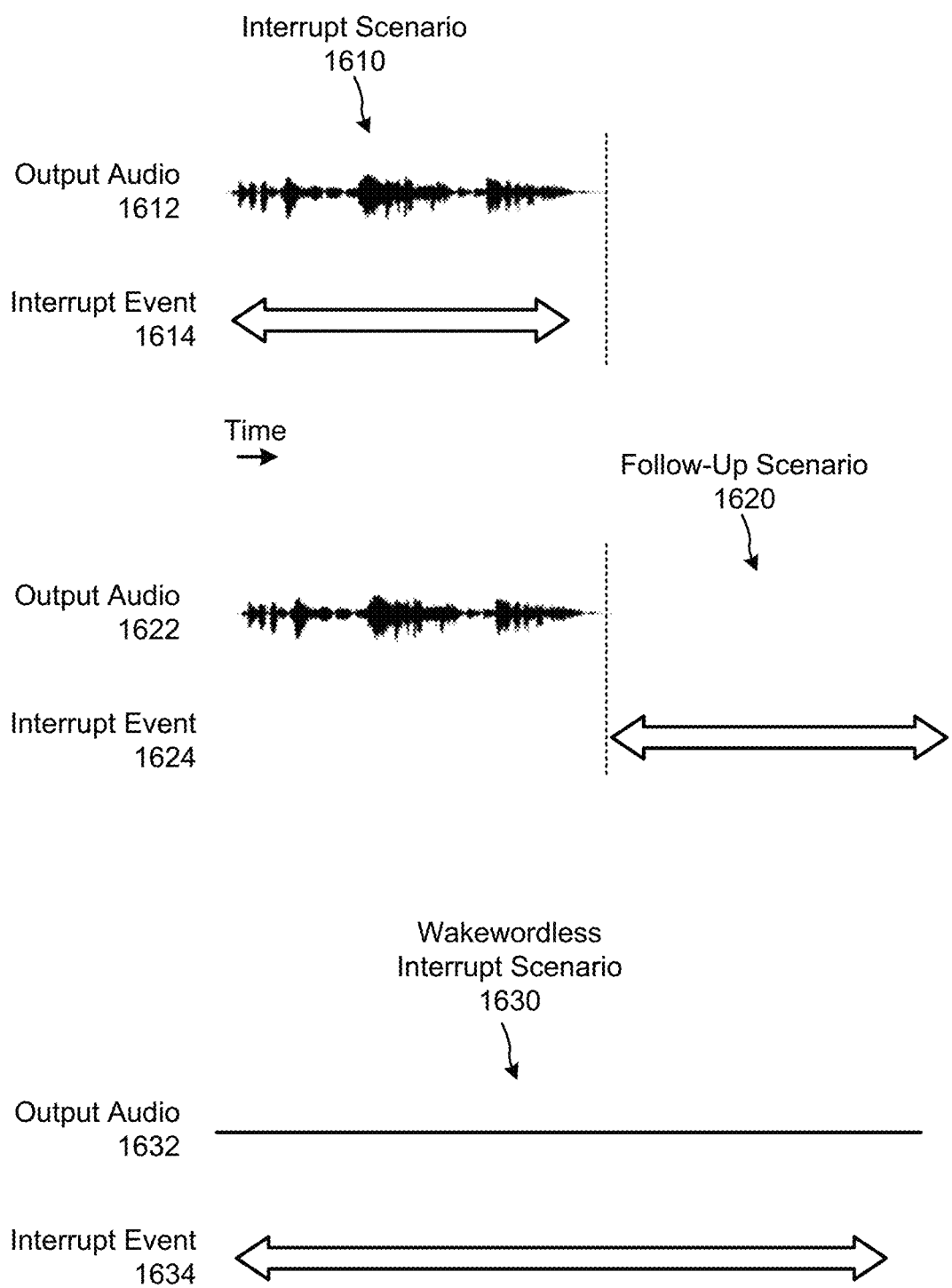
FIG. 16 illustrates example implementations for interrupt architecture according to embodiments of the present disclosure.

FIG. 16 illustrates example implementations for interrupt architecture according to embodiments of the present disclosure. As illustrated in FIG. 16, the on-device interrupt architecture 1000 may be used in one of at least three implementations. In a first implementation, illustrated in FIG. 16 as interrupt scenario 1610, the device 110 may generate output audio 1612 and may detect an interrupt event 1614 while generating the output audio 1612. The interrupt scenario 1610 is described in greater detail above, and corresponds to an example in which the device 110 may reduce a volume level of the output audio 1612 in response to the interrupt event 1614.

In a second implementation, illustrated in FIG. 16 as follow-up scenario 1620, the device 110 may generate output audio 1622 and may detect an interrupt event 1624 within a duration of time after generating the output audio 1622. For example, the device 110 may stop generating the output audio 1622 but may listen for device-directed speech for the duration of time. If the device 110 detects the interrupt event 1624 within the duration of time, the device 110 may determine whether the interrupt event corresponds to a device-directed speech event and may process a voice command without detecting the wakeword. As the device 110 is not generating the output audio 1622 when the interrupt event 1624 is detected, the device 110 may not reduce a volume level of the output audio 1622 or perform other actions described above with regard to the interrupt scenario 1610.

In a third implementation, illustrated in FIG. 16 as wakewordless interrupt scenario 1630, the device 110 may not generate output audio 1632 and may detect an interrupt event 1634 at any point in time. For example, the device 110 may listen for device-directed speech for an indefinite duration of time without regard to the output audio 1632, enabling the device 110 to process a voice command at any point in time without detecting the wakeword. As a result, the device 110 may be configured to identify the voice command by detecting a device-directed speech event instead of detecting a representation of the wakeword.

FIG. 17 illustrate example implementations for wakewordless interrupt architecture according to embodiments of the present disclosure. As illustrated in FIG. 17, the wakewordless interrupt architecture may be included in a speech-enabled device 110a as illustrated in device implementation 1710, in a doorbell 110b as illustrated in doorbell implementation 1720, in a vehicle 110c as illustrated in automobile implementation 1730, and/or the like without departing from the disclosure. Thus, each of the devices 110a-110c may include on-device interrupt architecture 1000 that may be used during an interrupt scenario 1610, a follow-up scenario 1620, and/or a wakewordless interrupt scenario 1630 without departing from the disclosure.

In some examples, the device 110 may use the on-device interrupt detector 1000 or a similar component to ignore a wakeword represented in audio data. For example, the device 110 may determine that a wakeword is represented in first audio data, may determine that the first audio data does not represent device-directed speech, and may determine to ignore the wakeword because the first audio data does not represented device-directed speech.

While the above description refers to the device directed classifier 1020 processing ASR data in addition to the audio data, the disclosure is not limited thereto. In some examples, the device directed classifier 1020 may process additional audio data (e.g., previous 5-10 seconds of audio data prior to the interrupt detector 1010 detecting an interrupt event), additional ASR data (e.g., second ASR data corresponding to the additional audio data), and/or other information (e.g., NLU data, a previous command, etc.) without departing from the disclosure. For example, the device 110 may process data corresponding to a previous interaction (e.g., previous voice command) as part of detecting an interrupt event and/or device-directed speech event. Additionally or alternatively, the interrupt detector 1010 may process the additional information described above without departing from the disclosure.

In some examples, the device 110 may perform speaker identification to detect the interrupt event and/or the device-directed speech event. For example, the device 110 may detect a first command (e.g., first audio data representing a first command) generated by a first user associated with first identification data and may output audio responsive to the first command. If the device 110 detects speech (e.g., second audio data representing a second command) while outputting the audio, the device 110 may confirm whether the speech corresponds to the first user associated with the first identification data as part of detecting the interrupt event and/or the device-directed speech event. For example, if the speech corresponds to the first user, the device 110 may detect the interrupt event and/or the device-directed speech event, whereas if the speech corresponds to a second user different from the first user (e.g., not associated with the first identification data), the device 110 may ignore the interrupt event and/or the device-directed speech event. Thus, the device 110 may optionally only detect device-directed speech events when the speech is generated by the same user as a previous voice command.

In some examples, the device 110 may perform speaker identification to determine the first identification data, as described above. However, the disclosure is not limited thereto, and the device 110 may use voice recognition on the second audio data, computer processing on second image data corresponding to the second audio data, and/or other techniques known to one of skill in the art to determine the first identification data. Additionally or alternatively, the device 110 may determine that the first command (e.g., previous command) corresponds to the first identification data (e.g., first user) by performing speaker identification and/or voice recognition on the first audio data representing the first command, performing speaker identification and/or voice recognition on a portion of the first audio data representing the wakeword (e.g., determining that the second command corresponds to the wakeword preceding the first command), performing computer processing on first image data corresponding to the first audio data, using the other data 581/591 indicating identification data associated with the previous utterance, and/or the like without departing from the disclosure. If the device 110 determines that the first command and the second command both correspond to the first identification data, the interrupt detector 1010 and/or the device directed classifier 1020 may increase a weight of the model output data (e.g., more heavily weight speech if it came from the first user that generated the first command).

While some of the examples described above rely on determining an endpoint of an utterance to detect a device-directed speech event, the disclosure is not limited thereto. For example, in some examples the device 110 may detect speech and may identify an endpoint after speech is not detected for a duration of time (e.g., 500 ms, although the disclosure is not limited thereto). Once the endpoint is detected, the device directed classifier 1020 may receive an indication of the endpoint and may process the entire utterance, as described in greater detail above. Thus, the device directed classifier 1020 may be triggered by the device 110 detecting the endpoint of the utterance.

In other examples, however, the device 110 may detect speech and trigger the device directed classifier 1020 after a specified duration of time regardless of whether speech is detected. For example, the device 110 may detect speech and may trigger the device directed classifier 1020 after a duration of time (e.g., 100-500 ms) from when the speech was first detected, without regard to whether speech is represented in the audio data (e.g., device 110 does not wait for silence and/or detecting an endpoint). Thus, the device 110 may periodically process input audio data using the device directed classifier 1020 without departing from the disclosure.

Figure 18:
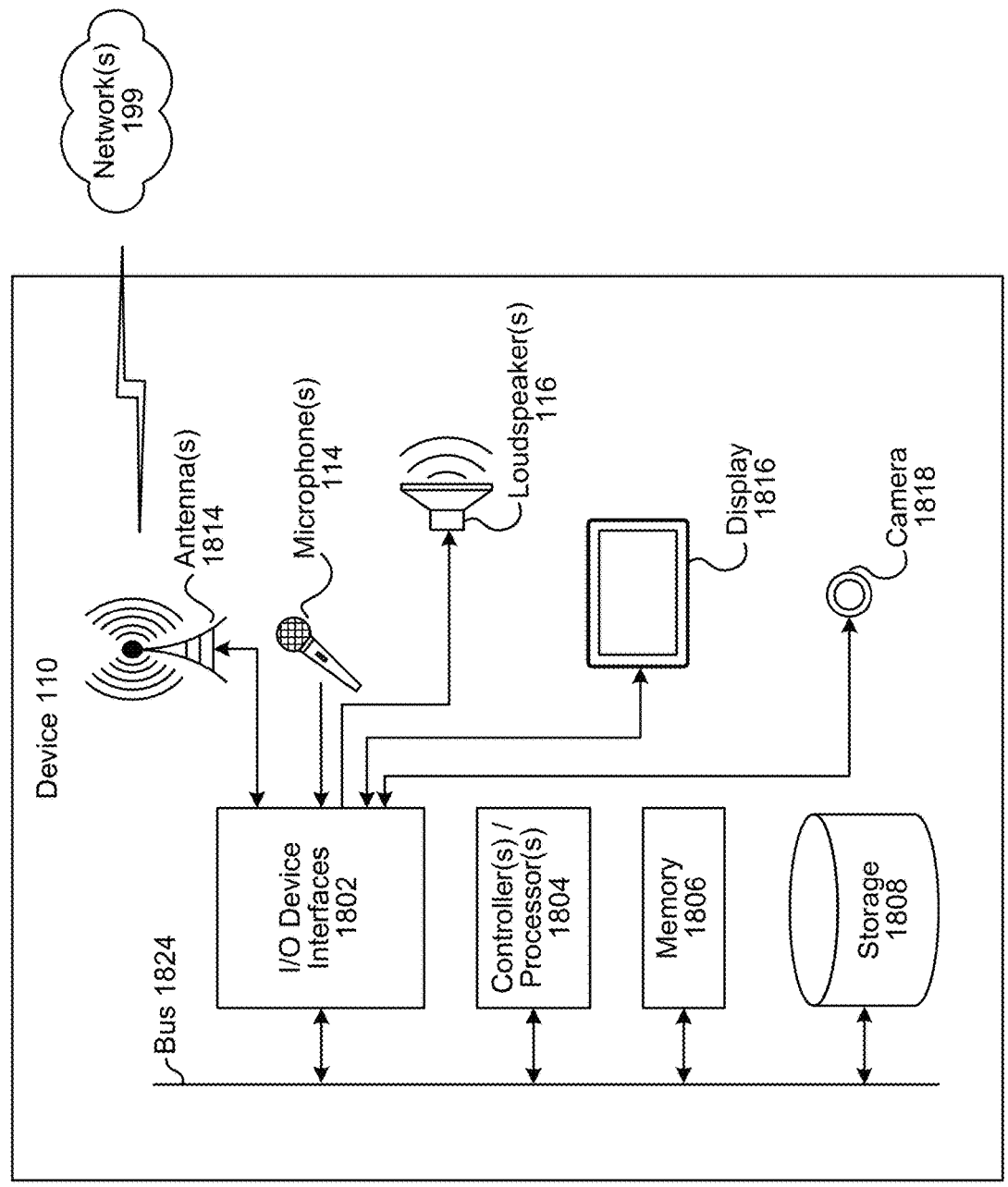
FIG. 18 is a block diagram conceptually illustrating example components of a device according to embodiments of the present disclosure.
Figure 19:
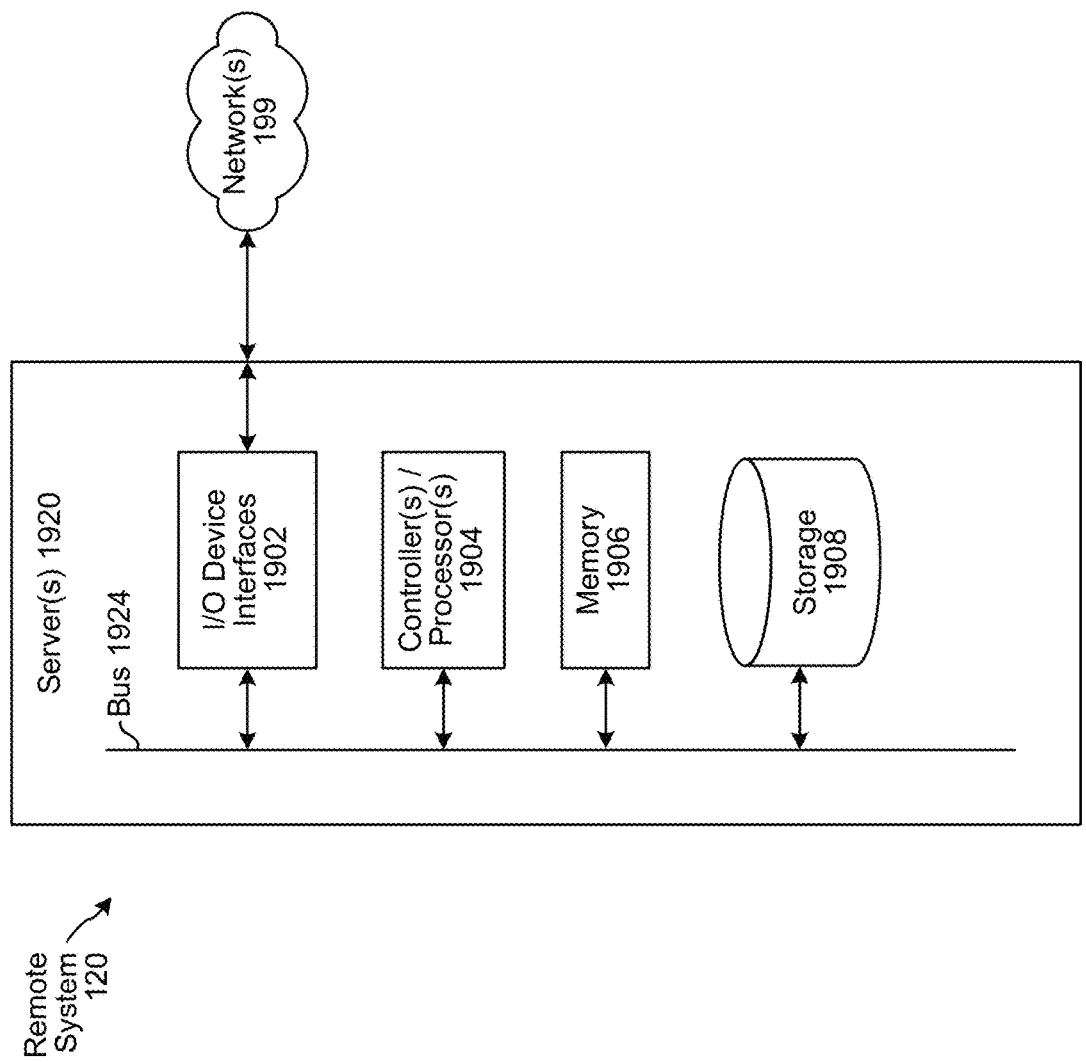
FIG. 19 is a block diagram conceptually illustrating example components of a server according to embodiments of the present disclosure.

FIG. 18 is a block diagram conceptually illustrating a user device 110 that may be used with the system. FIG. 19 is a block diagram conceptually illustrating example components of a remote device, such as remote server(s) 1920 included in the remote system 120, which may assist with ASR processing, NLU processing, SLU processing and/or command processing. Multiple remote servers 1920 may be included in the remote system 120, such as one or more servers for performing ASR, one or more remote servers 1920 for performing NLU, etc. In operation, each of these devices (or groups of devices) may include computer-readable and computer-executable instructions that reside on the respective device (110/1920), as will be discussed further below. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Each of these devices (110/1920) may include one or more controllers/processors (1804/1904), which may each include a central processing unit (CPU) for processing data and computer-readable instructions, and a memory (1806/1906) for storing data and instructions of the respective device. The memories (1806/1906) may individually include volatile random access memory (RAM), non-volatile read only memory (ROM), non-volatile magnetoresistive memory (MRAM), and/or other types of memory. Each device (110/1920) may also include a data storage component (1808/1908) for storing data and controller/processor-executable instructions. Each data storage component (1808/1908) may individually include one or more non-volatile storage types such as magnetic storage, optical storage, solid-state storage, etc. Each device (110/1920) may also be connected to removable or external non-volatile memory and/or storage (such as a removable memory card, memory key drive, networked storage, etc.) through respective input/output device interfaces (1802/1902).

Computer instructions for operating each device (110/1920) and its various components may be executed by the respective device's controller(s)/processor(s) (1804/1904), using the memory (1806/1906) as temporary "working" storage at runtime. A device's computer instructions may be stored in a non-transitory manner in non-volatile memory (1806/1906), storage (1808/1908), or an external device(s). Alternatively, some or all of the executable instructions may be embedded in hardware or firmware on the respective device in addition to or instead of software.

Each device (110/1920) includes input/output device interfaces (1802/1902). A variety of components may be connected through the input/output device interfaces (1802/1902), as will be discussed further below. Additionally, each device (110/1920) may include an address/data bus (1824/1924) for conveying data among components of the respective device. Each component within a device (110/1920) may also be directly connected to other components in addition to (or instead of) being connected to other components across the bus (1824/1924).

Referring to FIG. 18, the device 110 may include input/output device interfaces 1802 that connect to a variety of components such as an audio output component such as loudspeaker(s) 116, a speaker (not illustrated), a wired headset or a wireless headset (not illustrated), or other component capable of outputting audio. The device 110 may also include an audio capture component. The audio capture component may be, for example, one or more microphone(s) 114 or an array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1816 for displaying content and/or a camera 1818 for generating image data, although the disclosure is not limited thereto.

Via antenna(s) 1814, the input/output device interfaces 1802 may connect to one or more network(s) 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (1802/1902) may also include communication components that allow data to be exchanged between devices such as different physical servers in a collection of servers or other components.

The components of the device(s) 110 and the remote system 120 may include their own dedicated processors, memory, and/or storage. Alternatively, one or more of the components of the device(s) 110 and the remote system 120 may utilize the I/O interfaces (1802/1902), processor(s) (1804/1904), memory (1806/1906), and/or storage (1808/1908) of the device(s) 110 and remote system 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the remote system 120, as described herein, are exemplary, and may be located as a stand-alone device or may be included, in whole or in part, as a component of a larger device or system.

Figure 20:
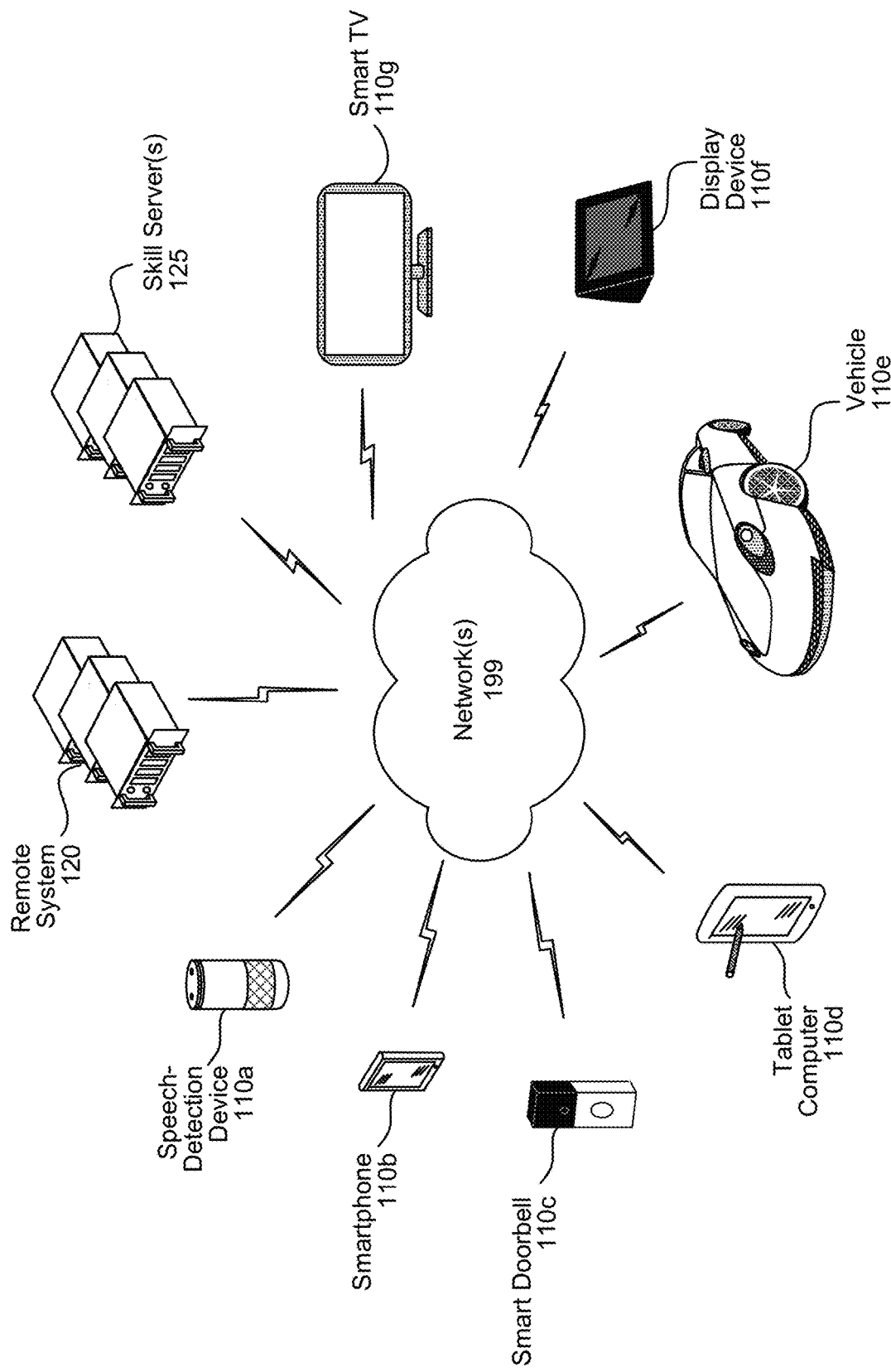
FIG. 20 illustrates an example of a computer network for use with the speech processing system.

As illustrated in FIG. 20, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smartphone 110b, a smart watch 110c, a tablet computer 110d, a vehicle 110e, a speech-detection and display device 110f, and/or a smart TV 110g may be connected to the network(s) 199 through a wireless service provider, over a WiFi or cellular network connection, or the like. Other devices are included as network-connected support devices, such as the remote system 120, skill server(s) 125, or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more remote servers 1920.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
generating first output audio using a loudspeaker associated with a device;
receiving first audio data;
processing the first audio data using a first component of the device to determine that the first audio data represents first speech;
in response to determining that the first speech is represented in the first audio data, performing a first action;
determining, by a natural language processing component, first natural language processing data associated with the first speech;
providing the first audio data and the first natural language processing data as inputs to a machine learning component, the machine learning component being configured to classify input data as corresponding to a device-directed speech event;
determining, using the machine learning component, that the first audio data and the first natural language processing data correspond to a first device-directed speech event; and
based at least in part on the first audio data and the first natural language processing data corresponding to the first device-directed speech event, causing natural language processing to be completed based on the first audio data.

2. The computer-implemented method of claim 1, further comprising:
detecting an endpoint of the first speech represented in the first audio data,
wherein determining that the first audio data and the first natural language processing data correspond to the first device-directed speech event occurs after detection of the endpoint.

3. The computer-implemented method of claim 1, further comprising:
determining, using a wakeword detection component, an indicator that the first speech includes a wakeword; and
providing the indicator as an input to the machine learning component together with the first audio data and the first natural language processing data.

4. The computer-implemented method of claim 1, further comprising:
processing, by the natural language processing component, a first portion of the first audio data to determine the first natural language processing data, wherein the first natural language processing data corresponds to the first portion of the first audio data.

5. The computer-implemented method of claim 1, further comprising:
detecting an endpoint of the first speech represented in the first audio data,
wherein determining the first natural language processing data comprises determining the first natural language processing data corresponding to an entirety of the first speech.

6. The computer-implemented method of claim 1, further comprising:
processing, by a wakeword detection component, the first audio data; and
failing to detect, by the wakeword detection component, a representation of a wakeword in the first audio data.

7. The computer-implemented method of claim 1, wherein the first component comprises a wakeword detection component and the method further comprises:
processing, by the wakeword detection component, the first audio data to determine a representation of a wakeword in the first audio data.

8. The computer-implemented method of claim 1, wherein performing the first action comprises:
presenting, by the device, a visual output corresponding to an indication that natural language processing is occurring.

9. The computer-implemented method of claim 1, wherein performing the first action comprises:
reducing a volume level of the first output audio.

10. The computer-implemented method of claim 1, further comprising:
after determination that the first audio data and the first natural language processing data correspond to the first device-directed speech event, discontinuing generating the first output audio using the loudspeaker of the device.

11. A system comprising:
at least one processor; and
at least one memory comprising instructions that, when executed by the at least one processor, cause the system to:
generate first output audio using a loudspeaker associated with a device;
receive first audio data;

process the first audio data using a first component of the device to determine that the first audio data represents first speech;

in response to determination that the first speech is represented in the first audio data, performing a first action;

determine, by a natural language processing component, first natural language processing data associated with the first speech, wherein the first natural language processing data corresponds to a representation of the first speech;

provide the first audio data and the first natural language processing data as inputs to a machine learning component, the machine learning component being configured to classify input data as corresponding to a device-directed speech event;

determine, using the machine learning component, that the first audio data and the first natural language processing data correspond to a first device-directed speech event; and based at least in part on the first audio data and the first natural language processing data corresponding to the first device-directed speech event, cause natural language processing to be completed based on the first audio data, wherein the natural language processing includes determining an intent associated with the first speech.

12. The system of claim 11, wherein the at least one memory further comprises instructions that, when executed by the at least one processor, further cause the system to:

detect an endpoint of the first speech represented in the first audio data, wherein determination that the first audio data and the first natural language processing data correspond to the first device-directed speech event occurs after detection of the endpoint.

13. The system of claim 11, wherein the at least one memory further comprises instructions that, when executed by the at least one processor, further cause the system to:

determine, using a wakeword detection component, an indicator that the first speech includes a wakeword; and provide the indicator as an input to the machine learning component together with the first audio data and the first natural language processing data.

14. The system of claim 11, wherein the at least one memory further comprises instructions that, when executed by the at least one processor, further cause the system to:

process, by the natural language processing component, a first portion of the first audio data to determine the first natural language processing data, wherein the first natural language processing data corresponds to the first portion of the first audio data.

15. The system of claim 11, wherein the at least one memory further comprises instructions that, when executed by the at least one processor, further cause the system to:

detect an endpoint of the first speech represented in the first audio data, wherein the first natural language processing data corresponds to an entirety of the first speech.

16. The system of claim 11, wherein the at least one memory further comprises instructions that, when executed by the at least one processor, further cause the system to:

process, by a wakeword detection component, the first audio data; and fail to detect, by the wakeword detection component, a representation of a wakeword in the first audio data.

17. The system of claim 11, wherein the first component comprises a wakeword detection component and wherein the at least one memory further comprises instructions that, when executed by the at least one processor, further cause the system to:

process, by the wakeword detection component, the first audio data to determine a representation of a wakeword in the first audio data.

18. The system of claim 11, wherein the instructions that cause the system to perform the first action comprise instructions that, when executed by the at least one processor, cause the system to:

present, by the device, a visual output corresponding to an indication that natural language processing is occurring.

19. The system of claim 11, wherein the instructions that cause the system to perform the first action comprise instructions that, when executed by the at least one processor, cause the system to:

reduce a volume level of the first output audio.

20. The system of claim 11, wherein the at least one memory further comprises instructions that, when executed by the at least one processor, further cause the system to:

after determination that the first audio data and the first natural language processing data correspond to the first device-directed speech event, discontinue generating the first output audio using the loudspeaker of the device.

21. The computer-implemented method of claim 1, further comprising:

generating, using the loudspeaker, a first portion of second output audio at a first volume level;

receiving second audio data;

processing the second audio data using the first component to determine that the second audio data represents second speech;

in response to determining that the second speech is represented in the second audio data, generating, using the loudspeaker, a second portion of the second output audio at a second volume level lower than the first volume level;

determining, by the natural language processing component, second natural language processing data associated with the second speech;

providing the first audio data and the first natural language processing data as inputs to the machine learning component;

determining, using the machine learning component, that the second audio data and the second natural language processing data do not correspond to a device-directed speech event; and based at least in part on the second audio data and the second natural language processing data not corresponding to a device-directed speech event, generating, using the loudspeaker, a third portion of the second output audio at the first volume level.

* * * * *